United States Patent [19]
Horimai et al.

[11] Patent Number: 6,128,272
[45] Date of Patent: Oct. 3, 2000

[54] RECORDING MEDIUM

[75] Inventors: Hideyoshi Horimai, Kanagawa; Minoru Tobita, Tokyo; Goro Fujita; Susumu Tosaka, both of Kanagawa, all of Japan

[73] Assignee: Sony Corporation, Tokyo, Japan

[21] Appl. No.: 09/392,694

[22] Filed: Sep. 9, 1999

Related U.S. Application Data

[62] Division of application No. 08/937,724, Sep. 25, 1997.

[30] Foreign Application Priority Data

| Apr. 10, 1996 | [JP] | Japan | P08-283235 |
| Apr. 10, 1996 | [JP] | Japan | P08-283238 |

[51] Int. Cl.$^7$ .................................................. G11B 7/00
[52] U.S. Cl. .................................... 369/275.4; 369/44.26; 369/58
[58] Field of Search ............................ 369/44.26, 275.1, 369/275.3, 275.4, 276, 277, 47, 48, 54, 58, 59

[56] References Cited

U.S. PATENT DOCUMENTS

| 4,949,331 | 8/1990 | Maeda et al. | 369/275.3 |
|---|---|---|---|
| 5,182,742 | 1/1993 | Ohmori et al. | 369/116 |
| 5,295,130 | 3/1994 | Tobita et al. | 369/124 |
| 5,323,373 | 6/1994 | Horimai | 369/110 |
| 5,363,752 | 11/1994 | Tobita et al. | 369/13 |
| 5,416,766 | 5/1995 | Horimai | 369/116 |
| 5,422,874 | 6/1995 | Birukawa et al. | 369/275.2 |
| 5,448,535 | 9/1995 | Fujita et al. | 369/44.11 |
| 5,469,415 | 11/1995 | Fujita et al. | 369/48 |
| 5,469,420 | 11/1995 | Fujita et al. | 369/59 |
| 5,506,827 | 4/1996 | Tobita | 396/59 |
| 5,508,995 | 4/1996 | Moriya et al. | 369/275.4 |
| 5,513,161 | 4/1996 | Horimai et al. | 369/54 |
| 5,553,046 | 9/1996 | Horimai | 369/58 |
| 5,557,600 | 9/1996 | Horimai | 369/116 |
| 5,557,602 | 9/1996 | Horimai et al. | 369/124 |
| 5,559,786 | 9/1996 | Horimai et al. | 369/275.1 |
| 5,563,869 | 10/1996 | Horimai et al. | 369/112 |
| 5,563,872 | 10/1996 | Horimai | 369/275.4 |
| 5,577,018 | 11/1996 | Horimai et al. | 369/112 |
| 5,592,454 | 1/1997 | Tobita et al. | 369/58 |
| 5,602,810 | 2/1997 | Horimai et al. | 369/44.34 |
| 5,606,545 | 2/1997 | Horimai et al. | 369/124 |
| 5,623,478 | 4/1997 | Horimai | 369/275.4 |
| 5,633,854 | 5/1997 | Horimai et al. | 369/124 |
| 5,663,940 | 9/1997 | Horimai et al. | 369/44.23 |
| 5,684,783 | 11/1997 | Horimai et al. | 369/124 |
| 5,689,496 | 11/1997 | Amano | 369/275.4 |
| 5,699,344 | 12/1997 | Ohmori et al. | 369/264 |
| 5,706,268 | 1/1998 | Horimai | 369/59 |
| 5,717,667 | 2/1998 | Horimai et al. | 369/44.23 |
| 5,721,873 | 2/1998 | Tobita et al. | 395/491 |
| 5,812,512 | 9/1998 | Tobita et al. | 369/84 |
| 5,896,360 | 4/1999 | Horimai | 369/112 |
| 5,917,798 | 6/1999 | Horimai et al. | 369/103 |
| 5,923,640 | 7/1999 | Takemura et al. | 369/275.4 |

FOREIGN PATENT DOCUMENTS

| 0412738 A2 | 2/1991 | European Pat. Off. . |
| 0559449 A2 | 9/1993 | European Pat. Off. . |
| 5-89527 | 4/1993 | Japan . |
| 5-242499 | 9/1993 | Japan . |
| 6-44572 | 2/1994 | Japan . |
| 7-57269 | 3/1995 | Japan . |

*Primary Examiner*—Muhammad Edun
*Attorney, Agent, or Firm*—Limbach & Limbach L.L.P.; Seong-Kun Oh

[57] ABSTRACT

A format of a recording medium suitable for a larger capacity, a higher transfer rate, and integration of pits/lands/grooves is provided. In a first method, in a recordable and reproduceable area, a twin-track structure of lands/grooves is configured such that tracks on which lands become recording tracks and tracks on which grooves become recording tracks form a double spiral. In a read-only area, pits are arrayed such that tracks in the radial direction of the disk are formed in a data area. In a second method, in a recordable and reproduceable area, a land/groove-alternate track structure is configured such that grooves become data recording tracks in the circular track next to the circular track in which lands become data recording tracks, and lands become data recording tracks in the next circular track. In the read-only area, pits are arrayed such that tracks in the radial direction of the disk are formed in the data area.

57 Claims, 56 Drawing Sheets

AE

ARW

AE
ARW

AE
ARW

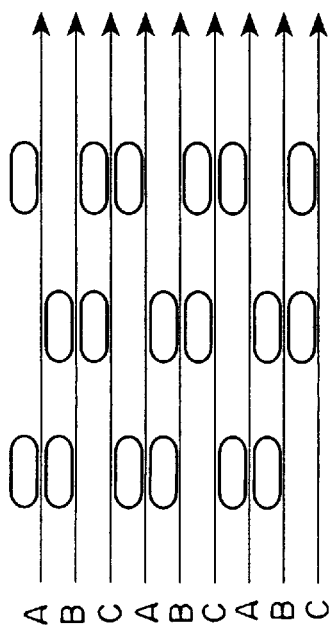
FIG. 7B
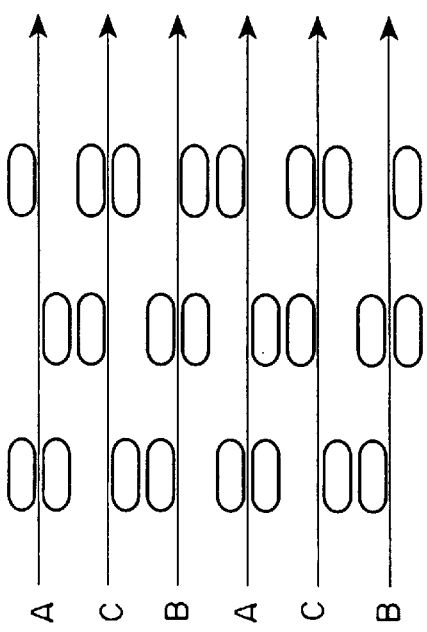
FIG. 7C
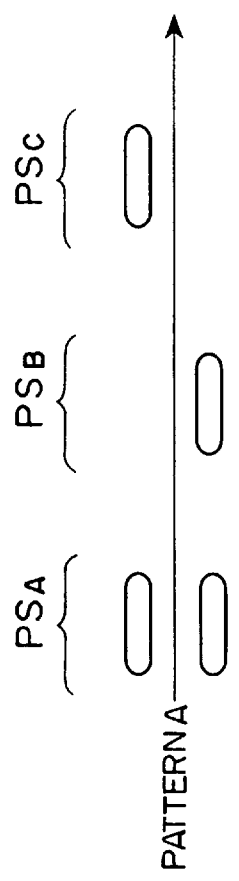
FIG. 7A
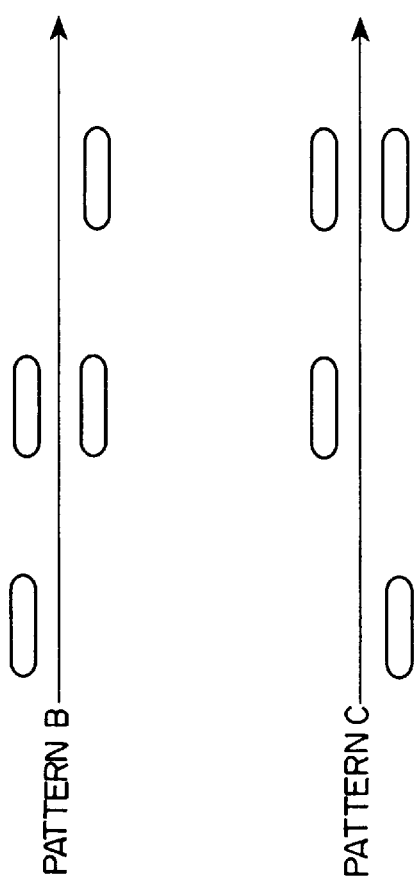

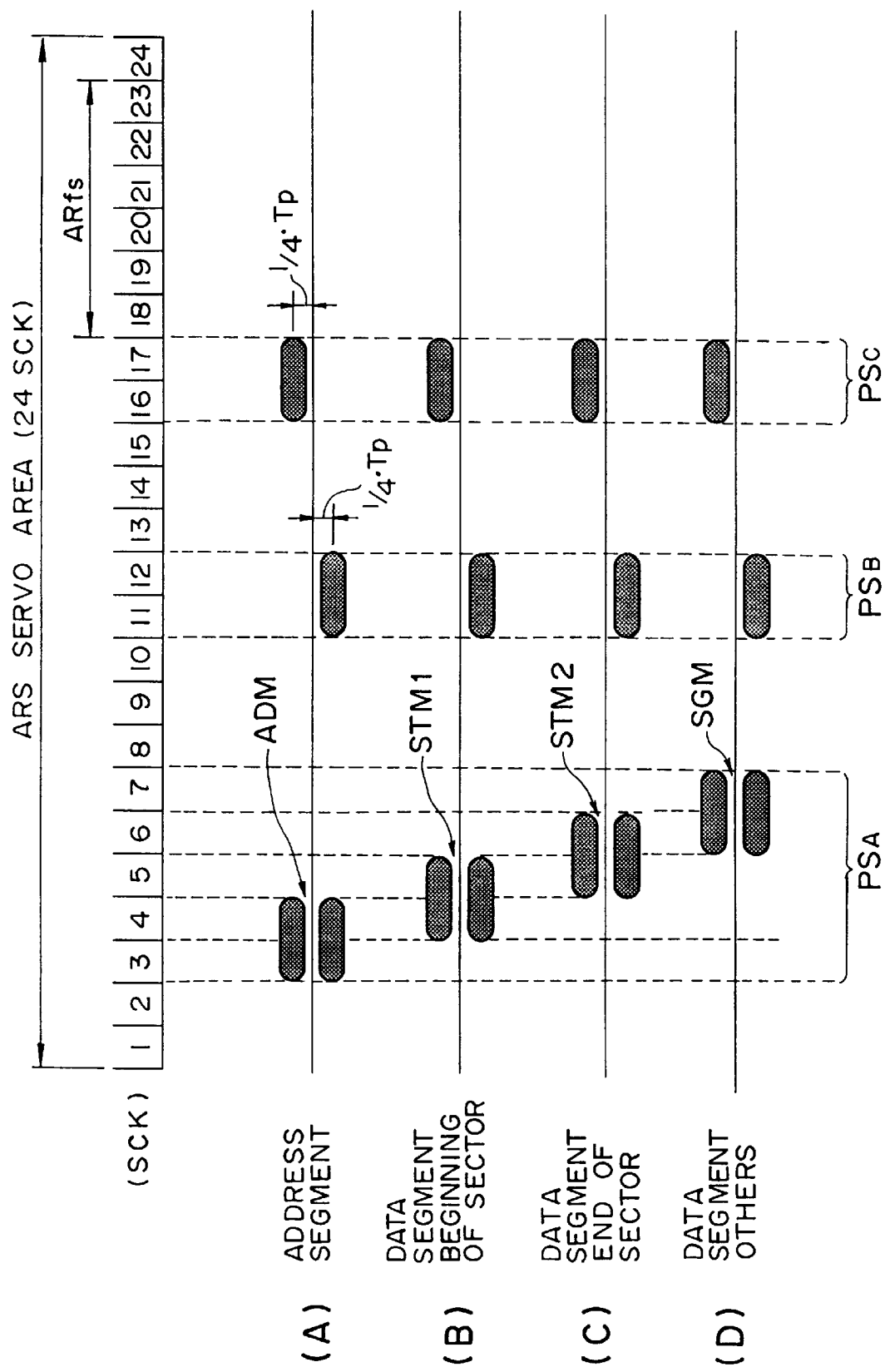

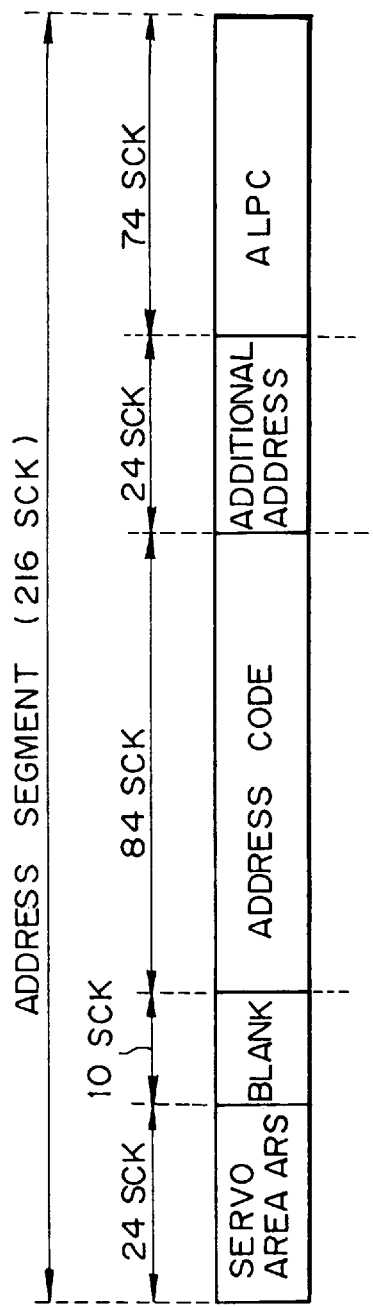
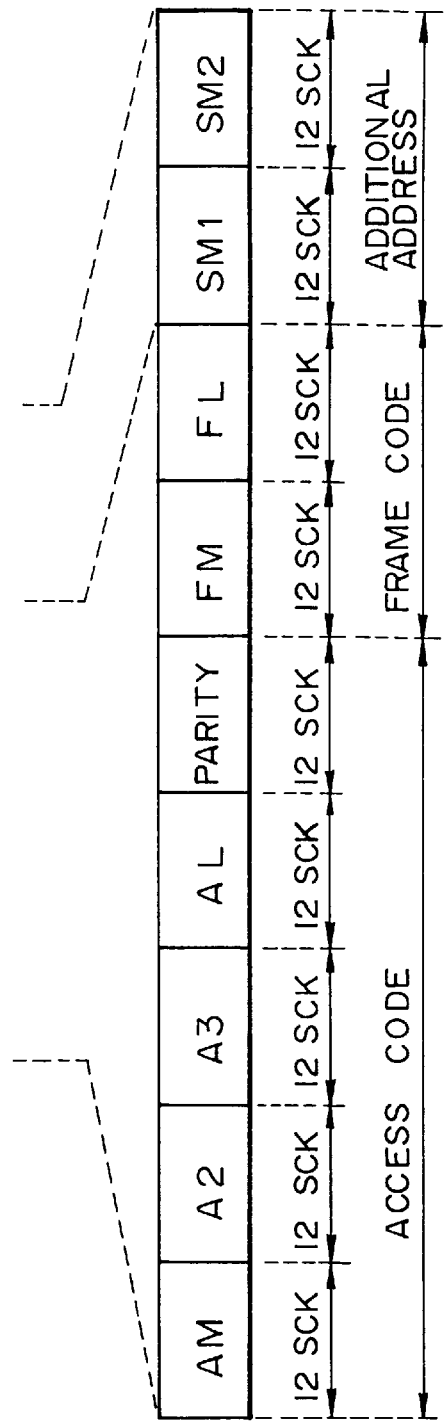
FIG. 9A
FIG. 9B

OUTPUT FROM SAMPLE AND HOLD CIRCUIT

TRACKING ERROR SIGNAL

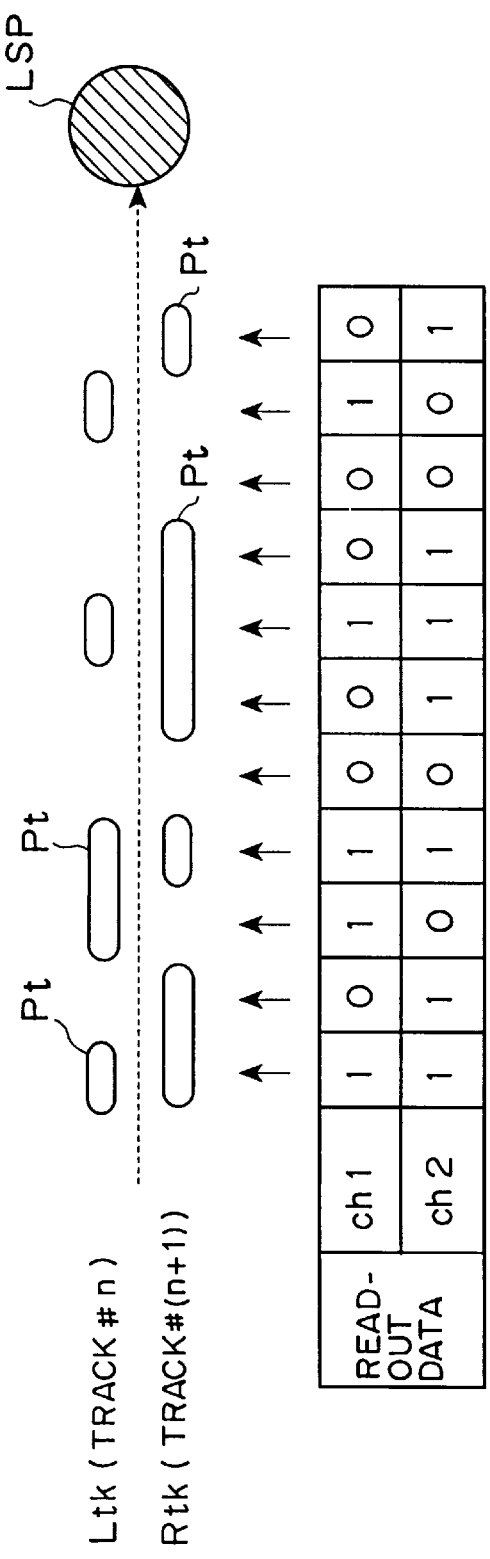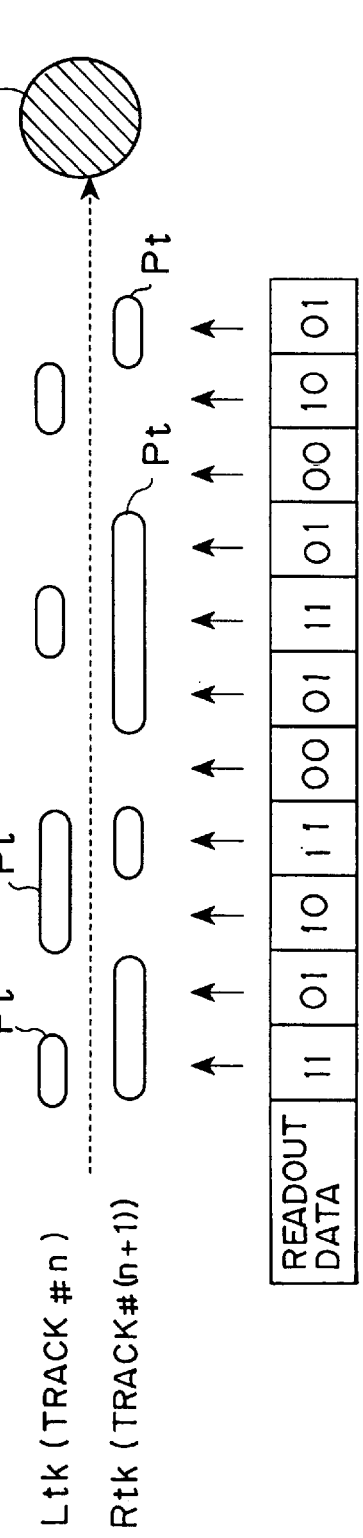

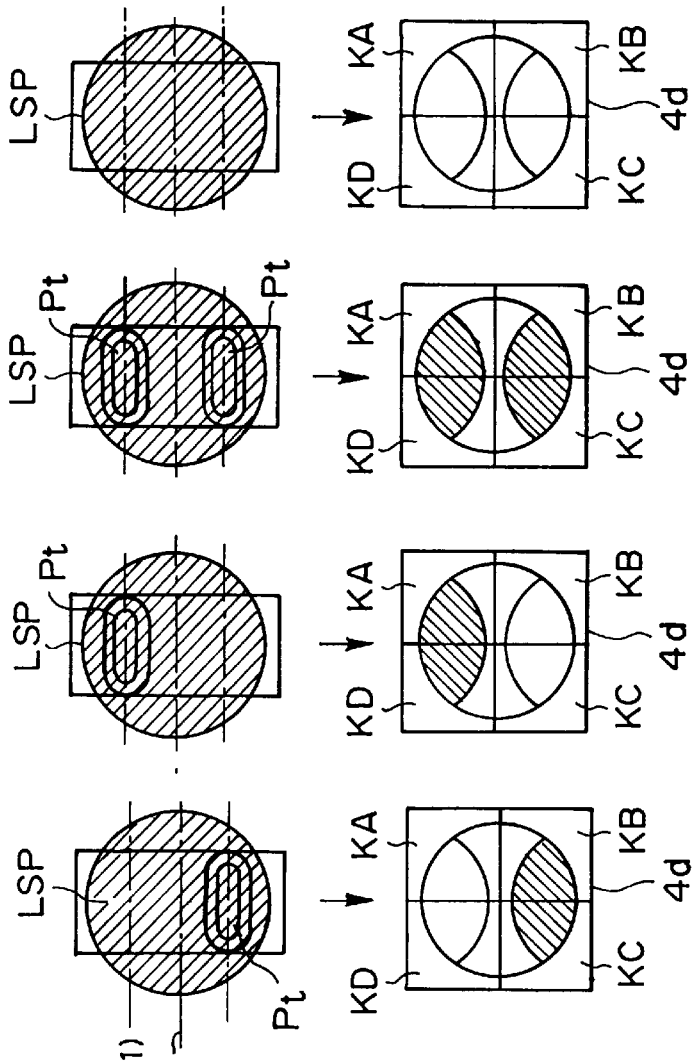
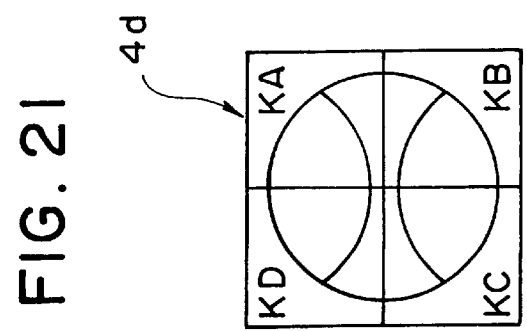

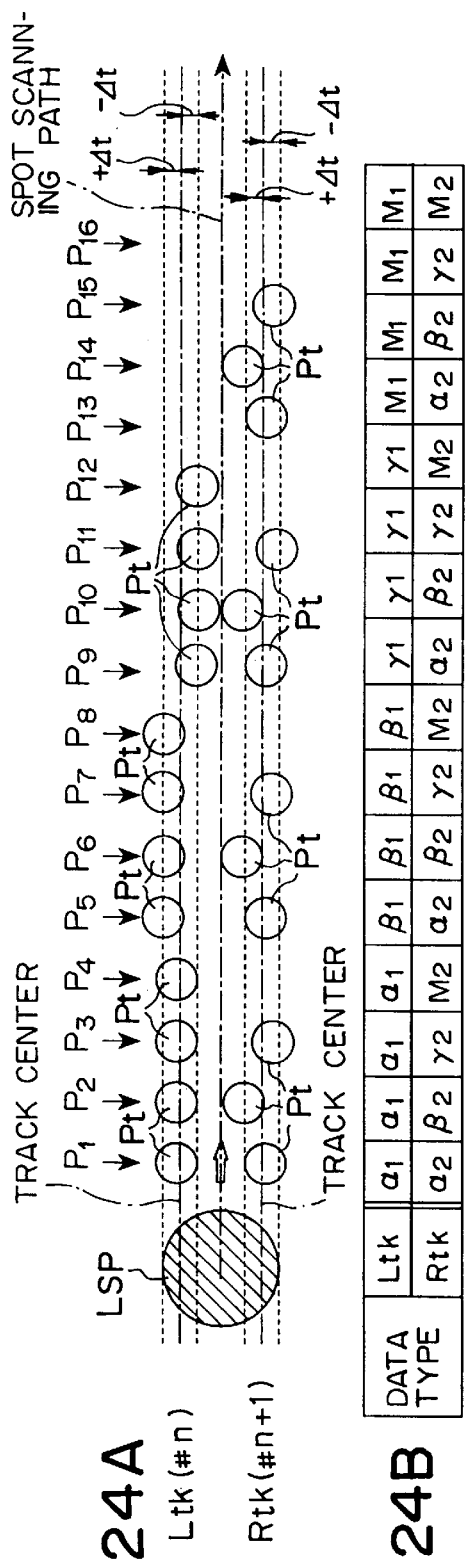
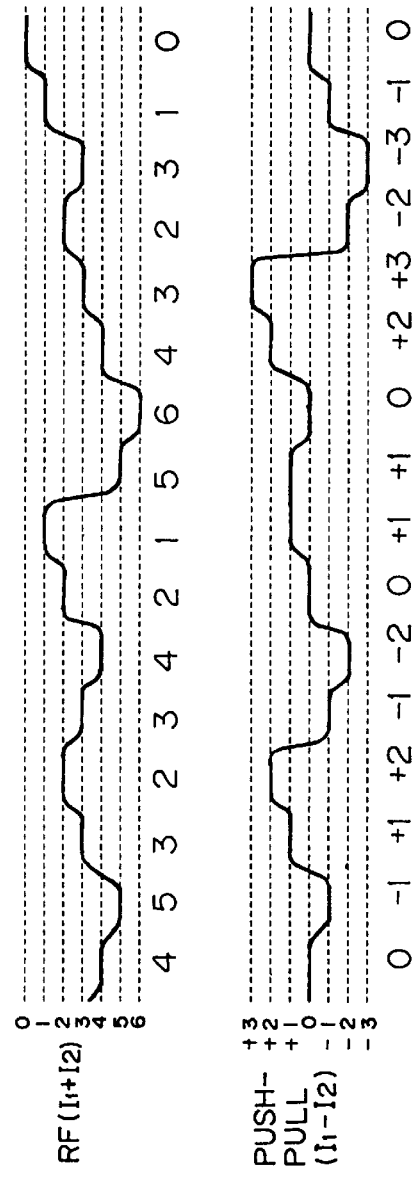
FIG. 24A
FIG. 24B
FIG. 24C
FIG. 24D
FIG. 24E

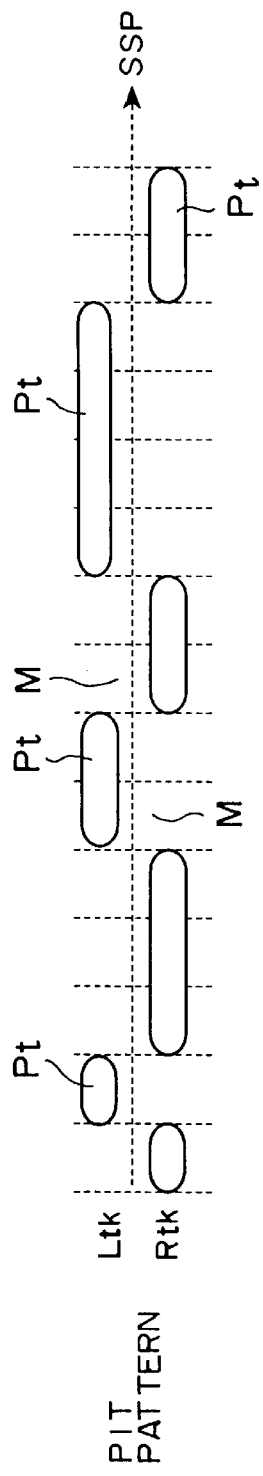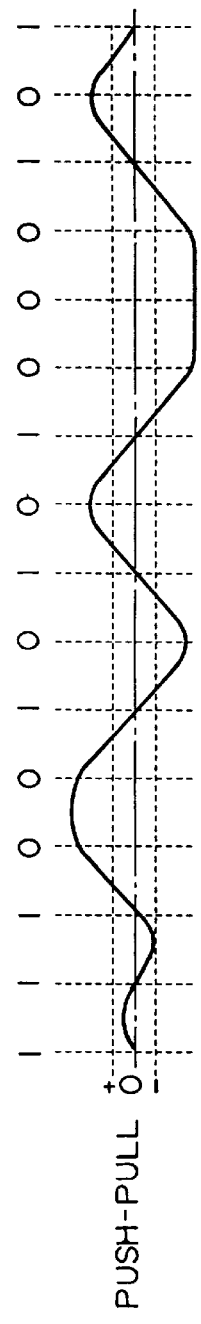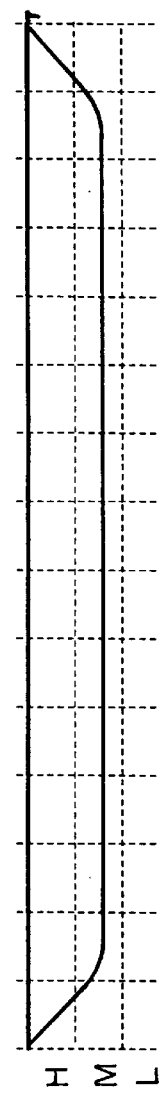
FIG.33A PIT PATTERN
FIG.33B PUSH-PULL
FIG.33C RF

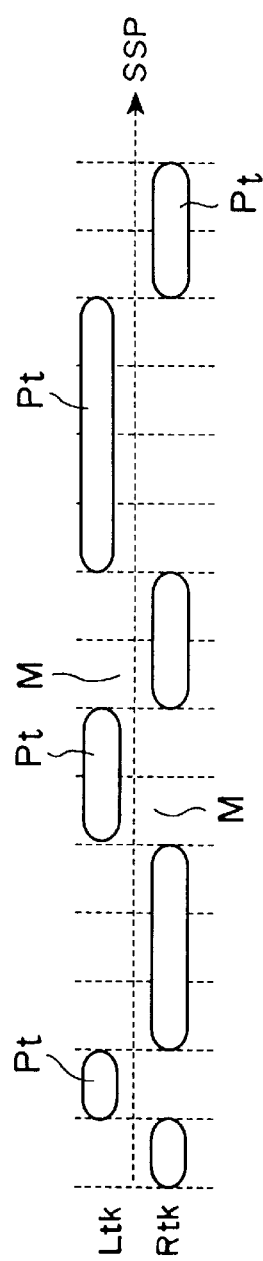
FIG. 51A PIT PATTERN
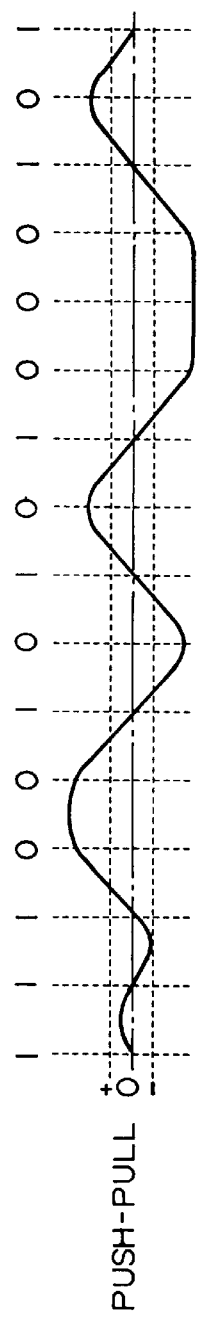
FIG. 51B PUSH-PULL
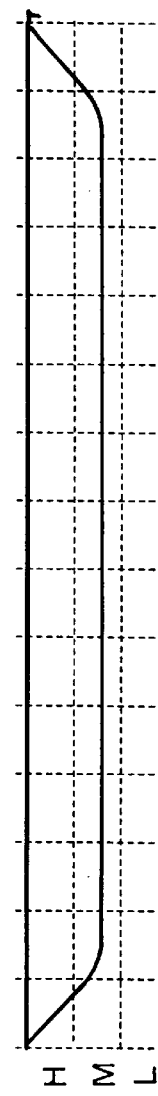
FIG. 51C RF a = 5° a = 30° a = 10° a = 45° a = 22.5°

Ex COMPONENTS (cos α)

Ey COMPONENTS (sin α)

RECORDING MEDIUM

This is a divisional of application Ser. No. 08/937,724, filed Sep. 25, 1997.

BACKGROUND OF THE INVENTION

1. Field of the Invention

The present invention relates to a recording medium suitable for recording and reproducing various data, including data for use in computers, and a driving apparatus therefor.

2. Description of the Related Art

It is common practice that various data (application programs, file data, management data, etc.) for use in computer equipment is provided through the use of recording media, such as optical disks, magneto-optic disks, or magnetic disks, and a user stores various data as desired by using these recording media.

For example, as one type of such recording media, a medium called a partial ROM disk has recently been developed. This partial ROM disk is made to have a read-only ROM area and a recordable and reproduceable, rewritable area (RAM area).

There is constantly a demand for larger-capacity recording media. For this reason, high-density recording of data is required. When a disk-shaped recording medium is considered, it is required that the circular track pitch be made narrower.

However, due to various reasons, such as the difficulty in reducing the wavelength of the laser beam in optical heads, the problem of crosstalk caused thereby, and the difficulty of circular tracking control, there is a limitation in making the circular track pitch narrower, and a large capacity is difficult to achieve for practical use.

Further, there has been a demand for a recording and reproduction system to have a higher transfer rate in order to achieve a high-speed recording and reproduction operation when a recording medium is used. In connection with this, the recording medium is required to have a track structure and a data structure suitable for a high transfer rate.

In addition to the structure of what are commonly called read-only ROM disks and recordable RAM disks, when such a structure as that of the above-described partial ROM disk is considered, a format suitable for the integration of what is commonly called read-only pits and lands/grooves formed in a recordable area is in demand.

SUMMARY OF THE INVENTION

In view of such circumstances, the present invention aims to realize a narrower track pitch and a larger capacity while maintaining sufficient practicality. Further objects of the present invention are to realize a higher transfer rate and to realize a format suitable for the integration of read-only pits and lands/grooves formed in a recordable and reproduceable area.

To achieve the above-described goals, according to one aspect of the present invention, there is provided a disk-type recording medium, comprising: a disk-shaped base; a servo area which is provided on the base and in which a plurality of pits for obtaining a servo signal are formed; and a data area which is provided on the base and into and from which information can be recorded and reproduced, wherein one unit area is formed by one the servo area and one the data area, one track is formed of a plurality of the unit areas, and a first track on which the data area is formed on lands and a second track on which the data area is formed on grooves are formed alternately for each track.

According to another aspect of the present invention, there is provided a driving apparatus for driving a disk-type recording medium, comprising: an optical pickup for radiating laser light onto a disk-type recording medium and receiving laser light reflected from the disk-type recording medium, which disk-type recording medium has a servo area in which pits for obtaining a servo signal are formed, and a recordable area into and from which information can be recorded and reproduced, one unit area is formed of the one servo area and the one data area, one track is formed of a plurality of the unit areas, and tracks on which the data area is formed on lands and tracks on which the data area is formed on grooves are formed alternately for each track; rotation driving means for rotating the disk-type recording medium; tracking means for controlling the radiation position of laser light so that the laser light is radiated onto tracks of the disk-type recording medium; servo information generation means for generating servo information in accordance with a servo signal reproduced from the servo area by means of the optical pickup; and control means for controlling the tracking means in accordance with the servo information so that a spot by the laser light scans along the center of the grooves and the center of the lands each time the disk-type recording medium is rotated once.

According to a further aspect of the present invention, there is provided a manufacturing apparatus for manufacturing a disk-type recording medium having a first area formed of one spiral track and a second area formed of two spiral tracks which do not intersect with each other, the manufacturing apparatus comprising: rotation means for rotationally driving the disk-type recording medium; laser means for radiating laser light onto the disk-type recording medium; movement means for moving the radiation position of the laser light in the radial direction of the disk-type recording medium; and control means for switching between a first mode in which pits are formed in the first area by causing the laser means to radiate laser light while the disk-type recording medium is rotated by the rotation means and the laser means is moved in a first direction along the radial direction of the disk-type recording medium at a first velocity by means of the movement means, and a second mode in which pits are formed in the second area by causing the laser means to radiate laser light while the disk-type recording medium is rotated by the rotation means and the laser means is moved in the first direction at a second velocity twice as fast as the first velocity by means of the movement means, and by causing the laser means to move in a second direction opposite to the first direction by a distance equal to the distance at which the laser means was moved at the first velocity during the time in which the disk-type recording medium is rotated half when the disk-type recording medium reaches an angular position determined by the rotation means.

According to still a further aspect of the present invention, there is provided a method of manufacturing a disk-type recording medium having a first area formed of one spiral track and a second area formed of two spiral tracks which do not intersect with each other, the method comprising the steps of: rotationally driving the disk-type recording medium; causing laser means to radiate laser light onto the disk-type recording medium; forming pits in the first area by causing the laser means to radiate laser light while the laser means is moved in a first direction along the radial direction of the disk-type recording medium at a first velocity in a state in which the disk-type recording medium is being rotated; forming pits in the second area by causing the laser means to radiate laser light while the laser means is moved in the first direction at a second velocity twice as fast as the first velocity in a state in which the disk-type recording medium is being rotated; and causing the laser means to move by a distance equal to the distance at which the laser means was moved at the first velocity while the disk-type recording medium is rotated half in a second direction opposite to the first direction when the disk-type recording medium reaches a predetermined angular position while pits are being formed in the second area.

The above and further objects, aspects and novel features of the invention will become more apparent from the following detailed description when read in connection with the accompanying drawings.

BRIEF DESCRIPTION OF THE DRAWINGS

FIGS. 7A, 7B and 7C are illustrations of servo pits of the disk according to the embodiment of the present invention.

FIGS. 8A, 8B, 8C and 8D are illustrations of servo pits of the disk according to the embodiment of the present invention.

FIGS. 9A and 9B are illustrations of address segments of the disk according to the embodiment of the present invention.

FIGS. 19A and 19B are illustrations of a two-channel twin-pit method and a logical twin-pit method according to the embodiment of the present invention.

FIG. 21 is an illustration of a detector within a reproduction apparatus of the twin-pit-type ROM disk according to the embodiment of the present invention.

FIGS. 22A, 22B, 22C, and 22D are illustrations of photoreceiving patterns in the detector within the reproduction apparatus of the twin-pit-type ROM disk according to the embodiment of the present invention.

FIGS. 24A, 24B, 24C, 24D and 24E are illustrations of a twin-pit-type ROM disk having wobble pits according to the embodiment of the present invention.

FIGS. 33A, 33B, and 33C are illustrations of RF signal levels and push-pull signal levels of the twin-pit single-data-type ROM according to the embodiment of the present invention.

FIGS. 51A, 51B and 51C are illustrations of RF signal levels and push-pull signal levels of the twin-pit single-data-type ROM according to the embodiment of the present invention.

DESCRIPTION OF THE PREFERRED EMBODIMENT

The embodiment of a recording medium of the present invention will be described below in the following sequence. In the description, as examples of recording media, ROM disks, RAM disks and partial ROM disks are used.

[Disk Format]

<Structure and Types of Disks>

First, the structure and types of an optical disk of the present invention will be described.

This optical disk is made to be an optical disk of a zone CAV method and a sample hold method.

Figure 1:
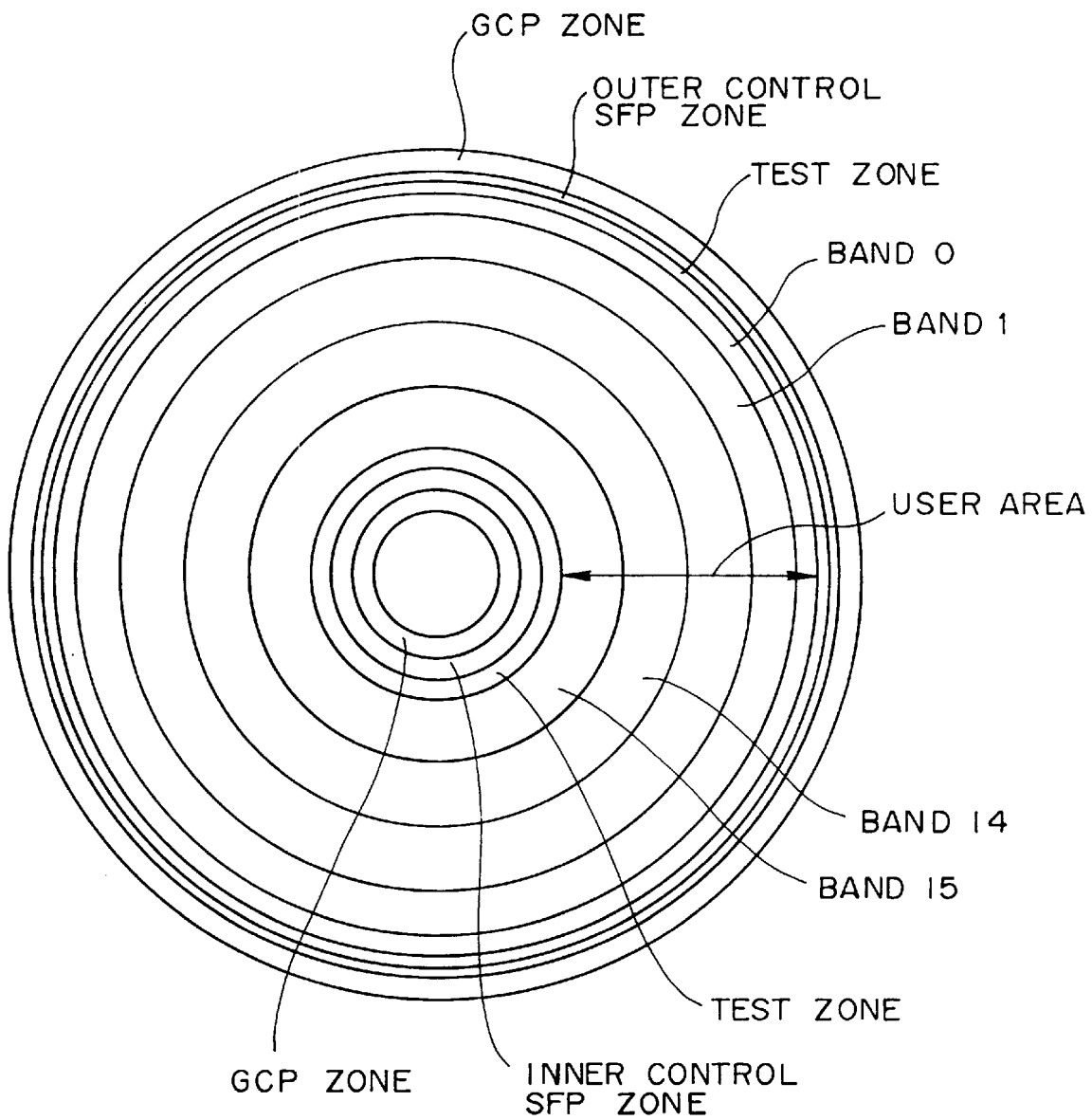
FIG. 1 is an illustration of the zone structure of a disk according to an embodiment of the present invention.
Figure 2:
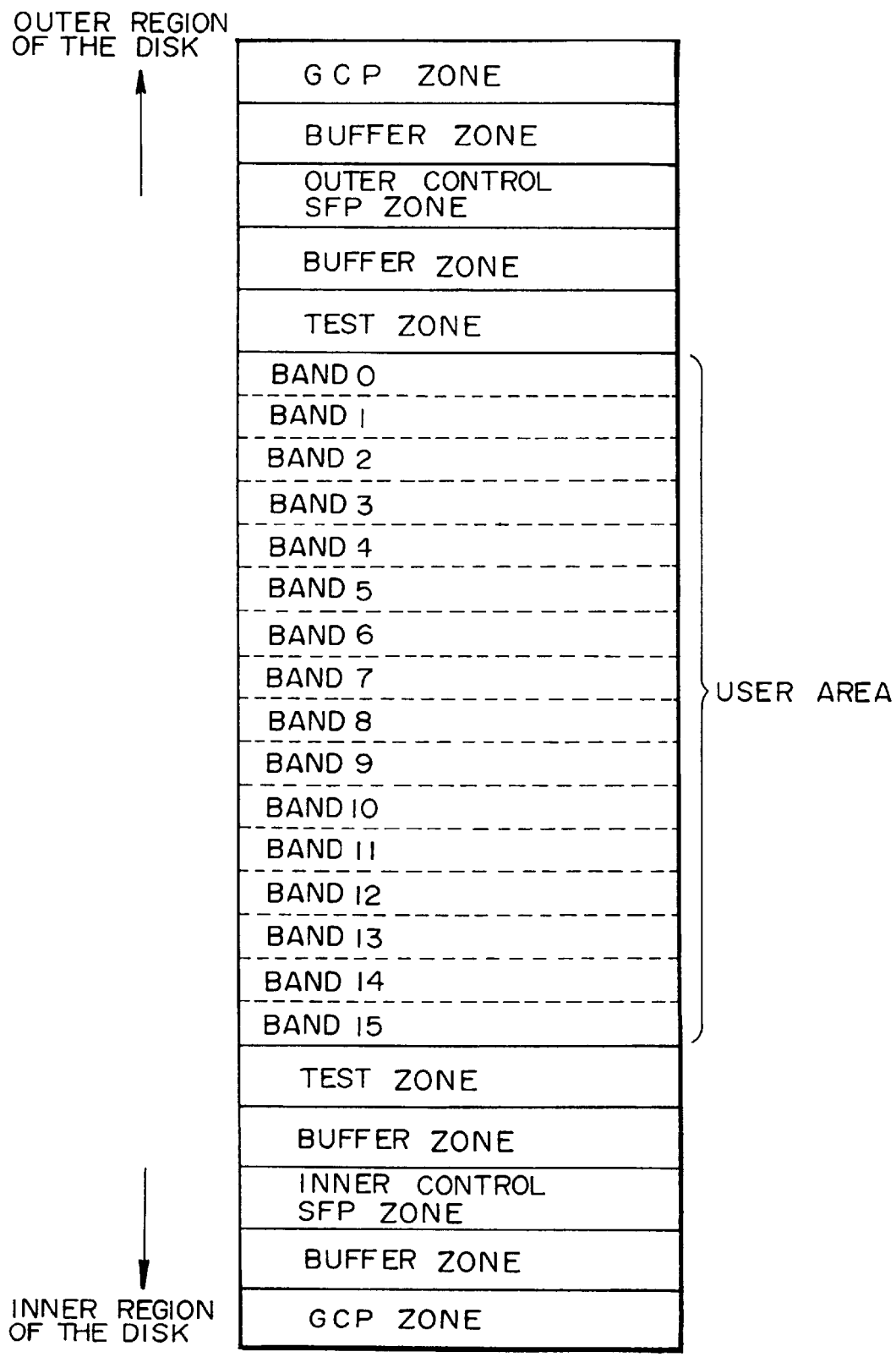
FIG. 2 is an illustration of the zone structure of the disk according to the embodiment of the present invention.

FIGS. 1 and 2 show the zone structure from the outer region of a disk of this embodiment to the invention. FIG. 1 shows the zone structure in the form of a disk image. FIG. 2 schematically shows the zone structure when viewed in the radial direction of the disk.

As can be seen from FIGS. 1 and 2, a GCP (Gray Code Part) zone for 736 tracks is provided in the outermost region of the disk, and toward the inner region a buffer zone for two tracks, an outer control SFP zone for five tracks, a buffer zone for two tracks and a test zone for five tracks are provided. In FIG. 1, the description of the buffer zones is omitted.

Further, following the test zone, a user area, serving as a main data area, formed of a rewritable (recordable) area ARW in which a user can perform desired recording of data and a read-only ROM area AE are formed. The user area is divided into 16 bands (16 zones) of band 0 to band 15.

A predetermined number of tracks is specified for each band, respectively. For example, band 0 is specified to have 848 tracks, band 1 to have 864 tracks, band 2 to have 880 tracks and so on.

In the region farther inward than the user area, there are provided a test zone for five tracks, a buffer zone for two tracks, an inner control SFP zone for five tracks, a buffer zone for two tracks, and a GCP zone for 820 tracks.

The GCP zone, the outer control SFP zone and the inner control SFP zone are each formed to be an area in which predetermined control information is recorded, and user data is not recorded.

This disk is made to be what is commonly called a zone CAV disk, and 16 bands of band 0 to band 15 of the user area are provided therein.

The zone CAV method causes an optical disk to rotate at a fixed velocity, makes the recording density of each zone nearly constant by varying the clock frequency for extracting data recorded in each zone (band), and thus makes it possible to easily perform disk rotation control and to increase the recording capacity in comparison with a simple CAV method.

Since in the farther outward region the linear velocity of this disk is larger, the frequency of data clock DCK used for reading data is made higher in that area.

Meanwhile, a servo clock SCK used for a servo operation to be described later has a fixed frequency regardless of the zone. Further, the data clock DCK is made to have a frequency of the servo clock SCK multiplied by M/N.

Each of the 16 bands of the user area can be made to be a read-only area (ROM area) AE in which data has been recorded entirely by embossed pits, and can also be made to be a rewritable area ARW in which lands/grooves are formed as what is commonly called magneto-optic areas and a user can perform recording and reproduction as desired. The number of the 16 bands which are made to be a rewritable area ARW and the number which are made to be a ROM area AE can be set as desired by the manufacturer.

As a result, various types of disk media can be realized as shown in FIGS. 3A to 3D.

Figure 3A:
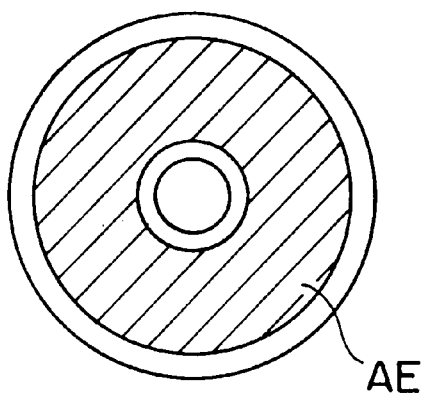
FIGS. 3A, 3B, 3C and 3D are illustrations of various disks according to the embodiment of the present invention.

FIG. 3A shows a ROM disk in which the entire user area is made to be a ROM area AE by embossed pits or the like. That is, this is a disk in which all of the bands 0 to 15 are made to be a ROM area AE.

Figure 3B:
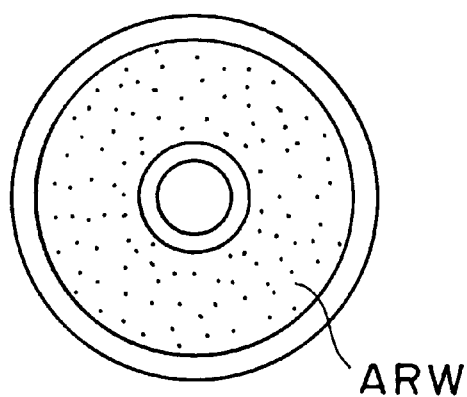

FIG. 3B shows a RAM disk in which the entire user area is made to be a recordable and reproduceable, rewritable area ARW. That is, this is a disk in which all of the bands 0 to 15 are made to be a rewritable area ARW.

Figure 3C:
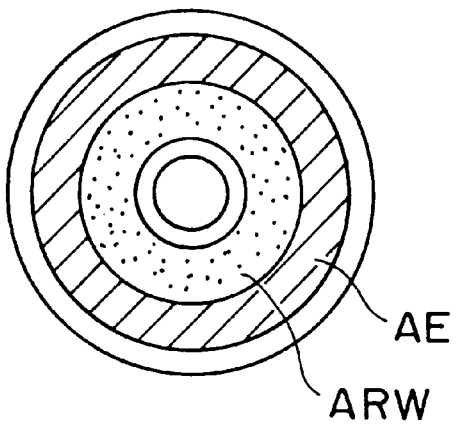
Figure 3D:
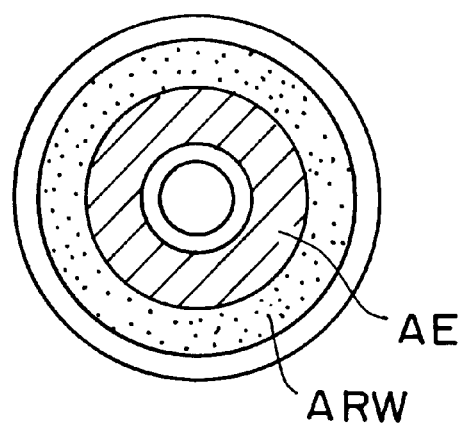

FIGS. 3C and 3D show examples of partial ROM disks; that is, the ROM area AE and the rewritable area ARW are provided in the user area of one disk. FIG. 3C shows an example of a partial ROM disk in which some bands of the outer region of the user area are made to be a ROM area AE and some bands of the inner region of the user area are made to be a rewritable area ARW. FIG. 3D shows an example of a partial ROM disk in which some bands of the outer region of the user area are made to be a rewritable area ARW and some bands of the inner region of the user area are made to be a ROM area AE.

<Structure of Tracks/Frames/Segments>

Referring to FIGS. 4, and 5A to 5D, the structure of tracks, frames and segments will be described.

Figure 4:
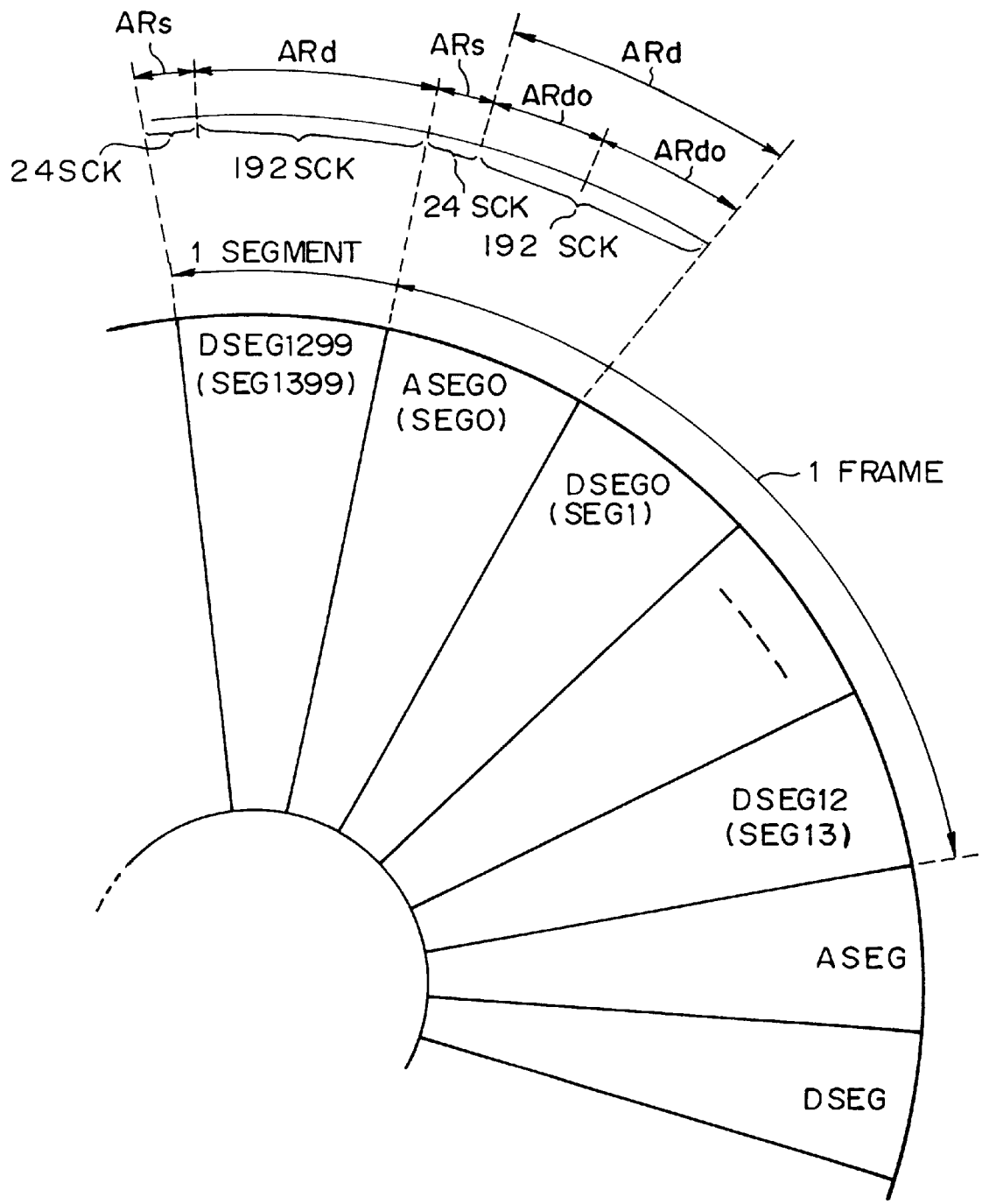
FIG. 4 is a representative view of the tracks, frames and segments of the disk according to the embodiment of the present invention.
Figure 5A:
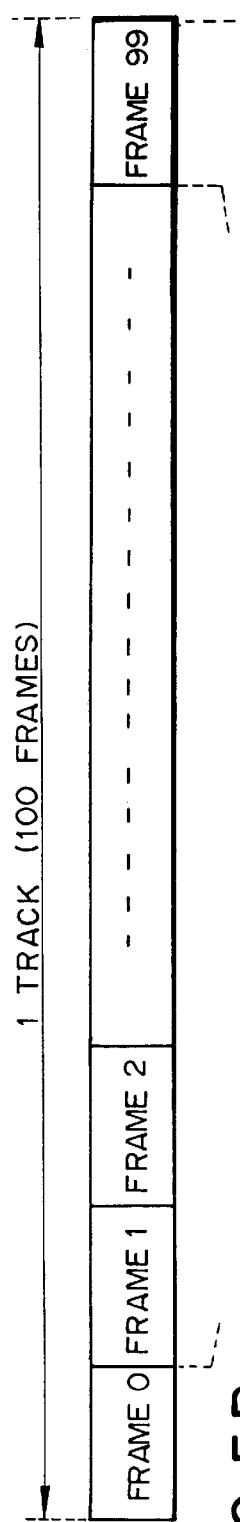
FIGS. 5A, 5B, 5C and 5D illustrations of the track, frame and segment structure of the disk according to the embodiment of the present invention.
Figure 5B:
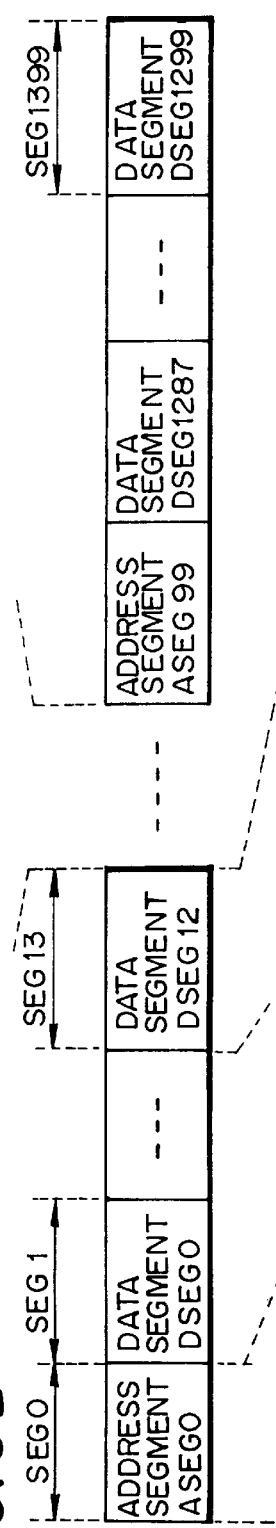
Figure 5C:
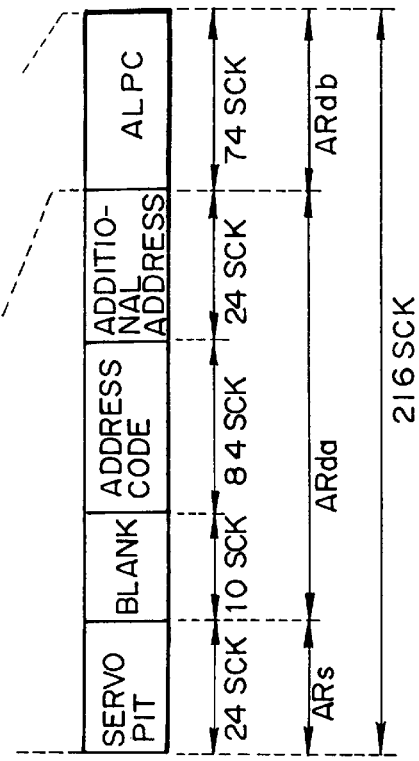

FIG. 4 schematically shows the structure of tracks, frames and segments in the circumferential direction. FIGS. 5A, 5B and 5C show the structure for one track (one circular track) in the shape of a band.

First, as shown in FIG. 5A, one track, i.e., the area of one circular disk is formed of 100 frames of frame 0 to frame 99.

As shown in FIG. 5B, a unit area of 14 segments is formed in one frame. Therefore, one track is formed of 1400 segments.

FIG. 4 shows that one circular track of the optical disk is divided into 1400 segments (segments SEG0 to SEG1399). It is also shown that 14 segments (e.g., SEG0 to SEG13) form one frame.

Segments SEG0 to SEG1399 shown in FIG. 4 are classified into address segments ASEG0 to ASEG99 and data segments DSEG0 to DSEG1299 as their content type. Hereinafter, when a certain segment is indicated in the description, the following notation of segment SEG(x), address segment ASEG(x) and data segment DSEG(x) is used.

Position information (i.e., track number) in the radial direction on the disk and position information (i.e., segment number) in the tangential direction have previously been recorded by embossed pits in the address segments ASEG (x).

One address segment ASEG(x) is present for every 14 segments. That is, there is one address segment ASEG(x) in one frame. Therefore, there are 100 address segments ASEG0 to ASEG99 in one track.

The address segments ASEG0 to ASEG99 become the beginning segment of frame 0 to frame 99, respectively.

There are 13 segments in the track portion between a certain address segment ASEG(x) and the next address segment ASEG(x+1). These 13 segments each become data segments DSEG(x).

That is, there are 13 data segments DSEG(x), for example, as data segments DSEG0 to DSEG12 for each frame, and there are 1300 data segments (DSEG0 to DSEG1299) in one track.

Each segment (SEG0 to SEG1399) is formed of an area of 216 servo clock periods with the servo clock SCK as a reference. An area of 24 servo clock periods is formed as a servo area ARs, and an area of 192 servo clock periods is formed as a data area ARd.

Regarding the address segments (ASEG0 to ASEG99), the data area ARd is divided into an address area ARda and a laser control area ARdb.

Figure 5D:
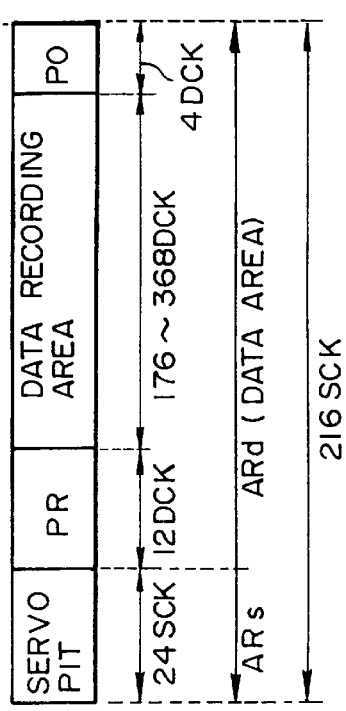

FIG. 5C shows the structure of address segments ASEG (x), and FIG. 5D shows the structure of data segments DSEG(x).

As shown in FIG. 5C, the address segment ASEG(x) has a length corresponding to 216 servo clock periods with the servo clock SCK as a reference, with a servo area (24SCK) having servo pits to be described later formed by an embossing processing or the like being provided at the beginning of the segment and the area for the next 10 servo clock periods being made blank.

The area for the next 84 servo clock periods and the following area for the 24 servo clock periods are made to be an address area and an additional address area, respectively, and an ALPC (Automatic Laser Power Control) area is provided for 74 servo clock periods at the end of the address segments.

Data in the address segment ASEG(x) has previously been recorded on the disk by, for example, embossed pits. The ALPC area is an area used to control reading laser power to a predetermined level.

The data segment DSEG is also made to be of the same length (216SCK) as that of the address segment ASEG. At the beginning of the segment, in a similar manner, a servo area (24SCK) having servo pits to be described later formed by an embossing processing or the like is provided.

After the servo area, with the data clock DCK as a reference, a prewrite area PR of length 12DCK, a data recording area and a postwrite area PO of length 4DCK are provided.

Since the frequency of the data clock DCK differs according to the above-described zones on the disk, data of length 176DCK to 368DCK is recorded according to the zone in the data recording area.

The prewrite area PR secures a distance required to preheat so that the disk reaches a stable temperature for data recording, and further functions as a clamp area for suppressing DC variations due to birefringence.

The postwrite area PO is provided as a margin area for eliminating unerasure of recorded data during overwriting.

<Sector Structure>

Next, the sector structure will be described. The tracks, frames, and segments described heretofore are physical units on the disk, but the sector is a logical unit corresponding to an actual amount of data.

For example, the outer control SFP zone consists of 100 sectors, the test zone of the outer region consists of 100 sectors, the bands 0 to 15 consist of 20800 sectors, the test zone of the inner region consists of 50 sectors, and the inner control SFP zone consists of 50 sectors.

The user data contained in one sector is specified to be 2048 bytes, and the amount of data in this sector is fixed. However, the number of bytes (the data byte capacity which can be recorded in the data recording area of one data segment DSEG(x)) per segment differs according to the zone as described above, and the number of segments which constitute one sector differs according to the zone.

For example, in the zone containing band 0, the data byte capacity per segment is 48 bytes and there are 53 segments per sector. Further, in the zone containing band 14, the data byte capacity per segment is 22 bytes and there are 110 segments per sector.

The sector begins from a certain segment and ends after the number of segments which constitute one sector. If there is space remaining within the last segment, the space is not used as the next sector, and the next sector starts from the next segment. Therefore, the start position of the sector coincides always with the start position of the segment.

Further, at the beginning of the zone, sector 0 begins from the first segment of the first frame (frame 0). Therefore, the start positions of sector 0, which are at the beginning of each zone, coincide in the radial direction.

Figure 6:
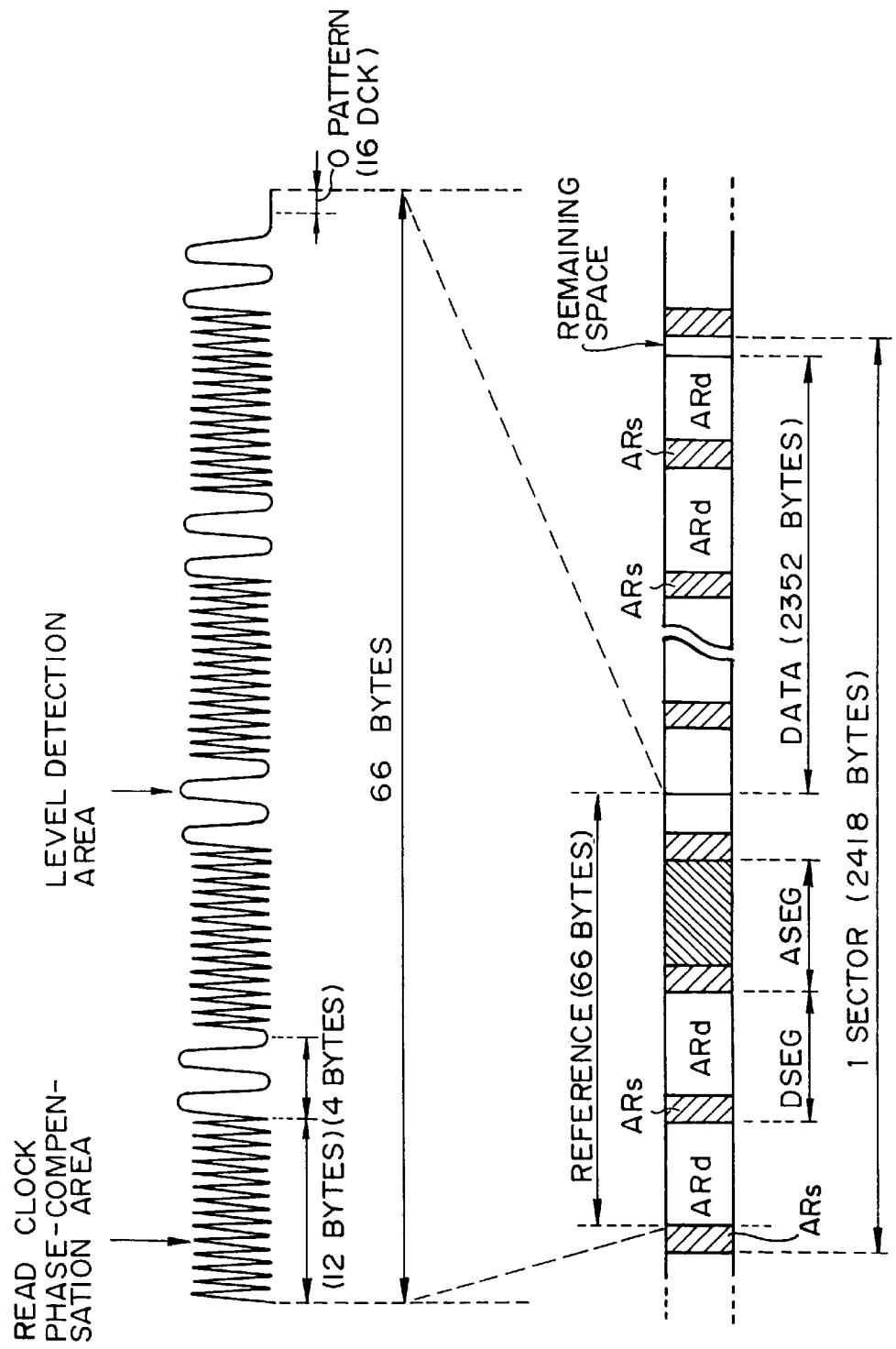
FIG. 6 is an illustration of the sector structure of the disk according to the embodiment of the present invention.

FIG. 6 shows the sector structure.

Each sector contains a total of 2352 data bytes containing 2048 bytes of user data, a redundancy code (256 bytes) of an error correction code, a CRC code (8 bytes) for error detection, and user defined data (40 bytes). Before this data, 66 bytes of reference data is added, such that one sector has a size of 2418 bytes.

The waveform of the reproduction RF signal of the reference data is shown. It is formed of four repetitions of an 8T pattern for 4 bytes and a 2T pattern for 12 bytes and further, a pattern of all "0" for 2 bytes, which serve as a margin for setting detected information. This reference data is recorded by the zone CAV method in the same manner as the user data.

The 2T pattern is used to correct for variations in the pit position due to recording power variations or the like during reproduction. Further, the 8T pattern is used to set the threshold during three-valued detection based on partial response.

<Servo Area>

As described in FIGS. 4 and 5A to 5D, in all the segments (SEG0 to SEG1399) the area for the first 24 servo clock periods is made to be the servo area ARs.

In this servo area ARs, a pit sequence of a predetermined pattern for representing tracking servo information, information for generating a servo clock and information for segment type is formed (in this specification, pits formed within the servo area ARs are referred to as servo pits).

Though described later in detail, in the example, a method called three-phase tracking is used as a tracking control method. Therefore, in this example, for the servo pits, the patterns A, B and C shown in FIG. 7A are prepared.

In each pattern in FIG. 7A, each tracking center is indicated by the solid line. All of the servo pits are formed at positions deviating by approximately ¼ track pitch (or ½ track pitch) from the tracking center. The pits are formed at three positions $PS_A$, $PS_B$ and $PS_C$ within the servo area ARs: in pattern A, pits are formed on both sides of the tracking center at position $PS_A$; at position $PS_B$, pits are formed only inward the region farther in than the tracking center; at position $PS_C$, pits are formed only in the region farther outward than the tracking center.

Further, in pattern B, at position $PS_A$ pits are formed only in the region farther outward than the tracking center; at position $PS_B$, pits are formed on both sides of the tracking center; and at position $PS_C$, pits are formed only inward the region farther in than the tracking center.

In pattern C, at position $PS_A$, pits are formed only in the region farther inward than the tracking center; at position $PS_B$, pits are formed only in the region farther outward than the tracking center; and at position $PS_C$, pits are formed on both sides of the tracking center.

Each of these patterns is not provided independently of the adjacent tracks in the radial direction of the disk, but as shown in FIGS. 7B and 7C, a sequence such that pits are formed at positions $PS_A$ and $PS_C$, a sequence such that pits are formed at positions $PS_A$ and $PS_B$, and a sequence such that pits are formed at positions $PS_B$ and $PS_C$ are arrayed in sequence. As a result, patterns A to C are seen when viewed from the tracking center indicated by the solid-line arrows.

In other words, when tracking control corresponding to each pattern is switched in the order: A, B, C, A, B, C, and so on, recording and reproduction scanning is performed in units of the pitch of the servo pit sequence in the direction of the track width as in FIG. 7B. On the other hand, when tracking control corresponding to each pattern is switched in the order C, B, A, C, B, A and so on, recording and reproduction scanning is performed at a pitch twice the pitch unit of the servo pit sequence in the direction of the track width as in FIG. 7C.

The three-phase tracking operation which realizes such an operation will be described later. First, the structure of the servo area ARs will be described with reference to FIGS. 8A to 8D.

FIG. 8A shows the servo area ARs in the address segment ASEG(x). FIGS. 8B to 8D each show the servo area ARs in the data segment DSEG(x).

Further, FIGS. 8A to 8D show examples of the servo area ARs in which the pattern of the servo pits is pattern A in FIG. 7A.

The timing position of 24 servo clock periods (SCK) are shown in the upper part in FIGS. 8A to 8D. The servo pits in FIGS. 8A to 8D are each formed into a pit of length 2SCK. All the servo pits are formed as embossed pits.

For the sake of description, the timing positions within the servo area ARs corresponding to each timing of the 24 servo clock, are called positions 1 to 24 in correspondence with the upper-part numerals. Position $PS_A$ is made to be in the interval from position 3 to position 7, and pits of length 2SCK are formed in this interval. Further, position $PS_B$ is made to be in the interval from position 11 to position 12, and position $PS_C$ is made to be in the interval from position 16 to position 17.

The central positions of the servo pits formed at each of the positions $PS_A$, $PS_B$ and $PS_C$ are separated from each other by at least 5SCK.

Further, all of the servo pits are formed at a position deviating from the tracking center by ±¼ track pitch (or ±½ track pitch).

Since the servo pits in the servo area ARs are each made to be of length 2SCK, the portion where embossed pits are not formed, i.e., the mirror portion, reduces, thus making it possible to suppress an occurrence of ghost pits and the like during disk molding. Further, during access, since an RF signal is reproduced stably from the servo pits, it becomes possible to stably generate various servo signals, such as a tracking servo signal, in accordance with the RF signal reproduced from the servo pits.

Furthermore, by setting the interval between the centers of each servo pit to a predetermined interval or more, it is possible to minimize data interference between RF signals reproduced from each servo pit. In order to reduce this data interference, it is preferable that each servo pit be separated at least by 5SCK or more as in this example.

The operation of what is commonly called a three-phase tracking is realized by such an RF signal obtained by servo pits, and a servo clock SCK (and a data clock DCK generated by frequency-dividing the servo clock SCK) is generated.

The area for 6SCK of positions 18 to 23 is referred to as a focus sample area ARfs.

The focus sample area ARfs is the mirror portion, and this focus sample area ARfs is used to perform focus servo, automatic control of read power (APC: Automatic Power Control), or a process for clamping an RF signal in the disk recording and reproduction apparatus.

It is difficult to accurately specify the positions of various sample pulses for the purpose of these processes, and variations of ±0.5 servo clock periods or less are expected. Therefore, in order that even when such variations are introduced, sampling is performed with accurate values without being affected by the modulation of the level of the RF signal due to the servo pits, the area ARfs is set at 6SCK in length.

There are four types of position $PS_A$, which are shown in FIGS. 8A to 8D as servo pit positions. The type of segment is represented by the position of this servo pit.

In the case of the address segment ASEG(x), servo pits are formed at positions 3 and 4 at the position $PS_A$. That is, this servo pit functions as an address mark ADM.

In the case of the data segment DSEG(x) which is the beginning of a sector, servo pits are formed at positions 4 and 5 at the position $PS_A$. That is, this servo pit functions as a first sector mark STM1.

In the case of the data segment DSEG(x) whose next segment is the beginning of a new sector, servo pits are formed at positions 5 and 6 at the position $PS_A$. That is, this servo pit functions as a second sector mark STM2.

Regarding the segments which do not apply to FIGS. 8B and 8C of the data segment DSEG(x), servo pits are formed at positions 6 and 7 at the position $PS_A$. That is, this servo pit functions as a segment mark SGM.

The information for the segment type indicated by the position of the servo pit within the position $PS_A$ as described above can be detected by checking the position at which the RF signal reproduced by what is commonly called a differential detection method (difference maximum-value detection) assumes a maximum amplitude value.

The information for the segment type indicated by the position of the servo pit within this position $PS_A$ makes it unnecessary to record sector numbers and track addresses in sector units.

<Address Segment>

Figure 10:
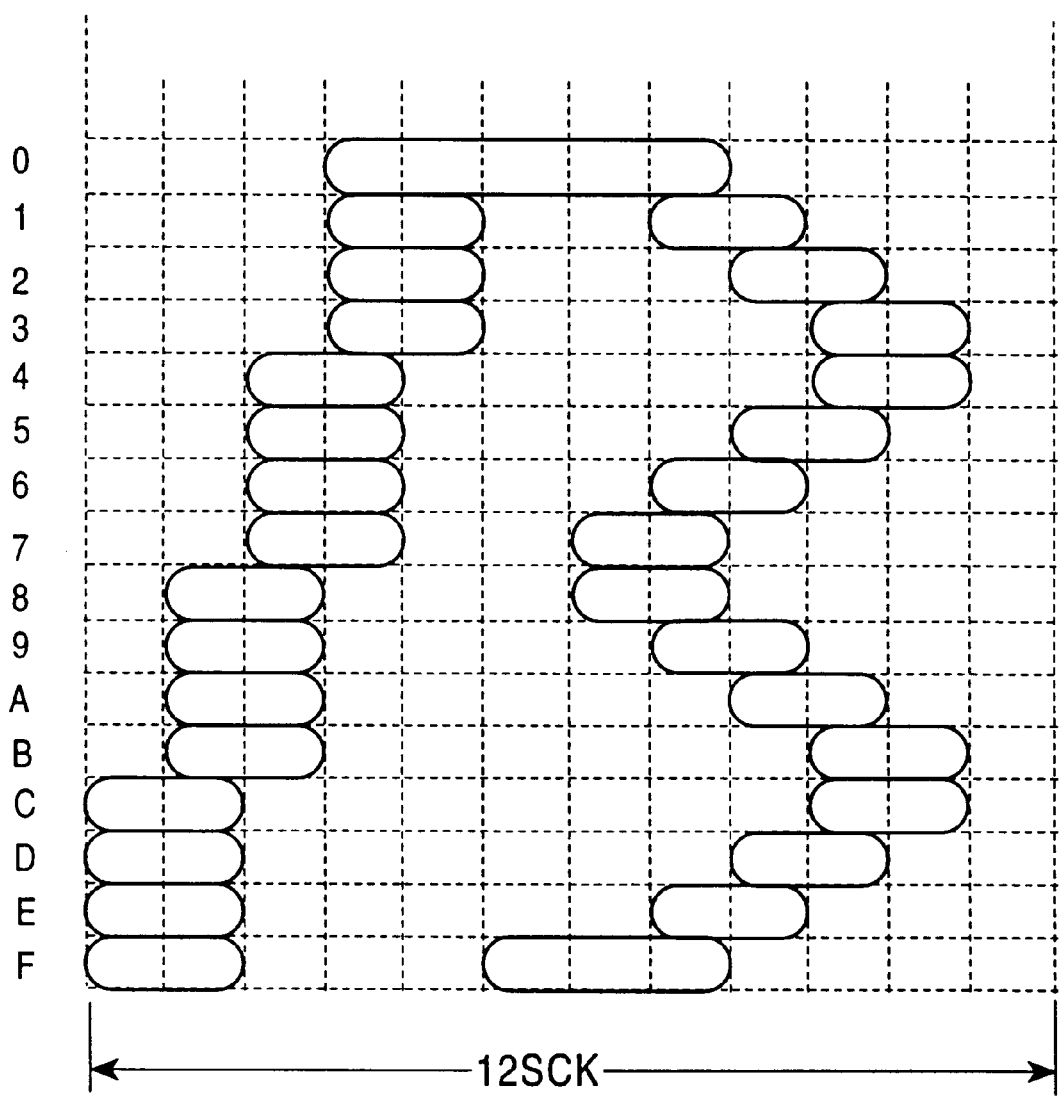
FIG. 10 is an illustration of Gray code data of the address segment of the disk according to the embodiment of the present invention.

Referring to FIGS. 9A, 9B and 10, the address segment ASEG(x) will be described.

The structure of the address segment ASEG(x) was described in FIG. 3C. FIG. 9A shows the same contents as those of FIG. 3C. The detailed structure of the address code recorded in the area of 84SCK and the additional address recorded in the area of 24SCK is shown in FIG. 9B.

The address code and the additional address are recorded beforehand by an embossing processing or the like and indicate the positional information in the track direction. The address code and the additional address have codes shown in FIG. 9B.

More specifically, as address codes, access codes (AM, A2, A3, AL, and parity) and frame codes (FM and FL) are provided, and as additional addresses, additional access codes (SM1 and SM2) are provided. Each code is respectively recorded in an area for 12SCK in terms of the servo clock SCK.

The access codes (AM, A2, A3, and AL) are such that a 16-bit track address is divided into groups of 4 bits and each group of 4 bits is coded as a Gray code.

More specifically, the 16-bit address is divided into groups of 4 bits from the upper order thereof, and each group of 4 bits is coded as a Gray code and recorded as bits at the first to twelfth positions in the area for 12SCK which are each specified by the servo clock SCK.

Further, a parity of length 12SCK is added to the track address represented as access codes (AM, A2, A3, and AL). This parity is formed as an even-number parity for four bits at the same positions of the access codes (AM, A2, A3, and AL) which represent a track address.

The track address is an address which indicates the positional information of the track on the disk.

The frame codes FM and FL are such that an 8-bit frame address is divided into groups of 4 bits, and each group of 4 bits is coded as a Gray code and recorded as bits at the first to twelfth positions which are each specified by the servo clock SCK.

The frame address indicates a frame (frames 0 to 99 shown in FIG. 5A) within the track.

The additional address codes SM1 and SM2 are each formed into a 4-bit code. The additional address indicates in which segment the first segment of the sector is present when the current frame contains the beginning (STM1) of the sector. When the beginning of the sector mark is not contained in the current frame, the additional address indicates in which segment of which frame the first segment of the sector is present.

More specifically, the additional access code SM1 indicates the distance (0 to 4 in this example) in frame units to the beginning of the sector, and the additional access code SM2 indicates the distance (1 to 13 in this example) in segment units to the beginning of the sector. Further, when the value of the additional access code SM2 is "15", this indicates that the beginning (STM1) of the sector mark is not present.

By adding the sector positional information to the access codes as described above it is not necessary to include it in the segment identification information within the servo area ARs.

FIG. 10 shows an example of a method of coding 4-bit data into a Gray code and recording it in an area of 12SCK.

0 to F are the values of the 4-bit codes. As shown in FIG. 10, bits corresponding to these values are formed within the interval of 12SCK.

The above-described access codes, frame codes and additional access codes are coded into Gray codes according to the table shown in FIG. 10.

[Tracking Operation]

<Three-Phase Tracking Operation ①>

Figure 11:
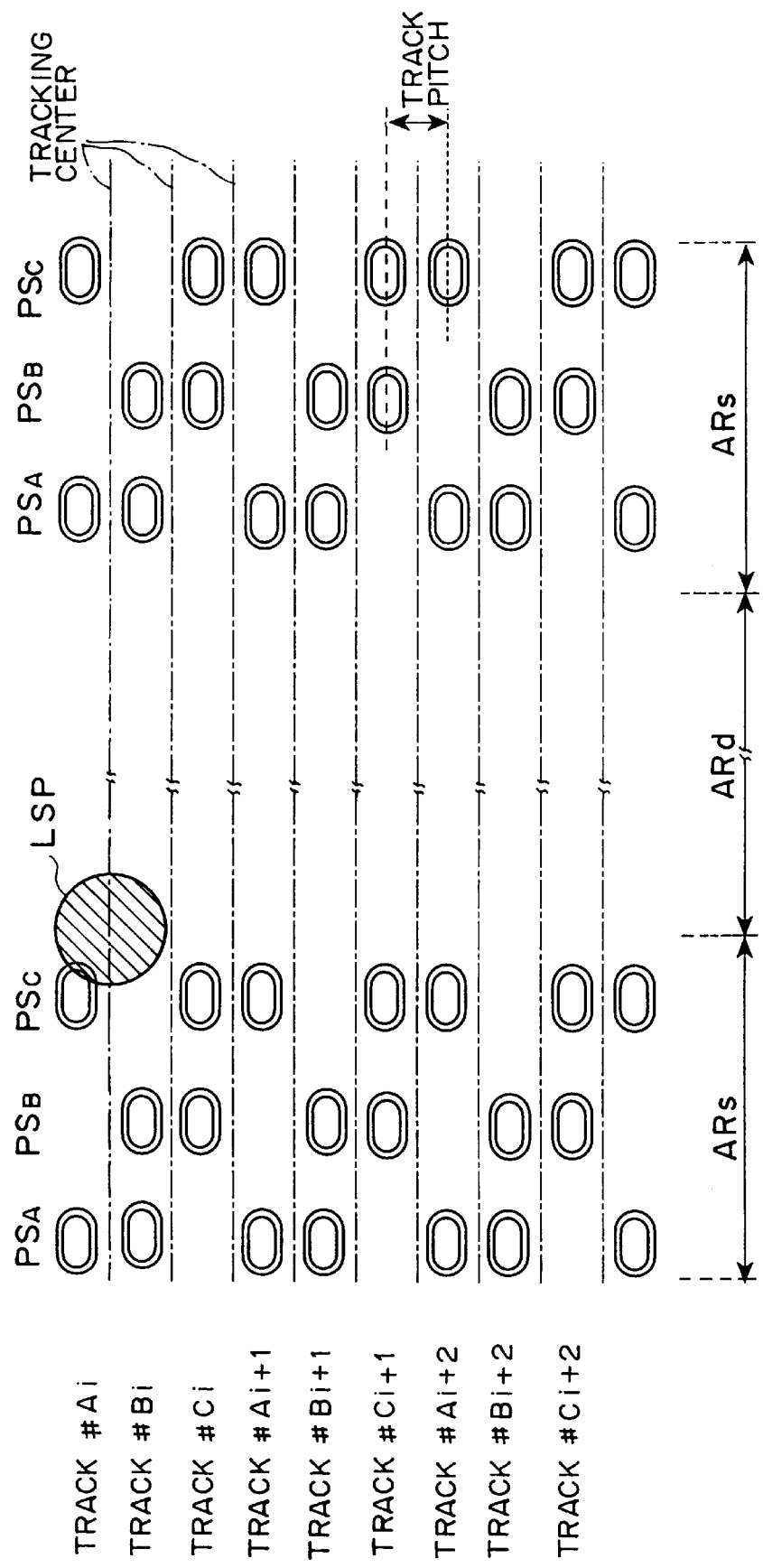
FIG. 11 is an illustration of a three-phase tracking operation of the disk according to the embodiment of the present invention.
Figure 12:
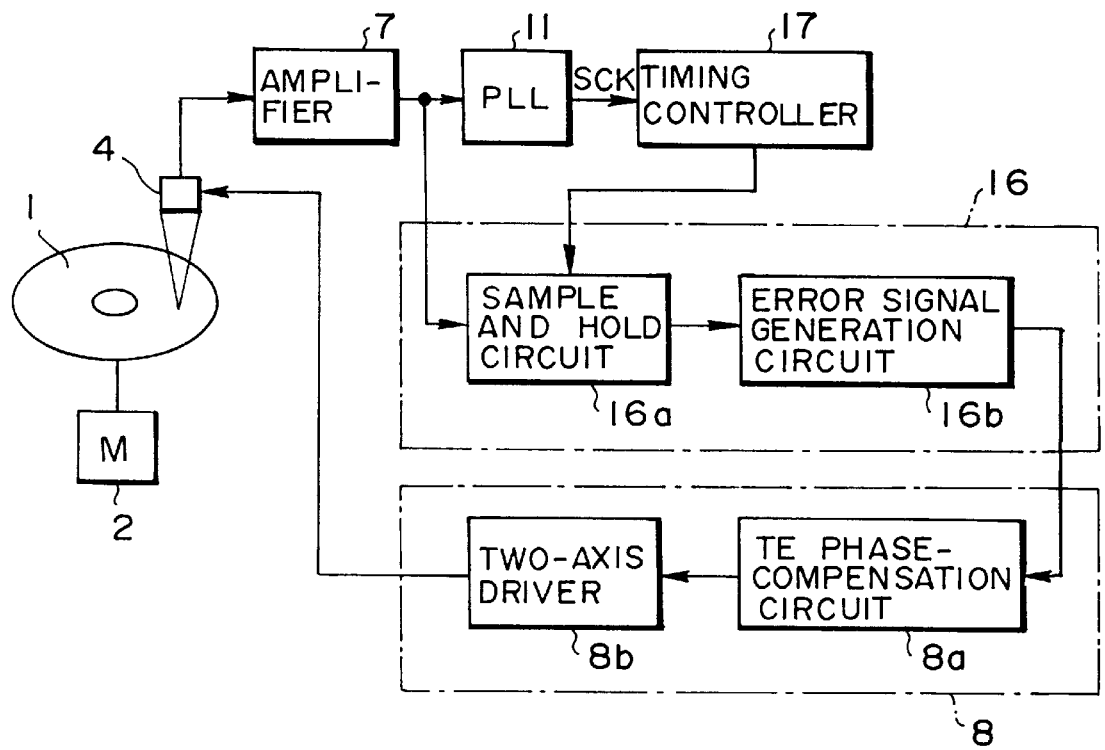
FIG. 12 is a block diagram of a tracking servo system which performs a three-phase tracking operation of the disk according to the embodiment of the present invention.

A three-phase tracking operation in this example will be described with reference to FIGS. 11 to 14, and 15A to 15E. FIG. 11 shows a scanning representation of a laser spot LSP on a servo pit formed in the servo area ARs. FIG. 12 is a block diagram illustrating the construction of the essential portion of a tracking control system in an optical-disk recording and reproduction apparatus which records data into and reproduces data from a disk of this example.

The overall construction of the optical-disk recording and reproduction apparatus will be described later with reference to FIG. 52, and only the tracking control system will be described here.

The servo pits shown in FIG. 11 are formed of patterns A to C, and the necessary pattern is formed in each servo area ARs on each track, as shown in FIGS. 7A to 7C.

In this example of FIG. 11, on a servo pit track #Ai (i=1, 2, 3 . . . ), a servo pit is formed at positions $PS_A$ and PSC. On a servo pit track #Bi, a servo pit is formed at positions $PS_A$ and $PS_B$. On a servo pit track #Ci, a servo pit is formed at positions $PS_B$ and $PS_C$. The servo pit tracks #Ai, #Bi and #Ci mentioned here are such that a servo pit sequence is referred to as servo pit tracks for the sake of description, and is not based on a track (a data pit sequence, groove or land) on which data is actually recorded.

A track on which data is recorded and a servo pit track may be tracks which are coincident with each other in the direction of the scanning line or may be tracks which are not coincident with each other in the direction of the scanning line. The case in which they are not coincident with each other is a case in which, for example, the center of two servo pit tracks coincides with the center of the data track.

The track pitch of the servo pit tracks #Ai, #Bi and #Ci is made to be ½ of the size (diameter) of the laser spot LSP on the recording surface.

By using such servo pits, the tracking servo system of FIG. 12 performs what is commonly called a three-phase tracking operation.

In the tracking servo system in FIG. 12, a laser beam is radiated onto an optical disk 1 first, and an RF signal used to generate a tracking error signal is extracted by an optical pickup 4 which detects the amount of reflected light from the recording surface and by an I/V conversion matrix amplifier 7 which performs processing on the signal corresponding to the amount of light obtained by the optical pickup 4. The optical disk 1 is rotationally driven by a spindle motor 2.

The RF signal output from the I/V conversion matrix amplifier 7 is supplied to a PLL circuit 11, whereby a servo clock SCK which is synchronized with the RF signal is generated by what is commonly called a phase locked loop. (A description of the clamp circuit 9 and the A/D converter 10 shown between the I/V conversion matrix amplifier 7 and the PLL circuit 11 in FIG. 52 are omitted here, and the operation of each section will be described later.)

The generated servo clock SCK is supplied to a timing controller 17. The timing controller 17 generates a sampling clock or the like in accordance with the servo clock SCK. The sampling clock from this timing controller 17 is supplied to a sample hold circuit 16a within a tracking error generation section 16.

The RF signal output from the I/V conversion matrix amplifier 7 is supplied to the sample hold circuit 16a. The sample hold circuit 16a samples and holds the RF signal in accordance with the sampling clock. This sample hold output is supplied to an error signal generation circuit 16b.

The output from the sample hold circuit 16a is what is commonly called a three-phase signal. The error signal generation circuit 16b determines the difference between each pair of three-phase signal from the sample hold circuit 16a and generates a tracking error signal by cyclically switching and selecting these difference signals. Phase compensation is performed on the generated tracking error signal by a phase-compensation circuit 8a in a servo controller 8, and then the signal is supplied to a two-axis driver 8b and output as a tracking drive signal. The tracking drive signal is applied to a tracking coil in the two-axis mechanism within the optical pickup 4, thereby causing an object lens of the optical pickup 4 to be moved in the tracking direction so as to perform the tracking servo operation.

Further, in this tracking servo system, as shown in FIG. 11 and describe above, tracking servo is performed by using servo pits formed in adjacent tracks, e.g., the servo pit track #A and the servo pit track #B, the servo pit track #B and the servo pit track #C, or the servo pit track #C and the servo pit track #B, and thus data recording and reproduction as the operation of the optical-disk recording and reproduction apparatus is performed.

More specifically, the optical pickup 4 is formed of a laser-light source, a collimator lens which makes light emitted from this laser-light source parallel, an object lens which collects parallel light from this collimator lens and radiates it onto the recording surface of the optical disk 1, a beam splitter which separates the light reflected by this recording surface, a detector for detecting the amount of reflected light separated by this beam splitter, a two-axis mechanism which causes the object lens to be moved in the focus direction in which the object lens is made to contact with or be separated from the optical disk 1 and in the tracking direction which is the radial direction of the disk 1, and others. Here, since the track pitch of the servo pits in the optical disk 1 is made to be ½ of the size of the laser spot LSP, the laser spot LSP radiates two servo pit tracks at the same time, and an RF signal in response to the amount of this reflected light is output to the I/V conversion matrix amplifier 7. The I/V conversion matrix amplifier 7 amplifies this RF signal and supplies it to the PLL circuit 11 and the sample hold circuit 16a.

The PLL circuit 11 generates a servo clock SCK on the basis of components, corresponding to the servo pit formed at one of the positions $PS_A$, $PS_B$ and $PS_C$, of the RF signal amplified by the I/V conversion matrix amplifier 7 and supplies the generated servo clock SCK to the timing controller 17. When data has already been recorded, the clock reproduction operation in the PLL circuit 11 may be performed on the basis of the components of the RF signal corresponding to the disk pits in place of the servo pits.

The timing controller 17 generates a timing sampling clock corresponding to the positions $PS_A$, $PS_B$ and $PS_C$ in the servo area ARs on the basis of the servo clock SCK and supplies this sampling clock to the sample hold circuit 16a.

The sample hold circuit 16a samples and holds the RF signal from the I/V conversion matrix amplifier 7 by using the sampling clock from the timing controller 17, and supplies the obtained three-phase signal having mutually different phase to the error signal generation circuit 16b.

Figure 15A:
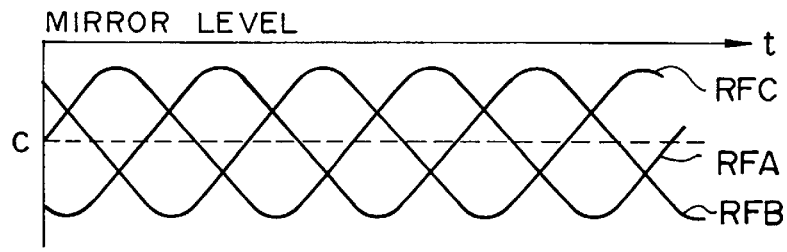
FIGS. 15A, 15B, 15C, 15D and 15E illustrations of a three-phase tracking operation of the disk according to the embodiment of the present invention.

That is, as shown in FIG. 15A, an RF signal RFA which is obtained by sampling and holding at a timing corresponding to the position $PS_A$, an RF signal RFB which is obtained by sampling and holding at a timing corresponding to the position $PS_B$, and an RF signal RFC which is obtained by sampling and holding at a timing corresponding to the position $PS_C$, which are sine waves and 120° out of phase with each other, are output.

Figure 14:
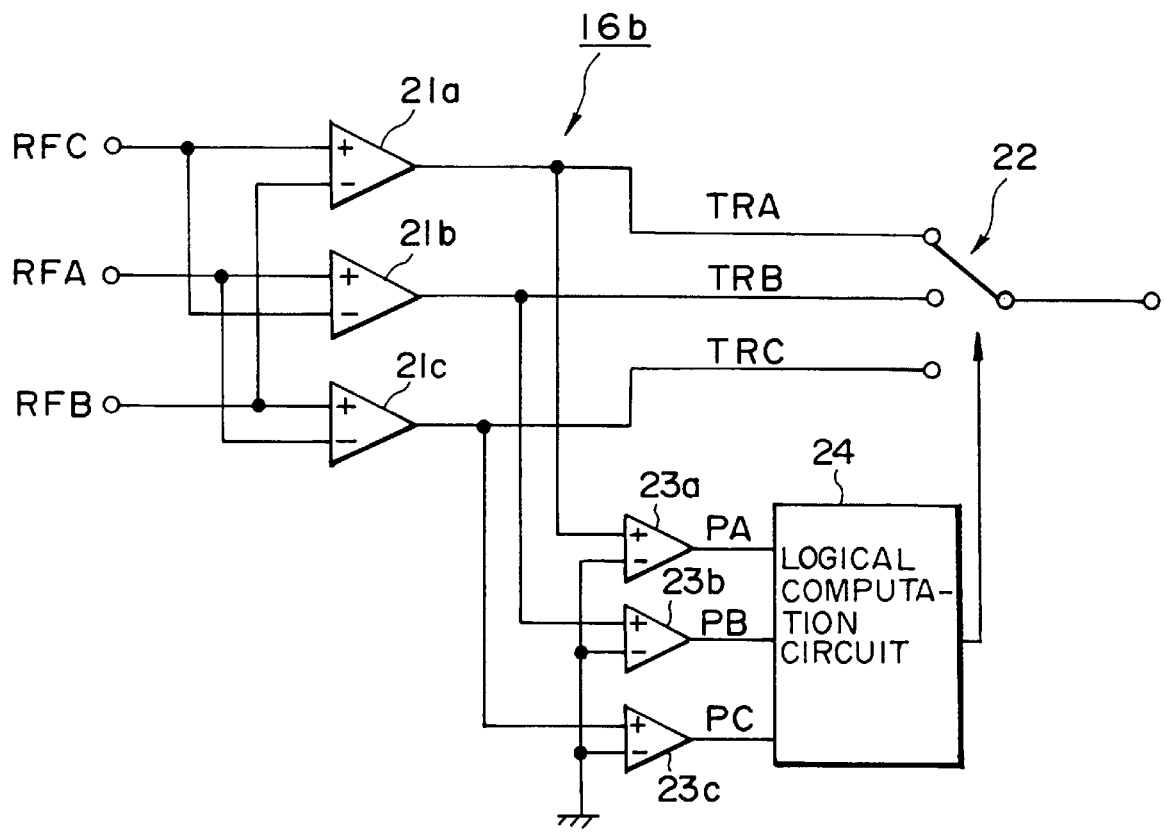
FIG. 14 is a block diagram of an error signal generation section in the tracking servo system which performs a three-phase tracking operation of the disk according to the embodiment of the present invention.

The error signal generation circuit 16b to which such RF signals RFA, RFB and RFC are supplied is constructed as shown, for example, in FIG. 14.

That is, the error signal generation circuit 16b includes differential amplifiers 21a, 21b and 21c which determine the difference between each pair of RF signals RFA, RFB and RFC from the sample hold circuit 16a, respectively, and a multiplexer 22 for switching and selecting each output from these differential amplifiers 21a, 21b and 21c. Further, the error signal generation circuit 16b includes comparators 23a and 23b for detecting the polarity of each output of the differential amplifiers 21a, 21b and 21c, and a logical computation circuit 24 for controlling the switching operation of the multiplexer 22 on the basis of the results of a predetermined logical computation on each output of these comparators 23a and 23b.

Figure 15B:
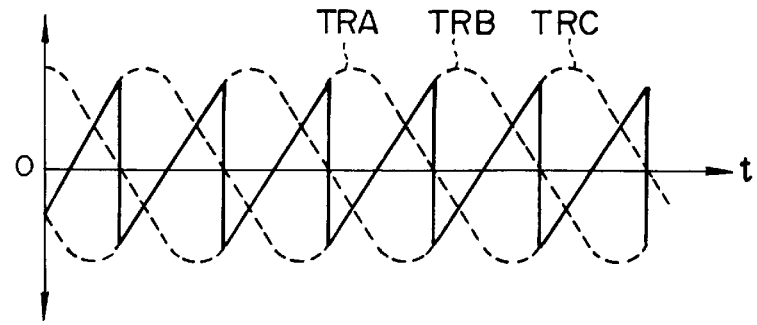

Then, as indicated by the broken line, for example, in FIG. 15B, the differential amplifier 21a generates a tracking error signal TRA by subtracting the RF signal RFB from the RF signal RFC, the differential amplifier 21b generates a tracking error signal TRB by subtracting the RF signal RFC from the RF signal RFA, and the differential amplifier 21c generates a tracking error signal TRC by subtracting the RF signal RFA from the RF signal RFB.

Therefore, the tracking error signals TRA, TRB and TRC are sine waves and become signals which are 120° out of phase with each other and which lead the RF signals RFA, RFB and RFC by 90°, respectively.

Then, the tracking error signals TRA, TRE and TRC generated in this manner are supplied to the multiplexer 22, and the comparators 23a and 23b.

The dynamic range of these tracking error signals TRA, TRB and TRC results from the diffraction at two servo pits, as shown in FIG. 11, and can be made to be a larger value than that of a conventional optical disk. In other words, it is possible to obtain a tracking error signal having a satisfactory S/N ratio.

Figure 15C:
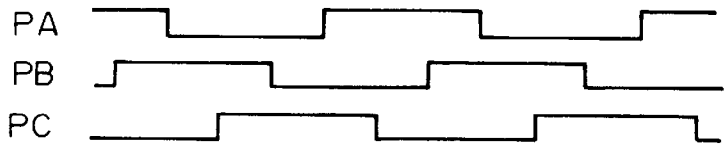

The comparators 23a and 23b detect the polarities of the tracking error signals TRA, TRB and TRC, respectively, form polarity signals PA, PB and PC which reach a logical "1" (hereinafter simply referred to as "1") when, for example, the level is positive, and supply these polarity signals PA, PB and PC to the logical computation circuit 24, as shown, for example, in FIG. 15C.

The logical computation circuit 24 computes control signals CA, CB and CC which are 120° out of phase with each other on the basis of equations (1) to (3) described below, as shown, for example, in FIG. 15D. The multiplexer 22 selects the tracking error signal TRA when the control signal CA is "1", selects the tracking error signal TRB when the control signal CB is "1", and selects the tracking error signal TRC when the control signal CC is "1".

$$CA = PC \wedge INV(PB) \quad (1)$$

$$CB = PA \wedge INV(PC) \quad (2)$$

$$CC = PB \wedge INV(PA) \quad (3)$$

In these equations (1) to (3), symbols "$\wedge$" and "INV" mean logical AND and negative logic, respectively.

Thus, the multiplexer 22 outputs a tracking error signal such that the tracking error signals TRA, TRB and TRC of three phases which are out of phase with each other are cyclically switched, as indicated by the solid line in FIG. 15B. Then, this tracking error signal is supplied to the phase-compensation circuit 8a.

The phase-compensation circuit 8a, which performs phase compensation in a servo loop, performs phase compensation of a tracking error signal from the multiplexer 22, and the tracking error signal is supplied from the two-axis driver 8b to the two-axis mechanism within the optical pickup 4 in accordance with the phase-compensated tracking error signal. As a result, the object lens is moved in the radial direction of the disk so as to effect control so that the laser spot LSP scans in the proper tracking state, that is, the tracking error signal reaches 0.

In the above-described manner, a tracking servo control loop is formed, and tracking servo is performed. Then, in a state in which tracking servo is effected as described above, that is, in a state in which the laser spot LSP scans along the middle of the adjacent servo pit tracks, as shown, for example, in FIG. 11, recording and reproducing scanning of the tracks (a pit sequence, or land or groove) of the data area ARd between the servo area ARs and the next servo area ARs is performed.

Tracking servo can be performed stably for the entire range of the tracking error signal output from the error signal generation circuit 16b, as shown in FIG. 15B. That is, the tracking control direction can always be uniquely determined from the tracking error signal with respect to the tracking center at which the tracking error signal reaches "0" and therefore, stable tracking servo can always be effected.

Further, when the tracking error signal shown in FIG. 15B is a signal obtained when, for example, a laser beam is made to seek from the inner region to the outer region, the signal becomes a waveform which reverses the time axis, namely, in seeking from the inner region to the outer region the level always increases in the range where the level varies continuously; in contrast, in seeking from the outer region to the inner region the level always decreases. Therefore, the direction of change of the level in the range where the level varies continuously makes it possible to detect the direction of movement of the laser beam spot. In other words, it is possible to obtain a tracking error signal containing information for the seek direction.

Further, this tracking servo system does not require a divider or memory used in the conventional apparatus in order to generate a tracking error signal, and thus the tracking servo system can be formed into a single circuit construction.

The basic concept of the three-phase tracking is disclosed in U.S. Pat. No. 5,416,766 assigned to the assignee of this
<Example of Three-Phase Tracking Operation ②>

The other specific circuit construction of the above-described error signal generation circuit 16b will now be described. Circuit components which have the same functions as those of the above-described error signal generation circuit 16b shown in FIG. 14 are given the same reference numerals and therefore, a description thereof has been omitted.

Figure 16:
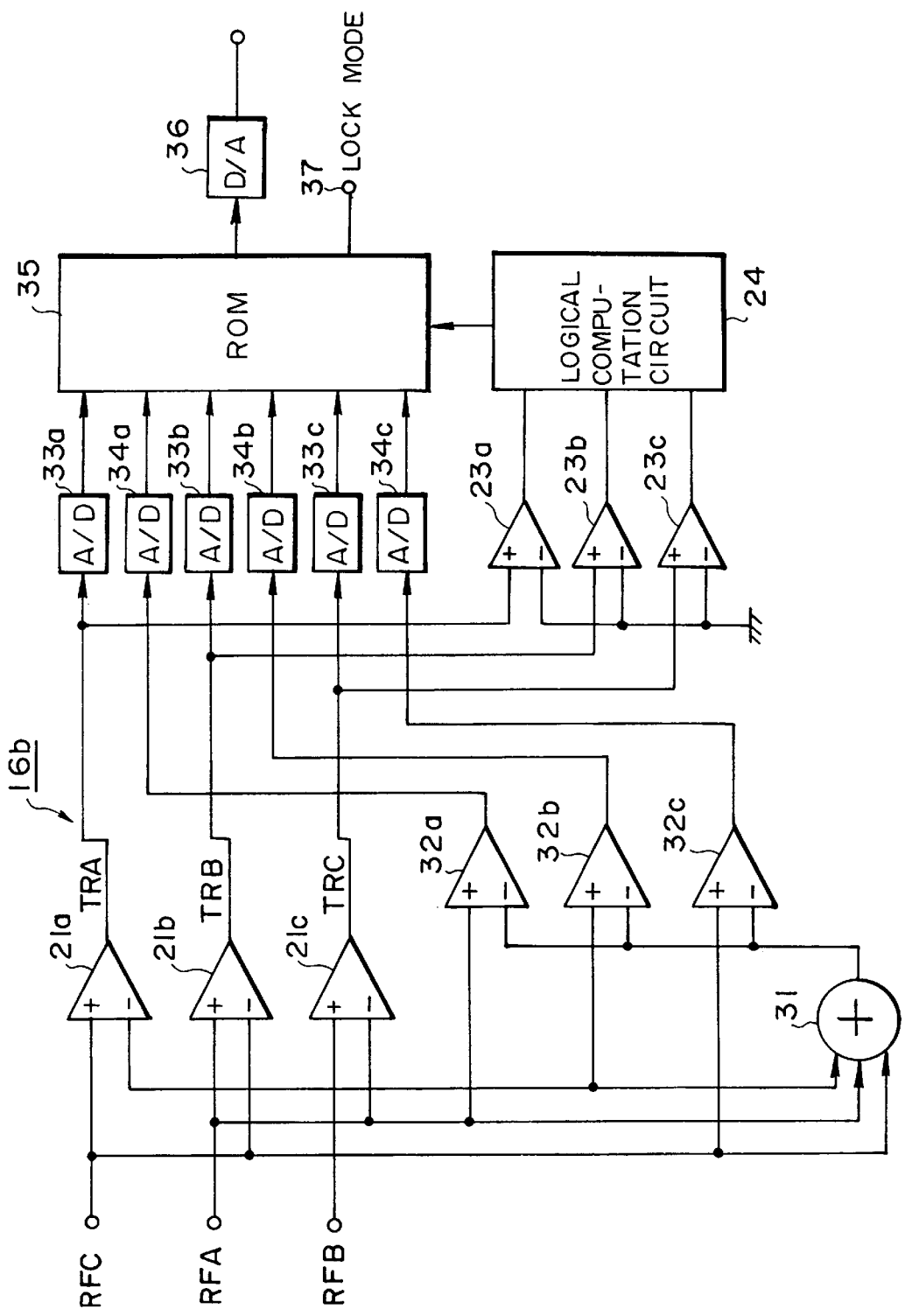
FIG. 16 is a block diagram of a modification of the error signal generation section in the tracking servo signal which performs a three-phase tracking operation of the disk according to the embodiment of the present invention.

The error signal generation circuit 16b in this case includes differential amplifiers 21a, 21b and 21c which determine the difference between each pair of the RF signals RFA, RFB and RFC from the sample hold circuit 16a, respectively, an adder 31 for adding together the RF signals RFA, RFB and RFC from the sample hold circuit 16a, and differential amplifiers 32a, 32b and 32c which subtract the output of the adder 31 from the RF signals RFA, RFB and RFC from the sample hold circuit 16a, respectively, as shown in FIG. 16.

There are further provided A/D converters 33a, 33b and 33c which convert each output of the differential amplifiers 21a, 21b and 21c into digital signals, and A/D converters 34a, 34b and 34c which convert each output of the differential amplifiers 31a, 32b and 32c into digital signals.

Furthermore, the error signal generation circuit 16b includes a ROM 35 which outputs a tracking error signal with each output of the A/D converters 33a, 33b, 33c, 34a, 34b and 34c as the address, and a D/A converter 36 which converts a tracking error signal supplied as a digital signal from this ROM 35 into an analog signal.

There are further provided comparators 23a and 23b which detect the polarity of each output of the differential amplifiers 21a, 21b and 21c, and a logical computation circuit 24 which controls the ROM 35 by predetermined logical computations on each output of these comparators 23a and 23b.

Then, the differential amplifiers 21a, 21b and 21c, as shown in FIG. 15B, generate tracking error signals TRA, TRB and TRC which are sine waves, and which are 120° out of phase with each other and which leads the corresponding RF signals RFA, RFB and RFC by 90°, respectively, and supply these tracking error signals TRA, TRB and TRC to the A/D converters 33a, 33b and 33c and the comparators 23a and 23b, respectively.

The A/D converters 33a, 33b and 33c convert the tracking error signals TRA, TRB and TRC into digital signals, respectively, and supply these tracking error signals TRA, TRB and TRC which are converted into digital signals to the ROM 35 as addresses.

Meanwhile, the adder 31 adds together the RF signals RFA, RFB and RFC from the sample hold circuit 16a and supplies this addition result, namely, the average value C (which is the center value and is constant) of the RF signals RFA, RFB and RFC which are the three-phase AC signals shown in FIG. 15A, to the differential amplifiers 31a, 32b and 32c. The differential amplifiers 31a, 32b and 32c subtract this average value C from the RF signals RFA, RFB and RFC, respectively. That is, the RF signals RFA, RFB and RFC whose DC components are removed by shifting the RF signals RFA, RFB and RFC by the average value C in terms of DC are supplied to the A/D converters 34a, 34b and 34c, respectively.

The A/D converters 34a, 34b and 34c convert the RF signals RFA, RFB and RFC whose DC components have been removed into digital signals, respectively, and supply these RF signals RFA, RFB and RFC which are converted into digital signals as addresses to the ROM 35.

Thus, the tracking error signals TRA, TRB and TRC and the RF signals RFA, RFB and RFC which are converted into digital signals are supplied to the ROM 35. A table which satisfies a predetermined relationship with the tracking error signals TRA, TRB and TRC and the RF signals RFA, RFB and RFC has previously been stored in this ROM 35, and the ROM 35 outputs a tracking error signal indicated, for example, by the solid line in FIG. 15E with the tracking error signals TRA, TRB and TRC and the RF signals RFA, RFB and RFC as addresses.

More specifically, if, for example, the displacement from the tracking center of the laser spot LSP is denoted as x, the track pitch as p, the RF signal RAF from the sample hold circuit 16a as $V_{QA}$, and when this $V_{QA}$ is expressed by equation (4) described below, an output $V_{QAC}$ of the differential amplifier 32a can be obtained by equation (5) described below:

$$V_{QA}=K_1\cos(2\pi x/P)+C \tag{4}$$

$$V_{QAC}=V_{QA}-C=K_1\cos(2\pi x/P) \tag{5}$$

On the other hand, since the tracking error signal TRA from the differential amplifier 21a is 90° out of phase with the RF signal RAF, if the tracking error signal TRA is denoted as $V_{PA}$, this $V_{PA}$ is expressed by equation (6) below:

$$V_{PA}=K_2\sin(2\pi x/P) \tag{6}$$

In the above equations, $K_2/K_1=1$ is set.

Based on these equations (5) and (6), the signal Vx indicating the displacement x is obtained on the basis of the following equation (7):

$$V_x=(P/2\ \pi)\tan^{-1}(V_{PA}/V_{QAC}) \tag{7}$$

Figure 15D:
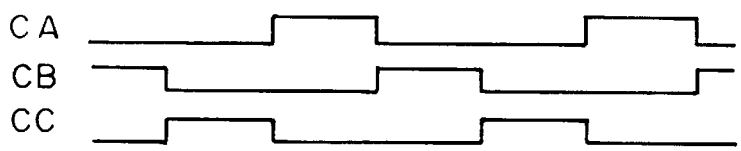
Figure 15E:
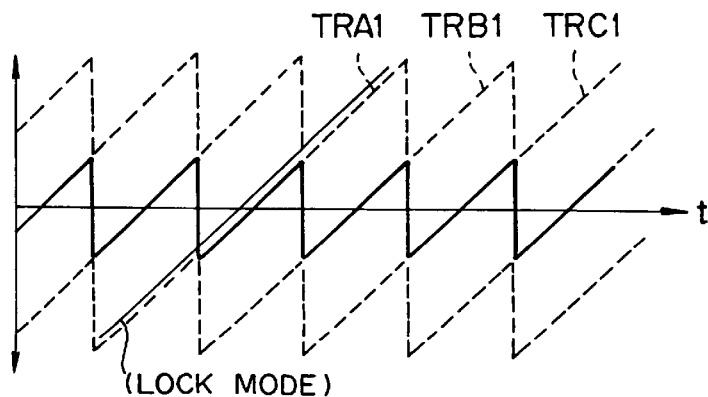

Meanwhile, since this signal $V_x$ is in principle proportional to the displacement x in $|x|<(p/4)$, values (a data table) on a straight line are stored such that the straight line of the range $|x|<(p/4)$ is extended to the range $|x|<(3p/2)$, and this data table is looked up by using the digitized tracking error signal TRA ($V_{PA}$) and RF signal RAF ($V_{QAC}$) so that a tracking error signal $TRA_1$ indicated by the broken line in FIG. 15E is obtained.

Further, data tables for other tracking error signals $TRB_1$ and $TRC_1$ are stored similarly so that the stored tracking error signals $TRB_1$ and $TRC_1$ are read out by using the digitized tracking error signal TRB and the RF signal RFB, or the tracking error signal TRC and the RF signal RFC.

Furthermore, control signals CA, CB and CC from the logical computation circuit 24 shown in FIG. 15D, and a control signal for switching between the normal mode and the lock mode through a terminal 37 are supplied as control signals to the ROM 35.

In the normal mode, when the control signal CA is "1", the tracking error signal $TRA_1$ is selected. When the control signal CB is "1", the tracking error signal $TRB_1$ is selected. When the control signal CC is "1", the tracking error signal $TRC_1$ is selected.

Therefore, a tracking error signal is output such that the three-phase tracking error signals $TRA_1$, $TRB_1$, and $TRC_1$ which are out of phase with each other are cyclically switched, as indicated by the solid line in FIG. 15E.

On the other hand, in the case of the lock mode, regardless of the control signals CA, CB and CC, one of the tracking error signals $TRA_1$, $TRB_1$, and $TRC_1$ is selected and output.

The tracking error signal read out from the ROM 35 in the above-described way is converted into an analog signal by the D/A converter 36, and then, similarly to the example of FIG. 14, the signal is made to be a tracking error signal via the phase-compensation circuit 8a and the two-axis driver 8b and supplied to the two-axis mechanism within the optical pickup 4.

As a result, in the normal mode, similar to the example of FIG. 14, tracking servo can be performed stably in the entire range of the tracking error signal, and a similar effect of capable of realizing stable tracking servo control can be obtained. Further, similarly, a tracking error signal containing information for the seek direction is also formed.

The operation during track jumping will now be described. For example, in a state in which tracking is performed in track #Ai, when track jumping is performed from this track #Ai to track #Bi, for example, a controller of the recording and reproduction apparatus supplies a control signal via the terminal 37 so as to set to the lock mode. That is, the reading from the ROM 35 is forcibly switched from the tracking error signal $TRA_1$ to the tracking error signal $TRB_1$, and further, the switching of tracking error signals is not performed regardless of the control signals CA, CB and CC.

Figure 13:
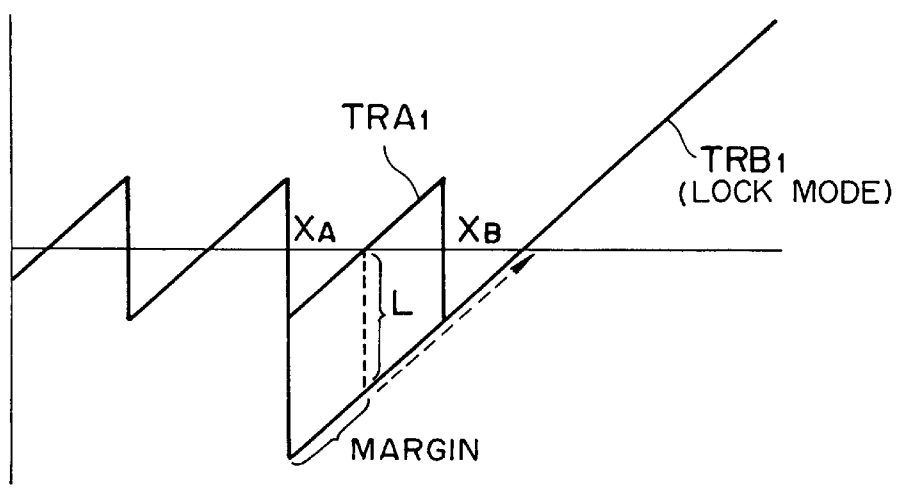
FIG. 13 is an illustration of the characteristics of the three-phase tracking operation of the disk according to the embodiment of the present invention.

More specifically, as shown in FIG. 13, while tracking is performed to the track #A1, the laser spot LSP is positioned at the tracking center of the track #Ai corresponding to the zero-cross point $X_A$ of the tracking error signal $TRA_1$ in the range in which the control signal CA is a logical "1".

Then, in this state, when the reading from the ROM 35 is switched to the tracking error signal $TRB_1$ regardless of the control signals CA, CB and CC, an L-level signal is output from the ROM 35. The optical pickup 4 causes the laser spot LSP to move to the tracking center of the track #Bi corresponding to the zero-cross point $X_B$ of the tracking error signal $TRB_1$ so that this level L becomes low. This completes the track jumping.

As described above, according to this tracking servo system, it is possible to perform track jumping with the tracking servo kept in the closed loop. In other words, circuit components for making the loop of the tracking servo open are not required, and the construction can be simpler.

Further, through the provision of the lock mode, it is possible to widen the retraction range in the tracking servo. For example, after switching from the tracking error signal $TRA_1$ to the tracking error signal $TRB_1$ to set to the lock mode, even if some disturbances occur, there is a margin as shown in FIG. 15E, and it is possible to perform track jumping stably.

[ROM Disk]

<Twin-Pit-Type ROM Disk>

As disks in this example, which are formed in accordance with the data segment, the track/frame/segment format, and the sector format, described heretofore, and on which servo pits are formed so that the above-described three-phase tracking operation is performed, there are three types: ROM disks, RAM disk and partial ROM disks. First, a ROM disk will be described here. This ROM disk will be specifically referred to as a twin-pit-type ROM disk.

Figure 17:
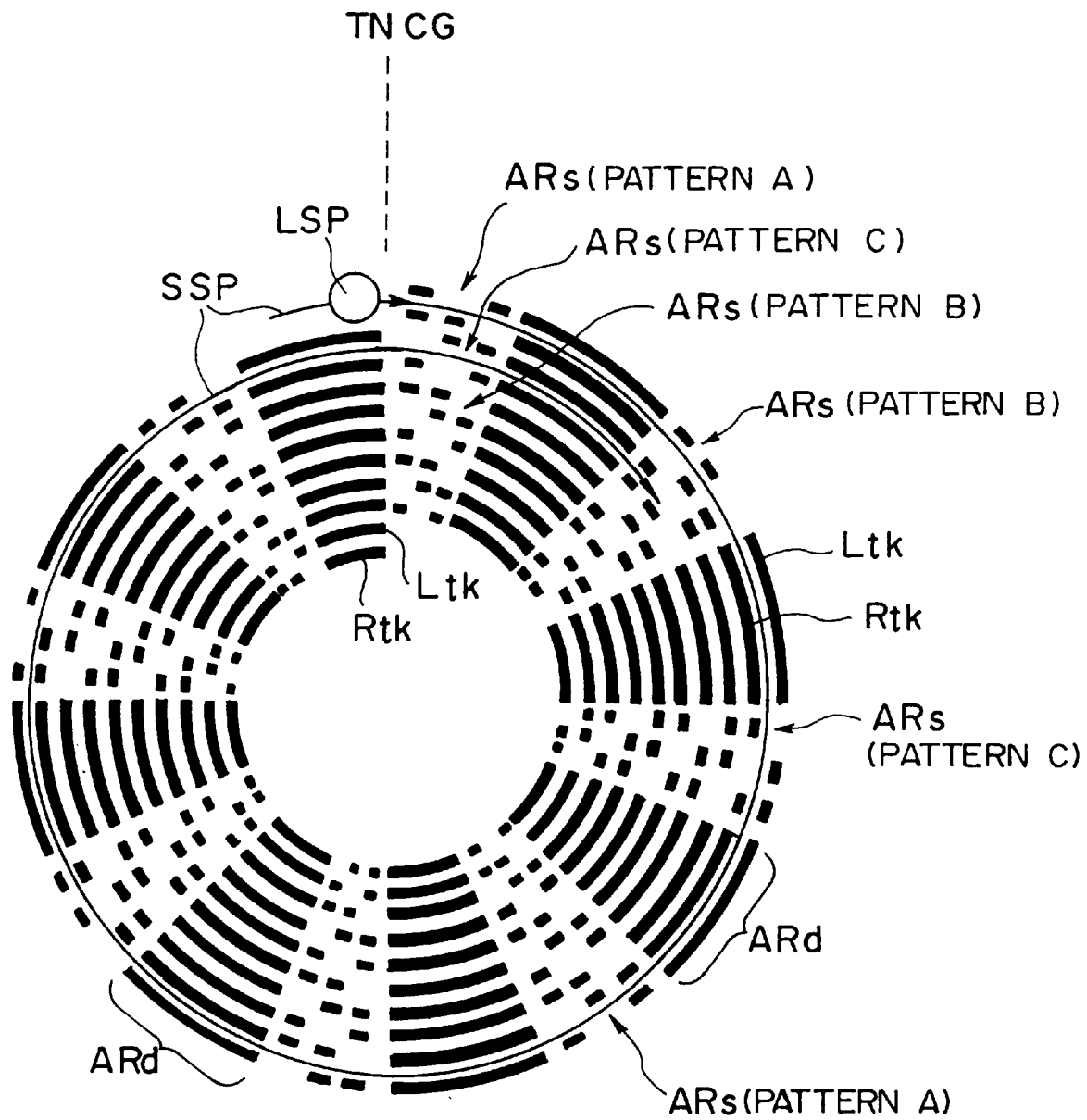
FIG. 17 is an illustration of a twin-pit-type ROM disk according to the embodiment of the present invention.
Figure 18:
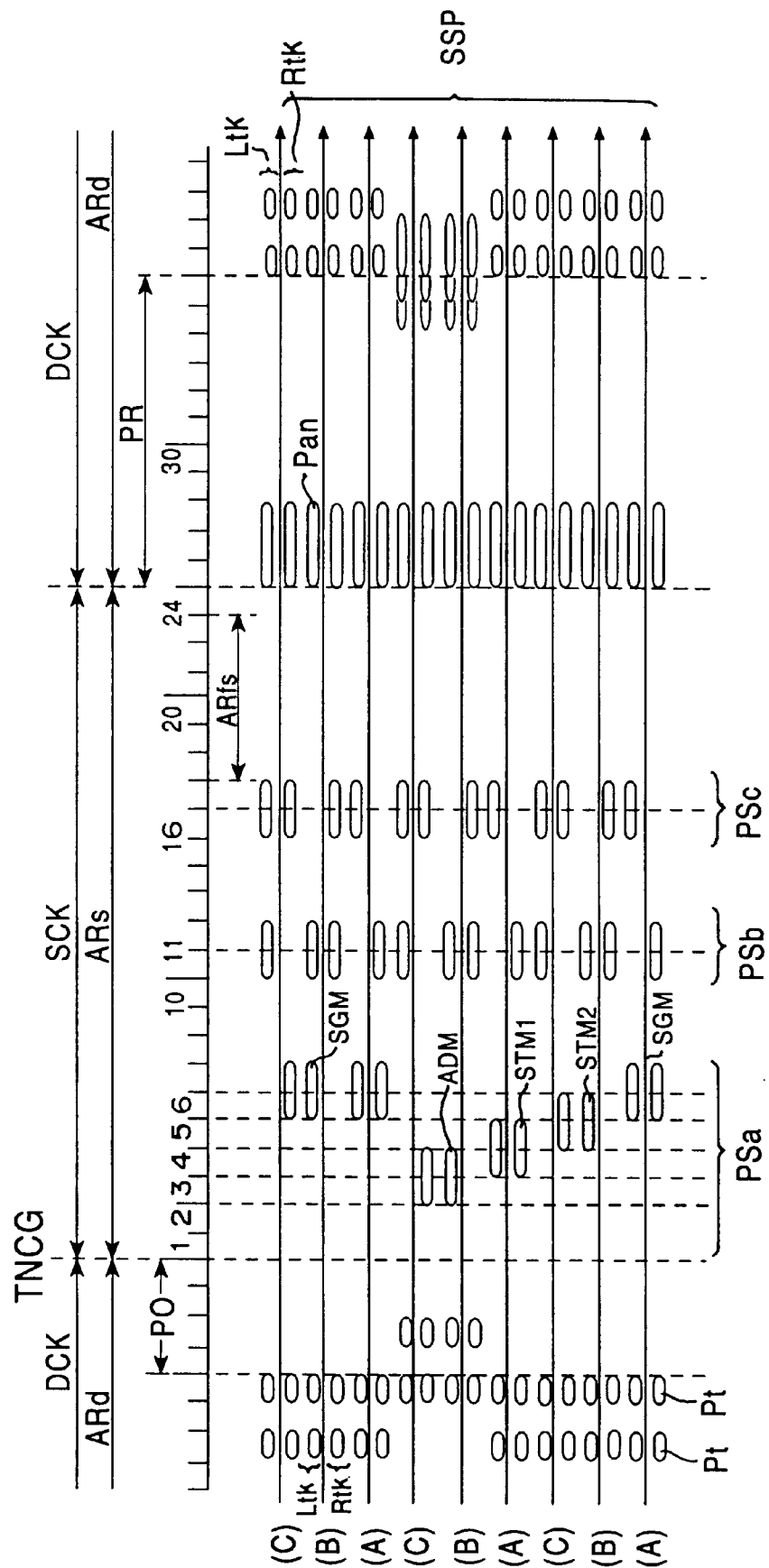
FIG. 18 is an illustration of a twin-pit-type ROM disk according to the embodiment of the present invention.

FIG. 17 shows the representation of tracks of this twin-pit-type ROM disk. FIG. 18 shows a servo area ARs and parts of a data area ARd before and after the servo area ARs in this twin-pit-type ROM disk.

In FIG. 17, the black portions in the places corresponding to the servo areas ARs represent servo pits for three-phase tracking, which have been described heretofore.

Further, the curved lines depicted as black portions in the data areas ARd between two servo areas ARs along the circumferential direction represent data tracks by pits.

Furthermore, a solid-line arrow SSP, which moves in a spiral shape with the laser spot LSP as the starting position, is shown. This arrow indicates the reproduction scanning path of the laser spot LSP in this twin-pit-type ROM disk.

Although only eight servo areas ARs and eight data areas ARd are shown along the circumferential direction, actually, the servo area ARs and the data area ARd are provided for each segment, as stated above.

Figure 28:
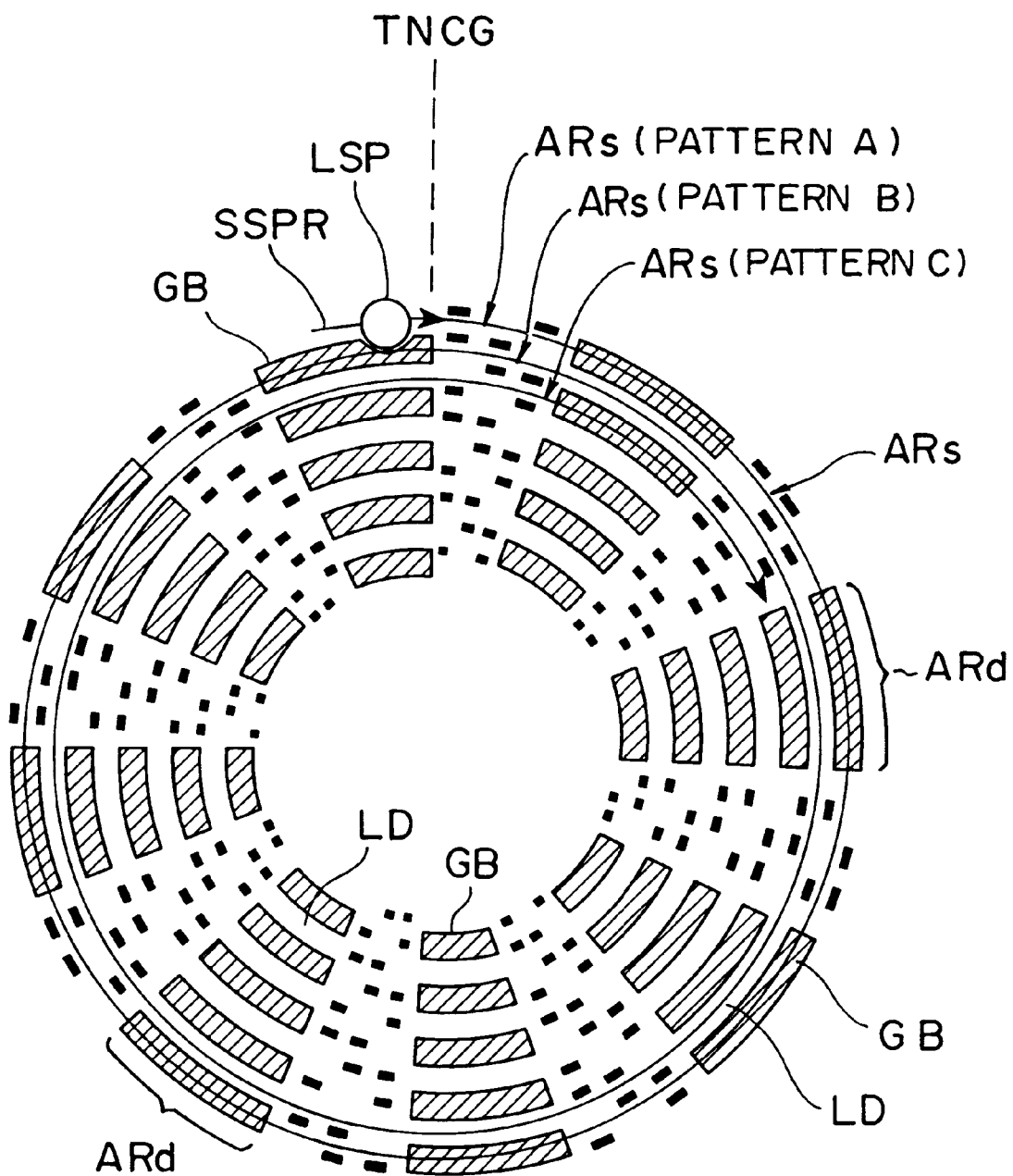
FIG. 28 is an illustration of an L/G-alternate-type RAM disk according to the embodiment of the present invention.
Figure 30:
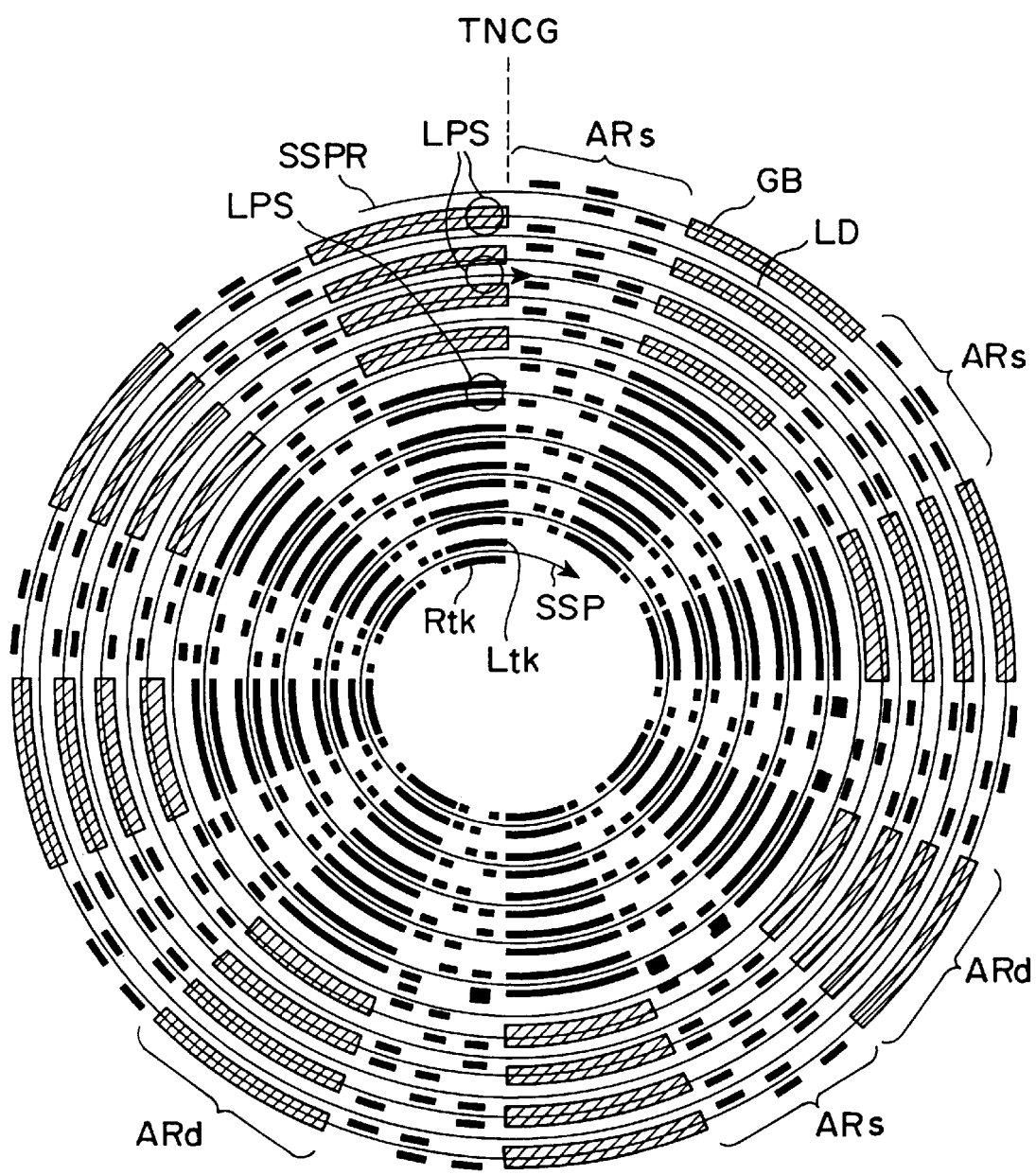
FIG. 30 is an illustration of a partial ROM disk formed by a twin-pit-type ROM and an L/G-alternate-type RAM according to the embodiment of the present invention.
Figure 34:
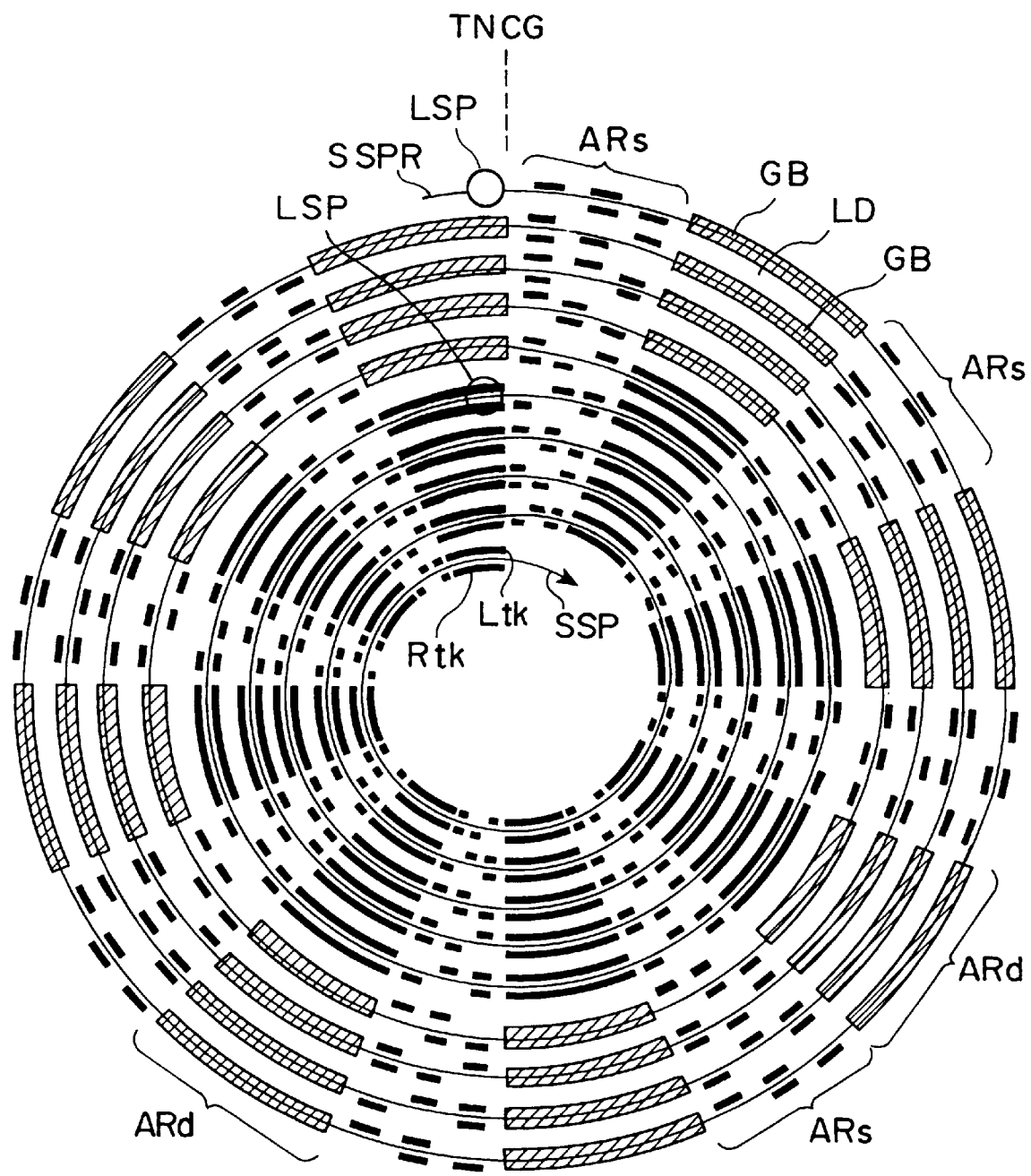
FIG. 34 an illustration of a partial ROM disk formed by twin-pit-type ROM and a single-data-type RAM according to the embodiment of the present invention.

That is, FIG. 17 is a representative view for illustration only, and does not show the actual tracking servo of the disk as is. After the description of this twin-pit-type ROM disk, examples of various disks will be described. FIGS. 28, 30 and 34 used for the description thereof are representative views taking specifically the ease of understanding into consideration, and do not show the actual tracking servo of the tracks as they are.

FIG. 18 is an enlarged view of a servo area ARs and a data area ARd before and after the servo area ARs in the twin-pit-type ROM disk. The servo area ARs is an area of 24 servo clock periods with the servo clock SCK as a reference, and extraction of the servo pit information is performed in accordance with the servo clock SCK.

In the data area ARd, data is reproduced in accordance with the data clock DCK. The postwrite area PO which is at the end of the data area ARd and the prewrite area PR which is at the beginning of the data area ARd are included mainly for the purpose of preventing residual heat of the laser and unerasure of recorded data during the recording operation, as described in FIGS. 5A, 5B and 5C. However, in order to achieve compatibility among the disks, the above areas are provided even for such read-only ROM disks.

Further, in the case of this twin-pit-type ROM disk, an anchor pit Pan, which is depicted, for example, to have a length of three data clock periods, is formed in the prewrite area PR, and a mirror portion is reduced, thereby reducing any adverse influences on servo pits during disk molding.

In the servo area ARs, as described in FIGS. 8A to 8D, servo pits are formed, and the type of segment is represented by the positions of the servo pits at position $PS_A$.

As can be seen in FIG. 17, in this twin-pit-type ROM disk, servo pit tracks (a pit sequence in the servo area ARs) and data tracks (a pit sequence in the data area ARd) are tracks which coincide with each other (positioned in the same circumferential line).

Therefore, when tracking servo is performed by two adjacent servo pit tracks which form one of pattern A, pattern B, or pattern C, and the reproduction scanning path SSP of the laser spot LSP proceeds with the middle position of the two adjacent servo pit tracks as a tracking center as shown in FIG. 17, the reproduction scanning path SSP proceeds along the middle position of the data tracks also in the data area ARd. That is, the two adjacent data tracks are simultaneously scanned by the laser spot LSP.

Of these two adjacent data tracks which are simultaneously scanned, the data track on the left side when seen from the proceeding direction of the laser spot LSP is referred to as a left track Ltk, and the data track on the right side is referred to as a right track Rtk.

Further, the left track Ltk and the right track Rtk form spiral-shaped tracks in a paired state.

The circumferential position indicated as TNCG in FIG. 17 indicates the track number change point, namely, the beginning and end of the circular track. As can be easily understood when this circumferential position TNCG is noted, what are commonly referred to as double-spiral-shaped tracks are formed by the left track Ltk and the right track Rtk.

The patterns of the servo pits in the servo area ARs are formed in the order: pattern A, pattern B, pattern C, pattern A, pattern B, and pattern C along the circumferential direction.

When seen in the radial direction, in the case of the patterns as shown in FIGS. 7B and 7C, that is, the patterns change in the order: pattern A, pattern B and pattern C when the middle of each pair of adjacent servo pit track patterns is seen in sequence as a reference.

In this case, since the left track Ltk and the right track Rtk which are formed into a double spiral are simultaneously reproduced by the reproduction scanning path SSP, that is, the reproduction scanning path SSP proceeds along the center of the double spiral, the reproduction scanning path SSP proceeds in units of two track pitches when seen in the radial direction.

In FIG. 18, representations (A), (B), and (C) on the left side of each reproduction scanning path SSP show the patterns of the servo pits corresponding to each reproduction scanning path SSP.

Further, as can be understood when each reproduction scanning path SSP is seen in sequence in the radial direction of the disk, since the tracking servo operation proceeds in the order: pattern C, pattern B, pattern A, pattern C, pattern B, pattern A and so on in the radial direction, the simultaneous scanning of the tracks in the shape of a double spiral (the left track Ltk and the right track Rtk) of this example is performed.

At this point, it is assumed that the wavelength of the laser beam is made so that it is similar to the conventional one, that is, the size (diameter) of the laser spot LSP, is almost similar to that of a conventional optical recording and reproduction apparatus, and that at least approximately 1.2 µm of the track pitch is required for the satisfactory operation of recording and reproduction.

However, in the twin-pit-type ROM disk, since two-track simultaneous scanning is performed, the track pitch may be half, i.e., 0.6 µm, thereby making it possible to realize a two-fold high-density recording or higher.

Further, although a method for reproducing two tracks simultaneously will be described later, the simultaneous reproduction of two tracks makes it possible to make the transfer rate of reproduction data twice as fast.

Further, pattern A, pattern B and pattern C of the servo pits are each formed at a width of 1.2 µm, this making it possible to secure a pitch of at least 1.2 µm in the case of the tracking operation, and thus tracking servo can be performed with sufficient accuracy. Moreover, since the patterns are arrayed in the order: pattern A, pattern B and pattern C in the radial direction as shown in the figure, there is no interference from servo pits other than the servo pits which form the current servo pattern in the range for the three servo pit track pitches. That is, this becomes equivalent to the case when the laser spot LSP passes along the center of the servo pit group which forms a certain pattern, the servo pit which is adjacent to each of the servo pits cannot be seen.

Therefore, regarding the tracking servo operation, it becomes equivalent to the servo control at a track pitch of 1.8 µm which is three times as wide as the data track pitch, making it possible to perform tracking control accurately and stably, and a narrower track pitch can be handled.

In the prewrite area PR which forms the anchor pit Pan, for example, a sector mark, a segment mark and the like may be formed.

<Two-Channel Twin Pits and Logical Twin Pits>

In the twin-pit-type ROM disk having the construction shown in FIGS. 17 and 18, as the structure of data to be recorded, a method which forms contents independently of each other in terms of data and a method which forms contents correlated with each other in terms of data, in particular, in the left track Ltk and the right track Rtk are possible.

When a method which forms contents independently of each other in terms of data is referred to as a two-channel twin-pit method, this two-channel twin-pit method becomes such as that shown in the data example of FIG. 19A.

That is, for example, considering the left track Ltk as channel ch1 and the right track Rtk as channel ch2, pits Pt based on data independent of each other are formed.

When data (RF signal) is extracted at the data clock timing indicated by the arrow by setting a pit Pt to "1" and the portion where a pit is not formed to "0", in the case of this example, values of "1, 0, 1, 1, 0, 0, 1, 0, 0, 1, 0 . . . " are extracted as reproduction data of channel ch1 by the scanning of the laser spot LSP. Further, values of "1, 1, 0, 1, 0, 1, 1, 1, 0, 0, 1 . . . " are extracted as reproduction data of channel ch2.

The data sequence read out as each channel ch1 and ch2 is decoded independently of each other to read the reproduction data of two channels.

A method which performs the data decoding process in the left track Ltk and the right track Rtk which form a double spiral as described above independently of each other is a two-channel twin-pit method.

On the other hand, in a logical twin-pit method in which contents are correlated with each other in terms of data in the left track Ltk and the right track Rtk, one value is obtained by using values extracted from both tracks, and the value is decoded. In this case, for example, four-valued detection can be performed at one data clock timing.

For example, in FIG. 19B, although pit patterns are depicted as being exactly the same as those of FIG. 19A, the four values of "00", "01", "10" and "11" are extracted depending upon the presence or absence of the pits Pt on both the tracks at the data clock timing indicated by the arrow. When it is assumed that, for example, the left track Ltk is assigned with upper-order bits, values of "11", "01", "10", "11", "00", "01", "11", "01", "00", "10", and "01" are extracted as reproduction data by the scanning of the laser spot LSP.

This example uses what is commonly called four-valued detection. As will be described next, use of both of the RF signal based on reflected light which is detected by using, for example, a four-piece detector, and a push-pull signal makes such four-valued detection possible.

Further, three-valued detection can be performed by using only the RF signal or only the push-pull signal, and in the case of the logical twin-pit method, three-valued detection may be used.

If, for example, data is extracted by only the RF signal, it is possible to discriminate between the states of "pits are present in both tracks", "pits are not present in either track" and "pits are present in one track". This makes it possible to extract three-valued data.

Further, use of the push-pull signal makes it possible to discriminate between the states of "pits are present in both tracks, or pits are not present in either track", "pits are not present in the left track Ltk", and "pits are present in the right track Rtk". This makes it possible to extract three-valued data.

However, in the case of the two-channel twin pits, since pit information must be extracted independently for each track, it is necessary to be able to detect four pit presence or absence states in both tracks. That is, a four-valued detection operation is required.

Even if either one of the above-described two-channel twin-pit method and logical twin-pit method is used, needless to say, it is possible to realize a larger capacity of the ROM disk.

<Method of Reading Twin-Pit Data>

A description will be given of an example (three-valued detection and four-valued detection) of a method of reading data by two-track simultaneous scanning in such a twin-pit-type ROM disk.

An object lens 4a of the optical pickup 4 shown in FIGS. 20A to 20D has a numerical aperture (NA) comparable to that of a conventional optical pickup. The object lens 4a collects light emitted from the laser-light source and radiates it onto a recording surface 1a of the optical disk 1. As described above, the size of the laser spot LSP on the recording surface 1a is made such that it is approximately two times as large as the track pitch of the data tracks.

Pits Pt are formed on the recording surface 1a of the optical disk 1 on the basis of recording data. There are four states of the left track Ltk and the right track Rtk at the data clock timing shown in FIGS. 20A to 20D, that is, the following four states where pits are not present in either track, pits are present in only the left track Ltk, pits are present in only the left track Rtk and pits are present in both tracks.

In FIGS. 20A to 20D, the one-dot-chain lines indicate the positions of the left track Ltk and the right track Rtk. FIGS. 20A to 20D each show the intensity distribution of the reflected light of the laser beam radiated via the object lens 4a, corresponding to the state of the left track Ltk and the right track Rtk.

Figure 20A:
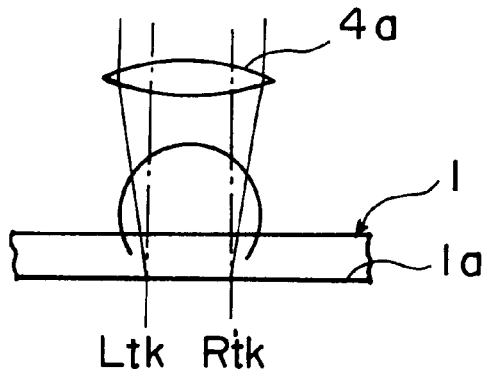
FIGS. 20A, 20B, 20C and 20D are illustrations of a method of reproducing data from a twin-pit-type ROM disk according to the embodiment of the present invention.

As shown in FIG. 20A, when pits are not present in either track, the intensity distribution of the reflected light becomes right-and-left symmetrical on the plane of the paper.

Figure 20B:
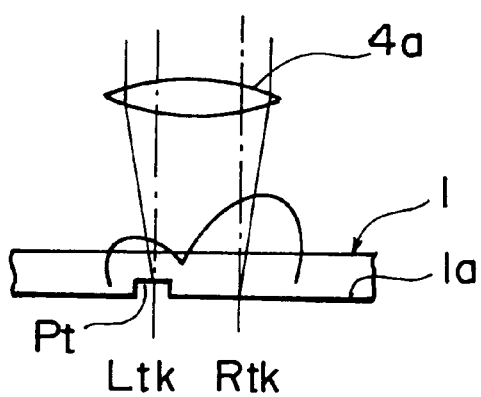

Further, as shown in FIG. 20B, when the pit Pt is not present in the right track Rtk and the pit Pt is present in the left track Ltk, due to the diffraction at the pit Pt, the right side of the intensity distribution of the reflected light becomes stronger on the plane of the paper.

Figure 20C:
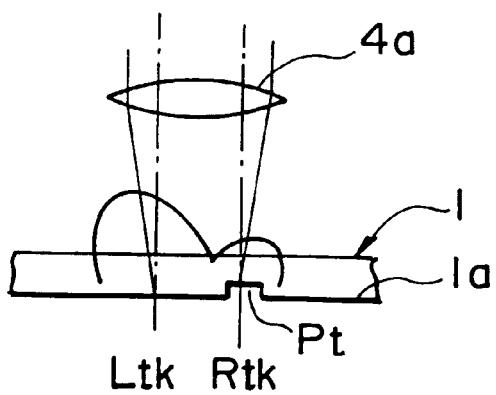

In contrast, as shown in FIG. 20C, when the pit Pt is present in the right track Rtk and the pit Pt is not present in the left track Ltk, due to the diffraction at the pit Pt, the left side of the intensity distribution of the reflected light becomes stronger on the plane of the paper.

Figure 20D:
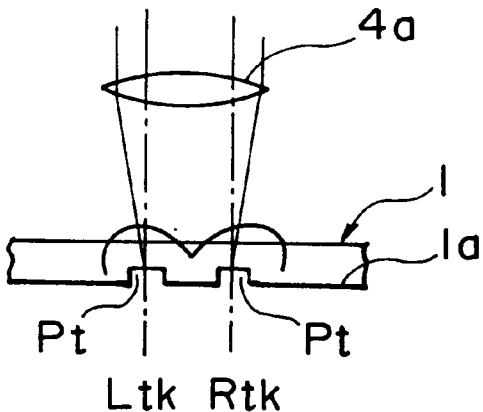

Further, as shown in FIG. 20D, when pits Pt are present in both tracks, the intensity distribution of the reflected light is right-and-left symmetrical and becomes weaker than in the case where pits are not present.

In this manner, the reflected light having an intensity distribution based on the presence or absence of the pits Pt is made parallel through the object lens 4a, is then introduced again into the optical system within the optical pickup 4, and finally radiated onto the detector 4d having a photoreceiving pattern such as that shown, for example, in FIG. 21.

The photoreceiving pattern of this detector 4d shown in FIG. 21 is divided into four regions KA, KB, KC and KD.

The far-field pattern on the photoreceiving surface of the detector 4d differs according to each case of FIGS. 20A to 20D.

For example, the upper part of FIG. 22A shows a state in which the pit Pt is present on the right track Rtk and the pit Pt is not present on the left track Ltk. At this time, in the detector 4d, regions KA and KD become bright, and regions KB and KC become dark (indicated by the oblique lines) due to the diffraction by the pit Pt.

On the other hand, as shown in FIG. 22B, when the pit Pt is not present on the right track Rtk and the pit Pt is present on the left track Ltk, regions KA and KD become dark, and regions KB and KC become bright.

Further, as shown in FIG. 22C, when the pits Pt are present on both tracks, all of the four regions KA, KB, KC and KD become dark, and as shown in FIG. 22D, when the pits Pt are not present on either track, all of the four regions KA, KB, KC and KD become bright.

The RF signal is output as (KA+KB+KC+KD) from such a detector 4d. When the level of the RF signal is detected when the laser spot LSP scans both tracks simultaneously, three levels (H, M and L levels) regarding the levels of the RF signal are observed in correspondence with the three cases where pits are not present in either track, pits are present on either one of the track and pits are present in both tracks, as shown in FIG. 23A.

Figure 23A:
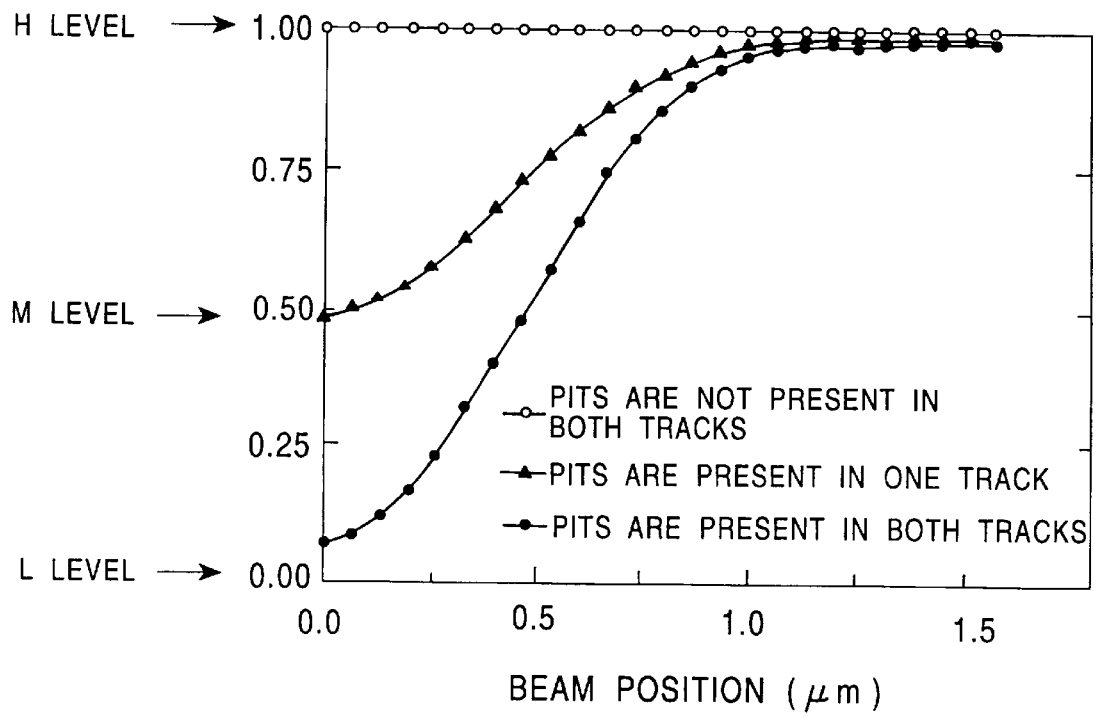
FIGS. 23A and 23B are illustrations of RF signal levels when the twin-pit-type ROM disk is reproduced according to the embodiment of the present invention.
Figure 23B:
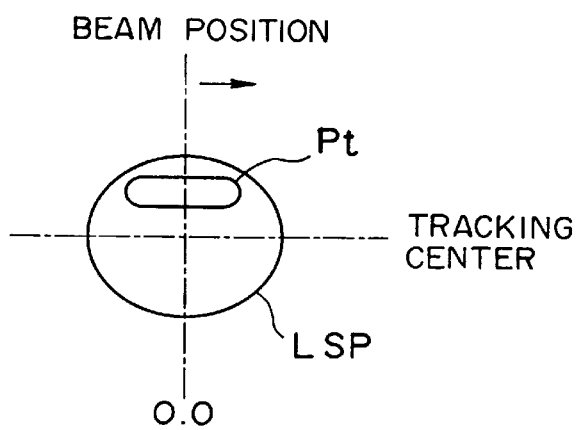

The beam position in the horizontal axis of the graph shown in FIG. 23A indicates the position along the track direction of the laser spot LSP, as shown in FIG. 23B.

Thus, the determination of the level of the RF signal on the basis of two threshold values makes it possible to determine a H level, an M level and an L level. This makes three-valued detection during the two-track simultaneous reproduction possible.

Further, even by using a push-pull signal, i.e., (output of regions KA+KB)−(output of regions KC+KD), a similar three-valued detection can be performed.

When the diffraction level by the push-pull signal is represented as a numerical model, the value of the push-pull signal (KA+KB)−(KC+KD) becomes "−1", "+1", "0", and "0" in correspondence with each case of FIGS. 22A to 22D, respectively.

Therefore, three levels (H level of "+1", M level of "0", and L level of "−1") are observed similarly to the case of the RF signal, and thus three-valued detection becomes possible by setting threshold values.

When four-valued detection is performed, a pit pattern between the adjacent tracks is determined by the combination of the RF signal and the push-pull signal.

When the diffraction level by the RF signal and the push-pull signal is represented as a numerical model, the RF signal becomes "1", "1", "2" and "0" and the push-pull signal becomes "−1", "+1", "0" and "0" in correspondence with each case of FIGS. 22A to 22D, respectively.

That is, a four-valued determination can be made in the manner described below.

When the RF signal="1" and the push-pull signal="−1", the pit Pt is not present on the left track Ltk, and the pit Pt is present on the right track Rtk.

When the RF signal="1" and the push-pull signal="+1", the pit Pt is present on the left track Ltk, and the pit Pt is not present on the right track Rtk.

When the RF signal="2" and the push-pull signal="0", the pits Pt are present on both tracks.

When the RF signal="9" and the push-pull signal="0", the pits Pt are not present on either track.

As described above, when data is reproduced from the optical disk 1, whose shape is the same as, for example, a compact disk, in which the pits Pt have been recorded at a high density of the track pitch of approximately ½ of the size of the laser spot LSP, by detecting the intensity distribution of the reflected light by the detector 4d whose photoreceiving region is divided into a plurality of regions, pit information for each track or logically correlated pit information on both tracks, can be read.

<Twin-Pit Method, including Wobble Pits>

In the case where the two-track simultaneous scanning of the left track Ltk and the right track Rtk is considered in the above-described logical twin-pit method, by forming wobble pits in each of the left track Ltk and the right track Rtk, for example, 16-valued detection becomes possible, thereby achieving a larger capacity. Further, in the case of the two-channel twin pits, it is possible to perform four-valued detection at one data clock timing at each track, thereby similarly achieving a larger capacity.

Such an example will be described below with reference to FIGS. 24A to 24E, 25, 26A, 26B, and 27.

FIG. 24A shows pit patterns $P_1$ to $P_{16}$ formed by the two tracks of the left track Ltk and of the right track Rtk, including wobble pits.

In this case, in each track, a pit (non-wobble pit ($\alpha$)) positioned on the tracking center as the pit Pt, a pit (wobble pit ($\beta$)) positioned offset in the +Δt direction from the center of each track, and a pit (wobble pit ($\gamma$)) positioned offset in the -Δt direction from the center of each track are provided, and further, a mirror section (M) where pits Pt are not formed is provided. Thus, four-valued information is represented.

This four-valued information is denoted as $\alpha$, $\beta$, $\gamma$ and M, respectively, as shown in FIG. 24B. Information $\alpha_1$, $\beta_1$, $\gamma_1$ and $M_1$ is present on the track #n (the left track Ltk), and information $\alpha_2$, $\beta_2$, $\gamma_2$ and $M_2$ is present on the track #n+1 (the right track Rtk). That is, by causing the laser spot LSP to scan the tracks #n and #n+1 simultaneously, 16 types of data representation (pit patterns $P_1$ to $P_{16}$) becomes possible by the combination of the information $\alpha_1, \beta_1, \gamma_1$ and $M_1$ and the information $\alpha2, \beta_2, \gamma_2$ and $M_2$.

Therefore, in the case of the logical twin-pit method, data to be recorded on the tracks of this optical disk may be recorded by representing 16-valued data by any of pit patterns $P_1$ to $P_{16}$. That is, the values "0000" to "1111" are represented at one data clock timing of the adjacent tracks.

Further, in the case of the two-channel twin-pit method, four-valued data can be recorded on each track. For example, information $\alpha, \beta, \gamma$ and M is made to correspond to recording data values "11", "10", "01", and "00", respectively.

Thus, the recording capacity of this optical disk is markedly increased to more than that of an optical disk that uses two values of "1" and "0" which are represented simply by the presence or absence of pits.

A method of extracting data from pit patterns including such wobble pits will be described below.

Figure 25:
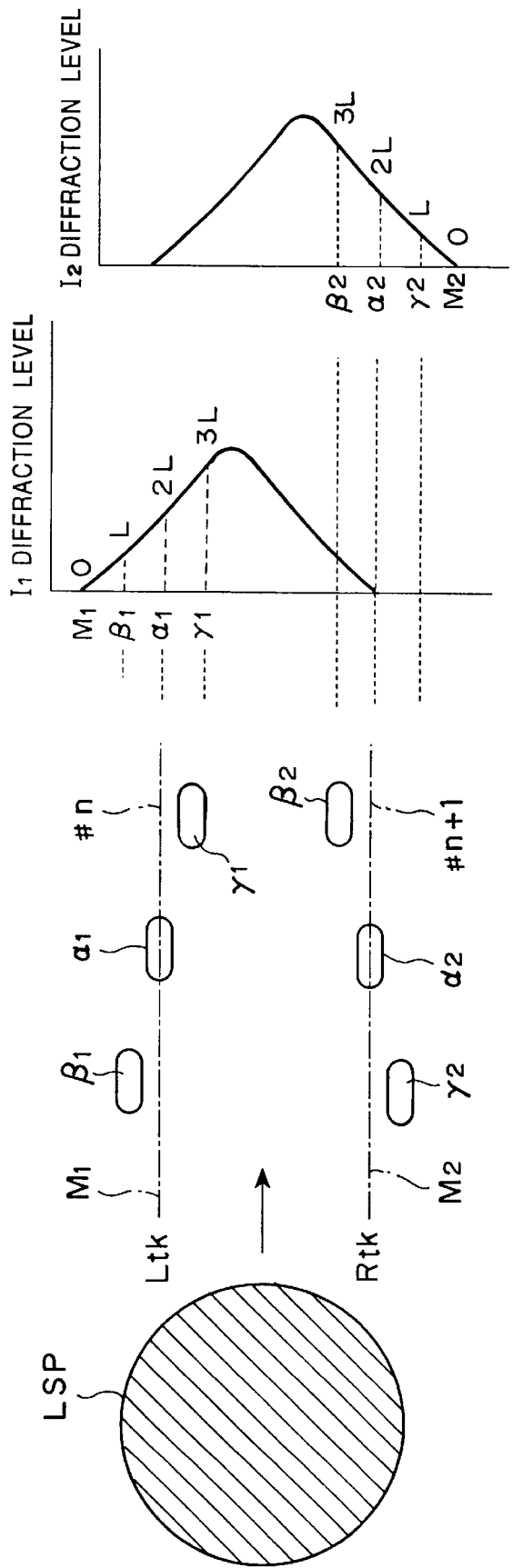
FIG. 25 is an illustration of a method of reproducing data from a twin-pit-type ROM disk having wobble pits according to the embodiment of the present invention.

As shown in FIG. 25, with respect to the laser spot LSP, when it is assumed that a mirror section $M_1$, and pits $\alpha_1, \beta_1$, and $\gamma_1$ are present on the left track Ltk, and a mirror section $M_2$, and pits $\alpha_2, \beta_2$, and $\gamma_2$ are present on the right track Rtk, a diffraction level, i.e., an $I_1$ level, obtained by photoreceiving areas KA and KD of the detector 4d such as that shown in FIG. 21 and a diffraction level, i.e., an $I_2$ level, obtained by photoreceiving areas KB and KC of the detector 4d correspond to 0, L, 2L, and 3L, respectively, as shown in FIG. 25.

The $I_1$ diffraction level and the $I_2$ diffraction level corresponding to each of the pit patterns $P_1$ to $P_{16}$ are as shown in FIG. 24C.

Further, since the RF signal is obtained by $I_1+I_2$, the diffraction level of the RF signal has a level distribution from 0 to 6 in correspondence with pit patterns $P_1$ to $P_{16}$, as shown in FIG. 24D. On the other hand, the push-pull signal obtained by $I_1-I_2$ has a level distribution from −3 to +3 in correspondence with pit patterns $P_1$ to $P_{16}$, as shown in FIG. 24E.

Figure 26A:
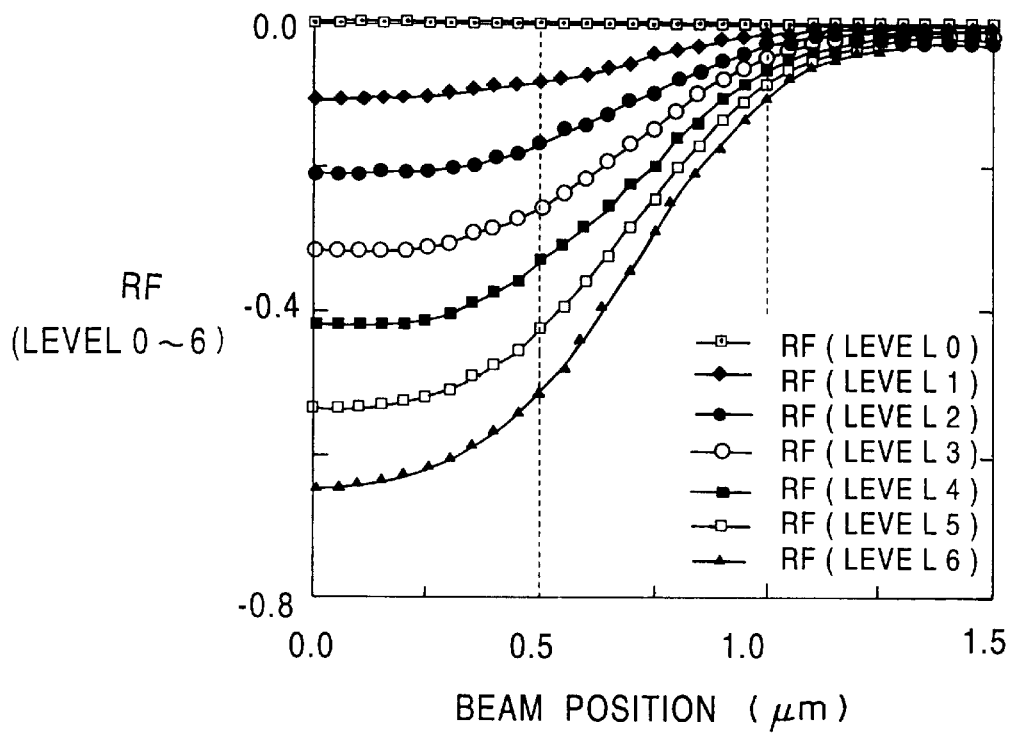
FIGS. 26A and 26B are illustrations of RF signal levels and push-pull signal levels when disk is reproduced from a twin-pit-type ROM disk having wobble pits according to the embodiment of the present invention.
Figure 26B:
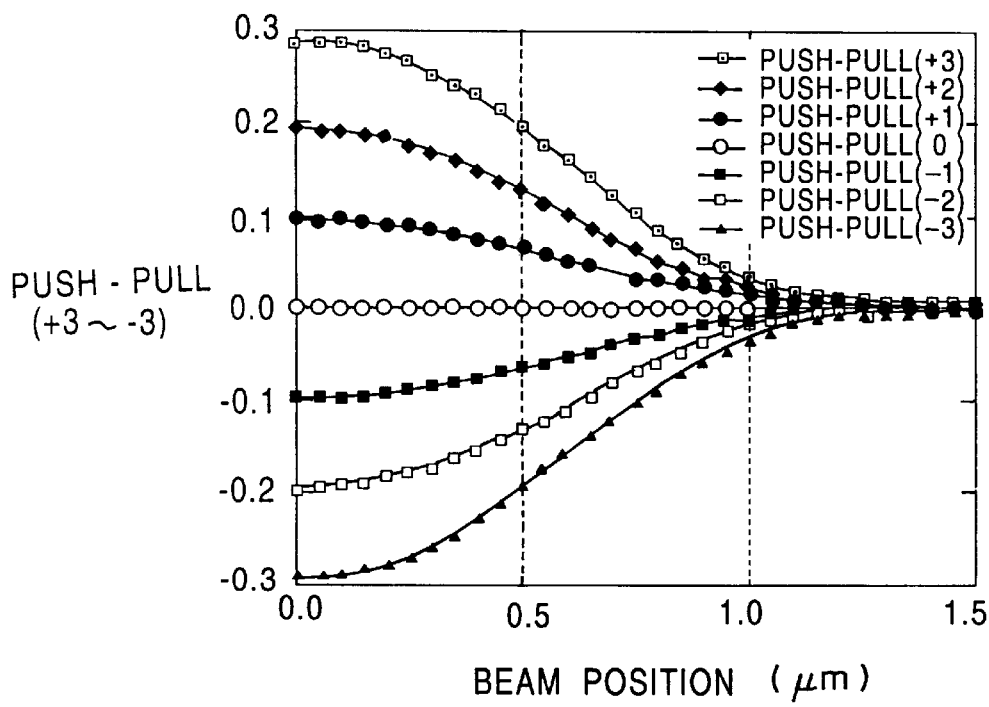

This level distribution is shown in FIGS. 26A and 26B for the RF signal (degree of modulation) and the push-pull signal. FIGS. 26A and 26B show values which are computed by assuming 0.0 to be a mirror level in the vertical axis. Further, the beam position taken along the horizontal axis indicates the position to which the laser spot LSP is moved in the reproduction scanning direction with the pit center at the 0.0 point, as shown in FIG. 23B. Therefore, by performing data extraction in accordance with the data clock DCK corresponding to the 0.0 point, information is extracted in the level range of about 0 to −0.65 in the case of the RF signal, and information is extracted in the level range of about −0.3 to +0.3 in the case of the push-pull signal.

Figure 27:
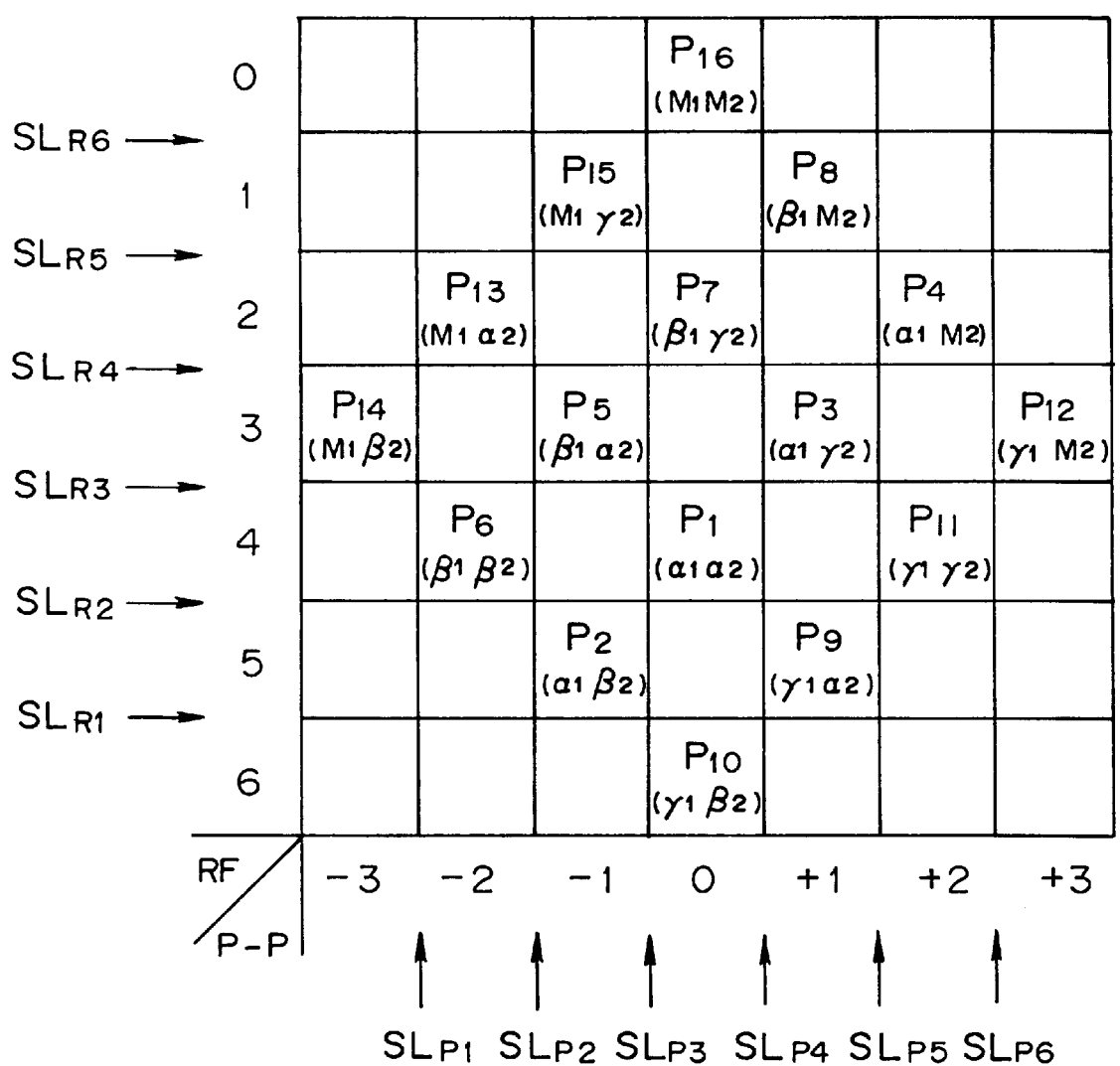
FIG. 27 is an illustration of a data extraction operation of the twin-pit-type ROM disk having wobble pits according to the embodiment of the present invention.

As described above, the levels of both of the RF signal and the push-pull signal can be determined by seven types of ranges, and further, each of the pit patterns $P_1$ to $P_{16}$ is positioned independently of each other on an information map in correspondence with the level ranges of the RF signal and the push-pull signal, as shown in FIG. 27. Therefore, since the reproduction apparatus holds this information map within a decoder, it becomes possible to easily determine which one of the pit patterns $P_1$ to $P_{16}$ has been scanned for reproduction on the basis of the values of the RF signal and the push-pull signal which have been formed into digital data and input.

For example, if it is assumed that the RF signal value is −0.2 (namely, 2 in the information map), and the push-pull signal value is 0.0 (0 in the information map), the pattern is determined to be a pit pattern $P_7$, making it possible to extract data assuming that the left track Ltk contains information $\beta$ by the wobble pit of $+\Delta t$ and the right track Rtk contains information $\gamma$ by the wobble pit of $-\Delta t$.

By storing such an information map as that in FIG. 27 within the decoder, it becomes possible to determine the pit patterns $P_1$ to $P_{16}$ on the basis of the RF signal value and the push-pull signal value. For this purpose, as shown in FIG. 27, threshold values $SL_{R1}$ to $SL_{R6}$ for determining the RF signal value to be one of levels 0 to 6 are required, and threshold values $SL_{P1}$ to $SL_{P6}$ for determining the push-pull signal value to be one of levels −3 to +3 are required.

If the reflectance is always constant from optical disk to optical disk, and if intersymbol interference is not recognized in the optical disk, the threshold values $SL_{R1}$ to $SL_{R6}$ and $SL_{P1}$ to $SL_{P6}$ may be prestored on the basis of experimental data or the like. However, in practice, the RF signal value and the push-pull signal value based on the information of $\alpha, \beta, \gamma$ and M may vary due to intersymbol interference or the like.

Thus, all or some of the 16 pit patterns shown in FIG. 24A are recorded beforehand as reference information as they are in predetermined areas (e.g., near the servo area ARs) at predetermined cycles on the optical disk 1. During reproduction, optimum threshold values $SL_{R1}$ to $SL_{R6}$ and $SL_{P1}$ to $SL_{P6}$ are computed on the basis of the RF signal value and the push-pull signal value which are obtained when each pattern in this reference information is reproduced, and stored within the decoder. This makes accurate 16-valued determination possible.

For example, recording of reference information is possible by using the prewrite area PR and the postwrite area PO in which the anchor pit Pan in FIG. 18 has been recorded.

Further, in the servo area ARs in which servo pits are formed, since pit pattern $P_1$, pit pattern $P_4$, pit pattern $P_{13}$, and pit pattern $P_{16}$ are represented, these servo pits may be used as reference information for the pit patterns $P_1, P_4, P_{13}$, and $P_{16}$.

[RAM Disk]

<L/G-Alternate-Type RAM Disk>

Next, a description will be given of a RAM disk as a disk of this example, which is formed in accordance with the above-described data structure, track/frame/segment format and sector format and in which servo pits are formed so that the above-described three-phase tracking operation is performed. The feature of this RAM disk is that lands and grooves appear alternately while proceeding along the circumferential direction of the tracks. This will particularly be referred to as a land/groove-alternate-type (L/G-alternate-type) RAM disk.

Figure 29:
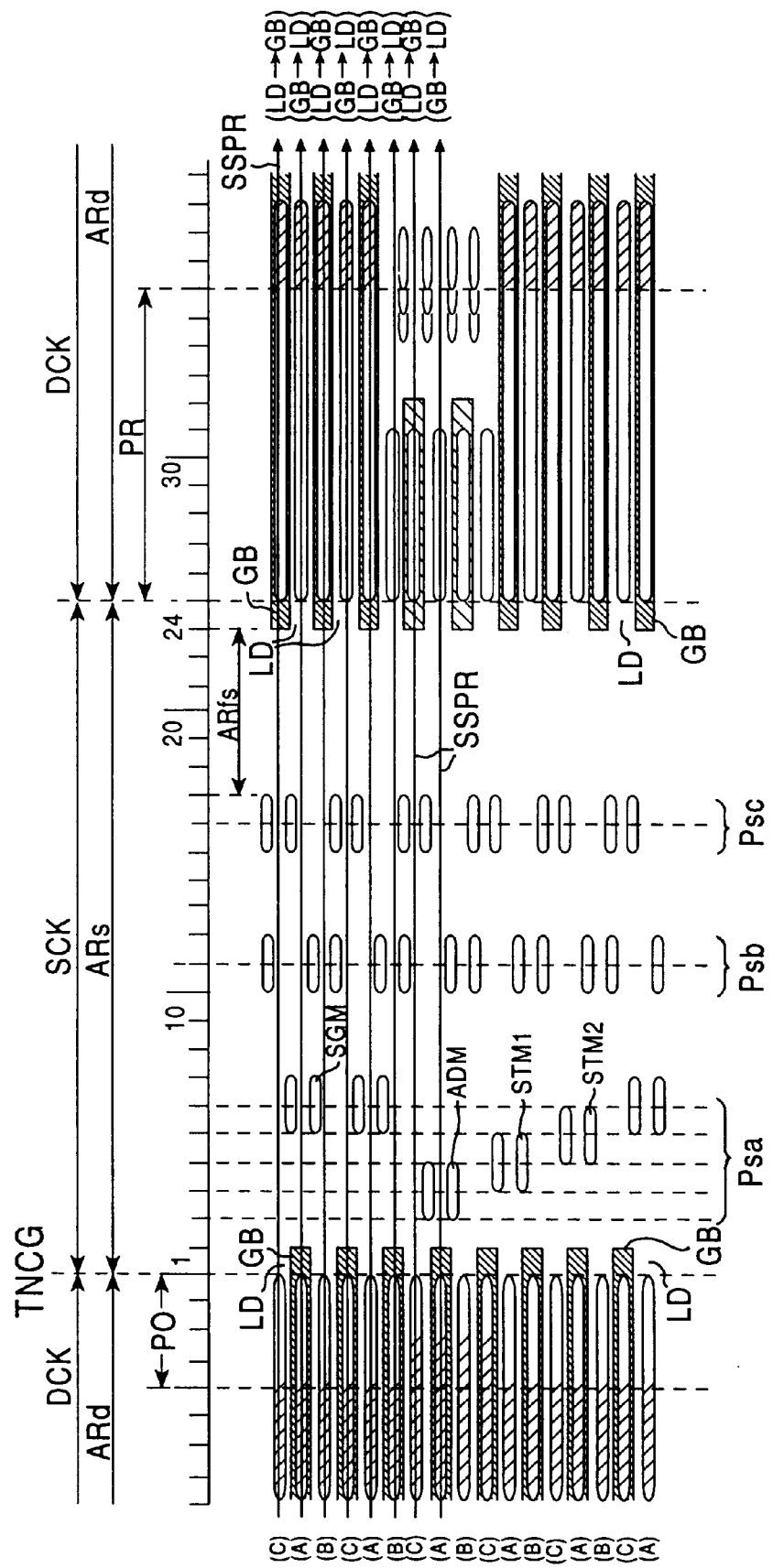
FIG. 29 is an illustration of the L/G-alternate-type RAM disk according to the embodiment of the present invention.

FIG. 28 is a schematic representation of the track structure of this L/G-alternate-type RAM disk. FIG. 29 shows a servo area ARs and parts of a data area ARd before and after the servo area ARs in this L/G-alternate-type RAM disk.

In FIG. 28, the black portions in the places corresponding to the servo area ARs represent servo pits for three-phase tracking which has been described heretofore.

Further, the curved-line portions depicted as shading portions in the data areas ARd between two servo areas ARs along the circumferential direction represent data tracks by grooves GB, and the portions where shading is not given in the data areas ARd represent data tracks by lands LD.

Further, a solid-line arrow SSPR is shown which proceeds in a spiral shape with the laser spot LSP as the starting point. This arrow indicates the recording scanning path and the reproduction scanning path of the laser spot LSP in this L/G-alternate-type RAM disk.

FIG. 29 is an enlarged view of a servo area ARs and a data area ARd before and after the servo area ARs in the L/G-alternate-type RAM disk, and the representation method is similar to that of FIG. 18 described above.

Also in this case, the servo area ARs is an area of 24 servo clock periods with the servo clock SCK as a reference, and servo-pit information is extracted or the like in accordance with the servo clock SCK. Further, the segment type is represented by the position of the servo pit at the position PSA as described in FIG. 8.

Meanwhile, in the data area ARd, data is reproduced in accordance with the data clock DCK. The data area ARd is formed as grooves GB or lands LD rather than as a pit sequence as in the above-described twin-pit-type ROM disk.

The postwrite area PO which is at the end of the data area ARd and the prewrite area PR which is at the beginning of the data area ARd are used mainly for the purpose of preventing residual heat of the laser and unerasure of recorded data during a recording operation, as described in FIG. 5.

As can be seen from FIGS. 28 and 29, in this L/G-alternate-type RAM disk, the center of the servo pit tracks (the pit sequence in the servo area ARs) does not coincide with the center of the data tracks (the lands LD or the grooves GB in the data area ARd) in the circumferential direction.

Therefore, when tracking servo is performed by using two adjacent servo pit tracks which form one of pattern A, pattern B, pattern C, and the recording reproduction scanning SSPR of the laser spot LSP proceeds with the middle position of the two adjacent servo pit tracks as the tracking center as shown in the figure, the recording reproduction scanning SSPR proceeds along the center of the grooves GB or along the center of the lands LD in the data area ARd.

That is, the correct tracking state is reached with respect to the grooves GB or the lands LD, and scanning by the laser spot LSP proceeds along the grooves GB or the lands LD.

Then, as can be seen from FIG. 28, when seen for each circular track with the circumferential position TNCG as the starting point and the end point, tracks formed of segments in which the data area ARd is made to be grooves GB, and tracks formed of segments in which the data area ARd is made to be lands LD appear alternately.

More specifically, in a certain track, scanning proceeds in the order: groove GB, servo area ARs, groove GB, servo area ARs, . . . servo area ARs, groove GB. When the circumferential position TNCG is reached and scanning proceeds to the next track, the scanning of the track proceeds in the order: servo area ARs, land LD, servo area ARs, land LD, . . . servo area ARs, land LD. As a result, both the grooves GB and the lands LD are used for recording data.

As described above, this L/G-alternate-type RAM disk is structured in such a way that tracks formed of segments in which the data area ARd is made to be grooves GB (hereinafter referred to as groove tracks), and tracks formed of segments in which the data area ARd is made to be lands LD (hereinafter referred to as land tracks) are formed alternately for each circular track.

The segment referred to herein refers to the data segment DSEG(x) shown in FIGS. 4, and 5A to 5D. As described above, data, such as addresses, is recorded into the address segment ASEG(x) as read-only data by the pit sequence rather than by the grooves/lands of the magneto-optic recording and reproduction area.

In the schematic view of FIG. 28, for the sake of simplicity of description, a description of the address segment ASEG(x) is omitted, and a representative view which considers only the data segment DSEG(x) is shown. Such representation of drawings applies also in FIGS. 30 and 34 which will be described later.

The circumferential position TNCG in FIG. 28 is set to be the change point of the track number, namely, the starting point and the end point of the circular track. The portions before and after the servo area ARs after this circumferential position TNCG are shown in FIG. 29.

As can be seen clearly in FIG. 29, if the recording and reproduction scanning path SSPR which has proceeded along the land tracks proceeds as it is, it enters the groove tracks with the servo area ARs after this circumferential position TNCG as a boundary.

Further, if the recording and reproduction scanning path SSPR which has proceeded along the groove tracks proceeds as it is, it enters the land tracks with the servo area ARs after this circumferential position TNCG as a boundary. These situations are shown in FIG. 29 as (LD→GB) or (GB→LD) for each recording and reproduction scanning path SSPR.

As can be seen in FIG. 28, the servo-pit patterns in the servo area ARs are formed in the order: pattern A, pattern B, pattern C, pattern A, pattern B, pattern C, . . . in the circumferential direction.

Further, when seen in the radial direction, in the case of patterns as shown in FIGS. 7B and 7C, that is, patterns change in the order: pattern A, pattern B, pattern C, and so on with the middle of each pair of adjacent servo pit tracks seen in sequence as a reference.

In this case, since the recording and reproduction scanning path SSPR proceeds along the groove tracks and the land tracks alternately, the reproduction scanning SSP proceeds in units of the pitch of the lands LD and the grooves GB when seen in the radial direction.

In FIG. 29, servo-pit patterns corresponding to each recording and reproduction scanning path SSPR are shown as (A), (B) and (C) on the left side of each recording and reproduction scanning path SSPR. As can be seen when each recording and reproduction scanning path SSPR is seen in sequence in the radial direction of the disk, a tracking servo operation is performed in the order: pattern A, pattern B, pattern C, pattern A, pattern B, pattern C, and so on, and thus scanning which proceeds along the groove tracks and the land tracks as in this example is performed.

In this case, even if the data track pitch, i.e., the width from the center of the lands LD to the center of the grooves GB, is set at 0.6 $\mu$m, and the size of the laser spot LSP is set at 1.2 $\mu$m, which is approximately two times as large, the patterns A, B and C are each formed at a width of 1.2 $\mu$m. Therefore, a track pitch of at least 1.2 $\mu$m is secured in the case of the tracking operation in the recording and reproduction scanning path SSPR, and tracking servo with sufficient accuracy can be performed.

Furthermore, since the servo pits are arrayed in the order: pattern A, pattern B, pattern C in the radial direction as shown in the figure, there is no interference from the servo pits other than the servo pits which form the servo pattern at that time. That is, this becomes comparable to the case when the laser spot LSP passes along the center of the servo pit group which forms a certain pattern, the servo pits which are adjacent to each of the servo pits cannot be seen.

Therefore, the tracking servo operation becomes comparable to servo control at the track pitch of 1.8 $\mu$m, which is three times as large as the data track pitch, making accurate and stable tracking control possible and making it possible to handle a narrower track pitch.

And, in this L/G-alternate-type RAM disk, since both the lands LD and the grooves GB are used for recording tracks, it is possible to realize a high-density recording two times higher than a conventional disk, i.e., a disk in which either the lands or the grooves are made to be recording tracks.

[Partial ROM Disk]

<Twin-Pit-Type ROM and L/G-Alternate-Type RAM>

Next, a description will be given of a partial ROM disk as a disk of this example, which is formed in accordance with the above-described disk structure, track/frame/segment format, and the sector format and on which servo pits are formed so that the above-described three-phase tracking operation is performed.

As shown in FIGS. 3C and 3D, the partial ROM disk has a ROM area AE and a rewritable area ARW. A description will be given using an example in which the outer region side is made to be a rewritable area ARW and the inner region side is made to be a ROM area AE, as shown in FIG. 3D. Of course, the partial ROM disk of this example in which an outer region side is made to be a ROM area AE as in FIG. 3C, which will be described below, can be applied exactly the same way.

Further, the partial ROM disk described here is made to be a partial ROM disk in which a twin-pit-type ROM and an L/G-alternate-type RAM are combined. That is, this disk has an L/G-alternate-type rewritable area in which land tracks and groove tracks appear alternately for each circular track with the proceeding along the circumferential direction of the tracks as described in FIGS. 28 and 29, and a ROM area of a twin-pit type in which double-spiral-shaped tracks by the left track Ltk and the right track Rtk are formed, and these tracks are scanned simultaneously as described in FIGS. 17 and 18.

Figure 31:
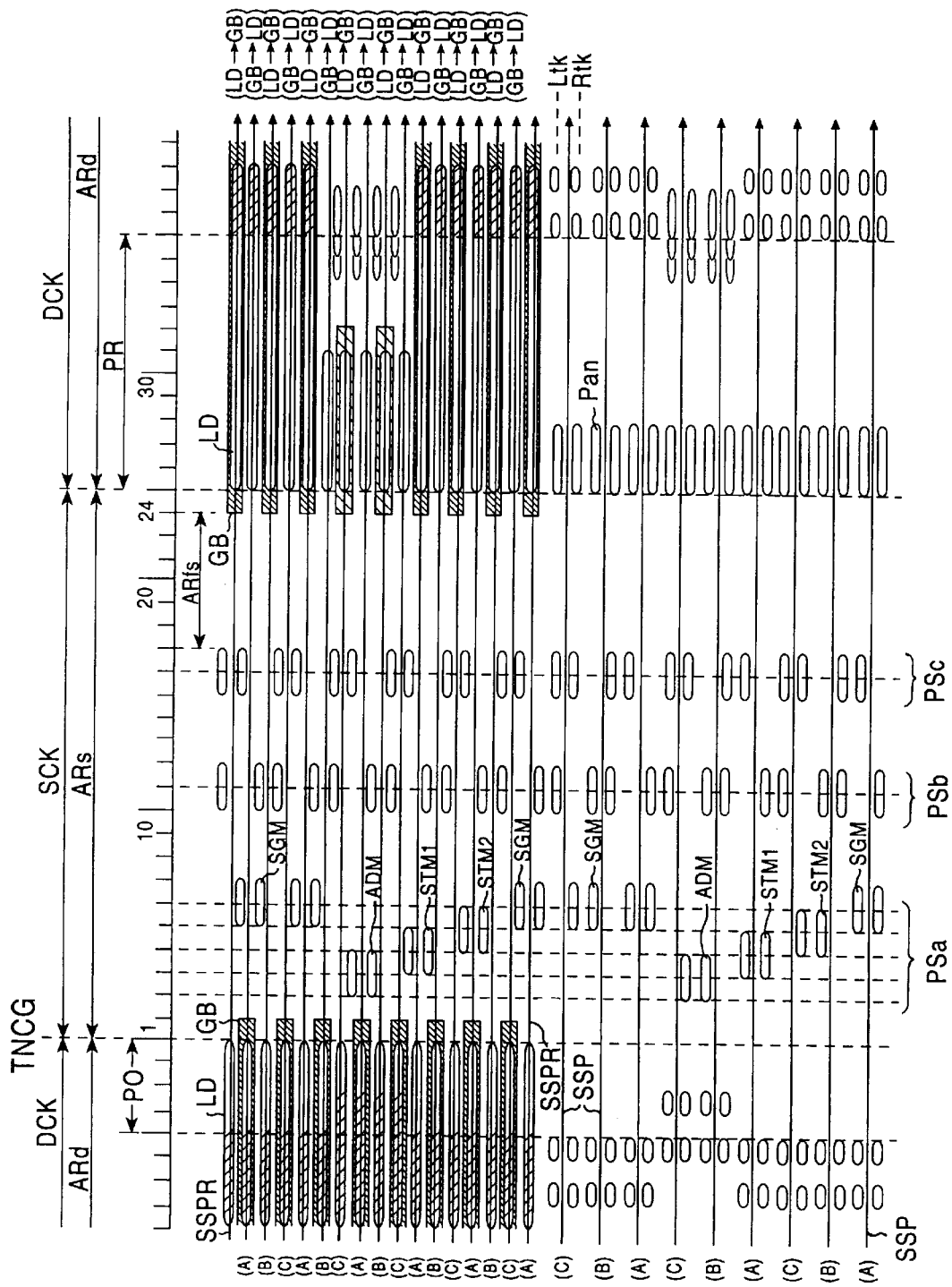
FIG. 31 is an illustration of the partial ROM disk formed by a twin-pit-type ROM and an L/G-alternate-type RAM according to the embodiment of the present invention.

FIG. 30 is a schematic representation of the track structure of this partial ROM disk of the combined type of a twin-pit-type ROM and an L/G-alternate-type RAM. FIG. 31 shows a servo area ARs at the circumferential position TNCG and parts of a data area ARd before and after the servo area ARs in this partial ROM disk.

In FIG. 30, the portions at the places corresponding to the servo area ARs represent servo pits for three-phase tracking described heretofore.

Further, the curved-line portions depicted as shading portions in the data area ARd between two servo areas ARs in the outer region side of the disk represent data tracks by grooves GB, and the portions where shading is not given in the data areas ARd represent data tracks by lands LD.

Further, a solid-line arrow SSPR which proceeds in a spiral shape indicates the recording scanning path and the reproduction scanning path of the laser spot LSP in the rewritable area of the L/G-alternate-type RAM of the outer region side of this disk.

Meanwhile, the curved lines depicted as the black portions in the data area ARd between two servo areas ARs in the circumferential direction on the inner region side of the disk represent report data tracks by pits. Further, a solid-line arrow SSPR which proceeds in a spiral shape indicates the reproduction scanning path of the laser spot LSP on the inner region side which is made to be a twin-pit-type ROM.

FIG. 31 is an enlarged view of a servo area ARs and a data area ARd before and after the servo area ARs in a rewritable area of the L/G-alternate-type RAM, which has the same structure as that in FIG. 29 described above and in the ROM area as the twin-pit-type ROM which has the same structure as that in FIG. 18 described above. The representation method is similar to that of FIGS. 18 and 29 described above.

The servo area ARs is an area of 24 servo clock periods with the servo clock SCK as a reference, and servo-pit information is extracted or the like in accordance with the servo clock SCK. Further, the segment type is represented by the position of the servo pit at the position $PS_A$, as described in FIGS. 8A to 8D.

Meanwhile, in the data area ARd, data is reproduced in accordance with the data clock DCK. The data area ARd on the inner region side of the disk is made to be a pit sequence in the shape of a double spiral by the left track Ltk and the right track Rtk in a similar manner as the above-described twin-pit-type ROM disk. The data area ARd on the outer region side of the disk is made as grooves GB or lands LD.

The postwrite area PO which is at the end of the data area ARd and the prewrite area PR which is at the beginning of the data area ARd are used mainly for the purpose of preventing residual heat of the laser and unerasure of recorded data during a recording operation, as described in FIGS. 5A to 5D. Meanwhile, in the ROM area on the inner region side of the disk, an anchor pit Pan is formed for the purpose of compatibility of the formats and reducing a mirror portion.

As can be seen from FIGS. 30 and 31, on the outer region of this partial ROM disk, the center of the servo pit tracks (the pit sequence in the servo area ARs) does not coincide with the center of the data tracks (the lands LD or the grooves GB in the data area ARd) in the circumferential direction.

Therefore, when tracking servo is performed by two adjacent servo pit tracks which form one of pattern A, pattern B, and pattern C, and the recording and reproduction scanning path SSPR of the laser spot LSP proceeds with the middle position of the two adjacent servo pit tracks as the tracking center as shown in the figure, the recording reproduction scanning path SSPR proceeds along the center of the grooves GB or along the center of the lands LD in the data area ARd.

That is, the correct tracking state is reached with respect to the grooves GB or the lands LD, and scanning by the laser spot LSP proceeds.

Then, when seen for each circular track with the circumferential position TNCG as the starting point and the end point, tracks formed of segments in which the data area ARd is made to be grooves GB, and tracks formed of segments in which the data area ARd is made to be lands LD appear alternately. As a result, both the grooves GB and the lands LD are used for recording data.

In FIG. 31, the situation in which the recording and reproduction scanning path SSPR which has proceeded along the land tracks enters the groove tracks with the servo area ARs after this circumferential position TNCG as a boundary is shown as (LD →GB), and the situation in which the recording and reproduction scanning path SSPR which has proceeded along the groove tracks enters the land tracks with the servo area ARs after this circumferential position TNCG as a boundary is shown as (GB→LD).

Further, as can be seen from FIGS. 30 and 31, in this disk, the servo pit tracks and the data tracks (the pit sequence in the data area ARd) coincide with each other in the circumferential direction.

Therefore, when tracking servo is performed by two adjacent servo pit tracks which form one of pattern A, pattern B, and pattern C, and the reproduction scanning path SSP of the laser spot LSP proceeds with the middle position of the two adjacent servo pit tracks as a tracking center as shown in the figure, the reproduction scanning path SSP proceeds along the middle position of the data tracks also in the data area ARd. That is, the two adjacent data tracks are simultaneously scanned by the laser spot LSP.

Further, as can be seen from FIG. 30, the left track Ltk and the right track Rtk form spiral-shaped tracks in a paired state.

In this partial ROM disk, as can be seen in FIG. 30, the servo-pit patterns in the servo area ARs are formed in the order: pattern A, pattern B, pattern C, pattern A, pattern B, pattern C, and so on in the circumferential direction from the outermost region to the innermost region.

Further, when seen in the radial direction, in the case of patterns as shown in FIGS. 7B and 7C, that is, patterns change in the order: pattern A, pattern B, pattern C, and so on with the middle of each pair of servo pit tracks seen in sequence as a reference.

On the tracks of the portion where a shift is made from the rewritable area by the grooves GB/lands LD to the ROM area by the pit sequence, the regularity of the servo pits is distorted. This is due to the situation during the cutting operation, the details of which will be described later.

In the case of this partial ROM disk, since the recording and reproduction scanning path SSPR, performed on the outer region side, proceeds along the groove tracks and the land tracks alternately, the reproduction scanning path SSP proceeds in units of the pitch of the lands LD and the grooves GB when seen in the radial direction.

In FIG. 31, servo-pit patterns corresponding to each recording and reproduction scanning path SSPR are shown as (A), (B) and (C) on the left side of each recording and reproduction scanning path SSPR. As can be seen when each recording and reproduction scanning path SSPR is seen in sequence in the radial direction of the disk, tracking servo control is performed in the order: pattern A, pattern B, pattern C, pattern A, pattern B, pattern C, and so on in the radial direction, and thus scanning which proceeds along the groove tracks and the land tracks alternately is performed.

Meanwhile, since the reproduction scanning path SSP performed on the inner region side proceeds along the center of the double spiral so as to simultaneously scan the left track Ltk and the right track Rtk in the shape of a double spiral, the reproduction scanning path SSP proceeds in units of two track pitches when seen in the radial direction.

In FIG. 31, as can be seen when each reproduction scanning path SSP is seen in sequence in the radial direction of the disk, tracking servo control is performed in the order: pattern A, pattern B, pattern C, pattern A, pattern B, pattern C, and so on in the radial direction, and thus simultaneous scanning of tracks (the left track Ltk and the right track Rtk) is performed.

That is, in this partial ROM disk, a sequence in which switching patterns of the tracking servo control are made in a different sequence between the rewritable area on the outer region side and the ROM area on the inner region side.

In this case, even if the data track pitch, i.e., the width from the center of the lands LD to the center of the grooves GB, and the width from the center of the left track Ltk to the center of the right track Rtk are set at 0.6 µm, and the size of the laser spot LSP is set at 1.2 µm, which is approximately two times as large, the patterns A, B and C are each formed at a width of 1.2 µm. Therefore, a track pitch of at least 1.2 µm is secured in the case of the tracking operation in the recording and reproduction scanning path SSPR, and tracking servo with sufficient accuracy can be performed.

Furthermore, since the servo pits are arrayed in the order: pattern A, pattern B, pattern C in the radial direction as shown in the figure, there is no interference from the servo pits other than the servo pits which form the servo pattern at that time. That is, this becomes comparable to the case when the laser spot LSP passes along the center of the servo pit group which forms a certain pattern, the servo pits which are adjacent to each of the servo pits cannot be seen.

Therefore, regarding the tracking servo operation, it becomes equivalent to the servo control at the track pitch of 1.8 µm which is three times as wide as the data track pitch, making it possible to perform tracking control accurately and stably, and a narrower track pitch can be handled.

And, in the rewritable area of this partial ROM disk, since both the lands LD and the grooves GB are used as recording tracks, it is possible to realize high-density recording two times higher than a conventional disk, i.e., a disk in which either the lands or the grooves are made to be recording tracks.

Further, in the ROM area of this partial ROM disk, since a twin-pit-type ROM having a track pitch of 0.6 µm is used, two-track simultaneous scanning is performed by the above-described two-channel twin-pit method and logical twin-pit method, and further, multi-valued data, such as three values or four values, can be recorded in the two-channel twin-pit method and the logical twin-pit method. Thus, it is possible to realize a two-fold high-density recording or higher and a higher transfer rate.

<Twin-Pit Single-Data-Type ROM and L/G-Alternate-Type RAM>

Next, referring to FIGS. 32 and 33, a description will be given of an example of a partial ROM disk having a ROM area which is a twin-pit single-data-type ROM and a rewritable area which is an L/G-alternate-type RAM.

Since the representation of the track structure of this disk is similar to that of FIG. 30 described above, an illustration and description thereof has been omitted. FIG. 32 shows a servo area ARs and parts of a data area ARd before and after the servo area ARs in this partial ROM disk.

In this example, the rewritable area which is on the outer region side of the disk is made to be an L/G-alternate-type RAM similar to the partial ROM disk described in FIG. 31 and therefore, a description thereof has been omitted.

In this example, the structure of the ROM area is different from that of the example of FIG. 31 described above. That is, the following is similar in that the left track Ltk and the right track Rtk are scanned simultaneously. However, a pit sequence of the form such as the above-described two-channel twin pits or the logical twin pits is not formed, and pits or a mirror plane are not formed to be physically adjacent to each other in the left track Ltk and the right track Rtk.

Figure 32:
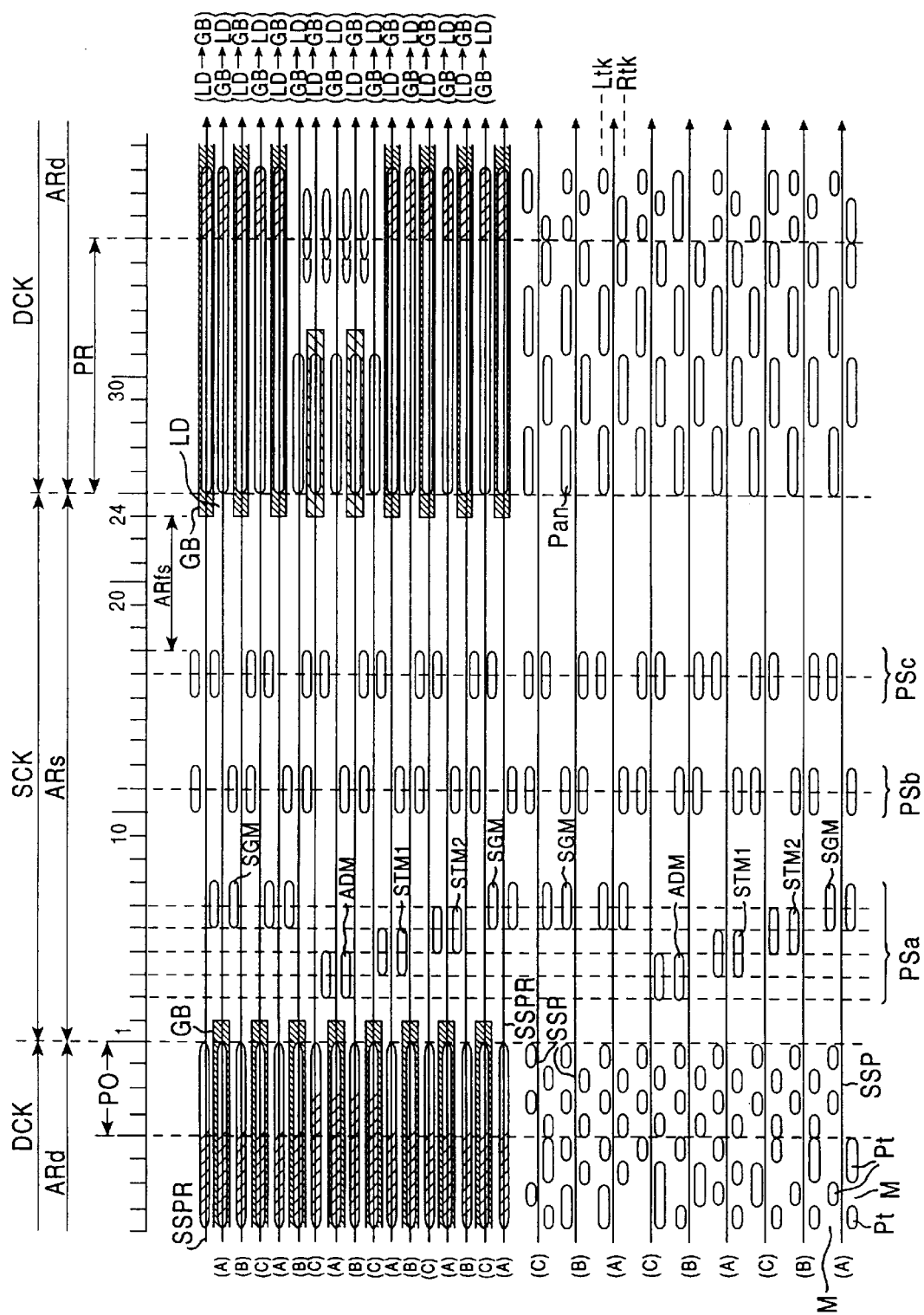
FIG. 32 is an illustration of a partial ROM disk formed by a twin-pit single-data-type ROM and an L/G-alternate-type RAM according to the embodiment of the present invention.

In this case, as shown in FIG. 32, the ROM area is similar to the partial ROM of FIG. 31 in the servo area ARs, and servo pits for three-phase tracking are formed.

Meanwhile, in the data area ARd, on the tracks which are on both sides when seen from the tracking center of the reproduction scanning path SSP, i.e., on the left track Ltk and the right track Rtk, pits Pt in the pit sequence, and the mirror plane M are formed to be inverted to each other.

More specifically, with the left track Ltk and the right track Rtk each being as a pit sequence and an inverted pit sequence, data for one track is formed. When seen in terms of data, the two tracks of the left track Ltk and the right track Rtk form one track.

Then, also in this case, the track pitch of the left track Ltk and the right track Rtk is set at, for example, 0.6 µm, and the left track Ltk and the right track Rtk which form a double spiral are simultaneously scanned. When seen for each timing of the data clock DCK of the reproduction scanning path SSP, when the pits Pt are present on the left track Ltk, the right track Rtk becomes the mirror plane M. Further, when the left track Ltk becomes the mirror plane M, the pits Pt are formed on the right track Rtk.

Therefore, as long as the data area ARd of this ROM area is scanned by the laser spot LSP, either of the pits Pt are always present within the laser spot LSP.

The prewrite area PR and the postwrite area PO in the data area ARd need not always to be a pit sequence and an inverted pit sequence as shown in the figure. It is only necessary that in the real data portion excluding the prewrite area PR and the postwrite area PO of the data area ARd, the left track Ltk and the right track Rtk be in the relation of a pit sequence and an inverted pit sequence. However, in the prewrite area PR or the postwrite area PO, when some data is to be recorded, it is preferable that these areas also be placed in the relation of a pit sequence and an inverted pit sequence.

In the ROM area of this partial ROM disk, during the reproduction thereof, the pit sequence and the inverted pit sequence are reproduced in accordance with the data clock DCK.

The longitudinal lines indicated by the broken line in FIGS. 33A, 33B and 33C indicate the timing of the data clock DCK.

As can be clearly seen from this FIG. 33A, the beginning and the end of the pits Pt in the pit sequence and the inverted pit sequence are formed to be synchronized with the timing of the data clock DCK. Further, the reproduction logical data with respect to the pit sequence is structured in such a way that the boundary (i.e., the above-mentioned beginning and end) between the pits Pt and the mirror plane M is logically set to "1", and that portion (and the portion of the mirror plane) of the pits Pt other than the boundary is logically set to "0".

The signal waveforms of the push-pull signal and the RF signal obtained when such pit sequence and inverted pit sequence are scanned are shown in FIGS. 33B and 33C, respectively.

The push-pull signal and the RF signal shown in FIGS. 33B and 33C are waveforms produced by reproducing the pit sequence and the inverted pit sequence in the data area ARd shown in FIG. 33A.

As shown in FIG. 33C, in the data area ARd, when pits Pt are present on the left track Ltk with the tracking center of the reproduction scanning path SSP as a reference, a mirror plane M is always present on the right track Rtk. When, in contrast, the left track Ltk is the mirror plane M, pits Pt are always present on the right track Rtk. Because of this relation, the signal level of the RF signal reaches a middle level (M).

On the other hand, the push-pull signal reaches "0" in the boundary between the mirror plane M and the pits Pt in the pit sequence (or the inverted pit sequence). For example, when the pits Pt are present on the left track Ltk, the signal becomes a signal waveform which fluctuates to the (−) direction; when the pits Pt are present on the right track Rtk, the signal becomes a signal waveform which fluctuates to the (+) direction.

In the case where the pit sequence and the inverted pit sequence are formed on the left track Ltk and the right track Rtk as described above, by reproducing the data in accordance with the push-pull signal, the DC balance can be made satisfactory, that is, the value of a digital sum value (DSV) can be made zero. This can be naturally achieved without performing modulation, such as EFM (Eight to Fourteenth Modulation), for stabilizing DC balance, making it possible to record the data as pit information as it is without performing modulation, such as EFM, namely, modulation which causes the data length to increase, on the recording data, and it becomes possible to realize a higher density of the recording data.

In particular, when the RF signal is detected, detection using partial response PR (1.1) is performed, and this detection using PR (1.1) is performed by Viterbi decoding. This makes it possible to effectively remove intersymbol interference during reproduction, caused by the high-density recording, and to improve the S/N ratio of the reproduction signal.

Further, by making a determination of the data area ARd out of the recording patterns on the basis of the fact that the level of the RF signal is at a middle level and the level of the push-pull signal is not "0", whether or not the data area ARd can be determined easily, making it possible to achieve a higher-speed access to the recording data.

<Twin-Pit-Type ROM and Single-Data-Type RAM>

Next, with reference to FIGS. 34 and 35, a description will be given of an example of a partial ROM disk having a ROM area which is made to be a twin-pit-type ROM and a rewritable area which is made to be a single-data-type RAM.

FIG. 34 shows a representation of the track structure of this partial ROM disk. FIG. 35 shows a servo area ARs and parts of a data area ARd before and after the servo area ARs in this twin-pit-type ROM disk.

In this example, the ROM area which is on the inner region side of the disk is made to be a twin-pit-type ROM similar to the partial ROM disk described in FIGS. 30 and 31 described above and therefore, a description thereof has been omitted.

In this example, the structure of the rewritable area is different from that of the above-described example of FIG. 31, that is, only either the lands LD or the grooves GB are used as tracks in the data area ARd. In the case of this example, the grooves GB are made to be data recording tracks, and as can be seen from FIG. 34, the tracks on which the data area ARd is formed by the grooves GB are formed in a spiral shape.

Figure 35:
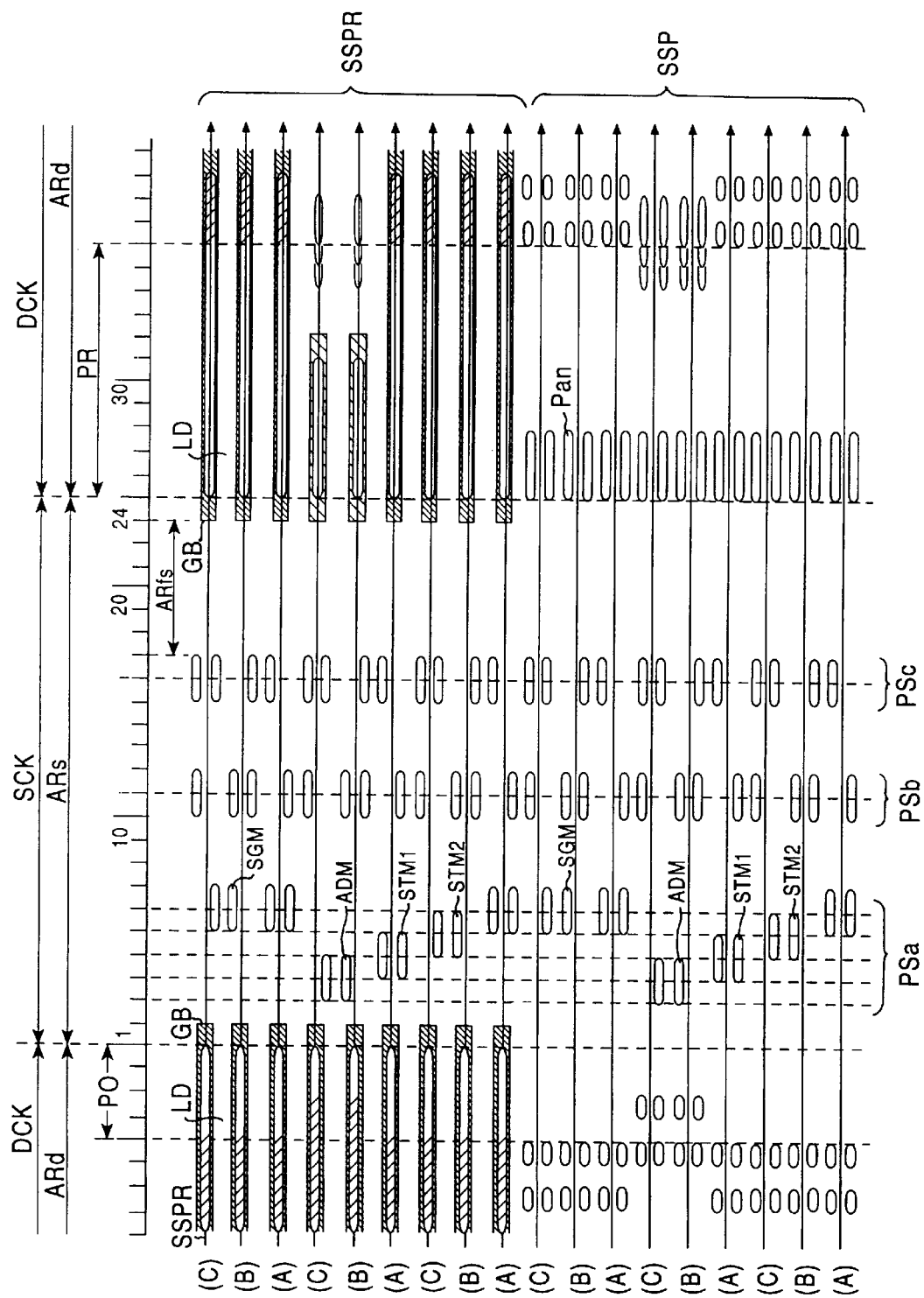
FIG. 35 is an illustration of the partial ROM disk formed by a twin-pit-type ROM and a single-data-type RAM according to the embodiment of the present invention.

And, as can be seen from FIGS. 34 and 35, on the outer region side of this partial ROM disk, the center of the servo pit tracks does not coincide with the center of the data tracks (the grooves GB in the data area ARd) in the circumferential direction. Therefore, when tracking servo is performed by two adjacent servo pit tracks which form one of pattern A, pattern B, and pattern C, in the data area ARd, the recording and reproduction scanning path SSPR proceeds along the center of the grooves GB.

That is, the correct tracking state is reached with respect to the grooves GB, and scanning by the laser spot LSP proceeds.

When seen for each circular track with the circumferential position TNCG as the starting point and the end point, by switching in the order: pattern C, pattern B, pattern A, pattern C, pattern B, pattern A, . . . for the tracking servo control, scanning of the groove tracks in a spiral shape is performed. This pattern switching is similar to that in the ROM area which is made to be a twin-pit type.

In this partial ROM disk, a particularly remarkable high density cannot be realized in the rewritable area. However, since the ROM area is made to be a twin-pit type, it is possible to realize a larger size of read-only data.

[(Cutting Apparatus]
<Construction of the Apparatus>

A description will now be given of a method of cutting the above-described partial ROM disk in which a twin-pit-type ROM and an L/G-alternate-type RAM are combined.

For example, the process for manufacturing a partial ROM disk can be broadly classified into what is commonly called a mastering process and a disk formation process (replication process). The mastering process is a process up to the completion of a metallic master (stamper) used in the disk formation process, and the disk formation process is a process in which a stamper is used to mass produce optical disks, which are replicas thereof.

To be specific, in the mastering process, a photoresist is applied to a polished glass substrate, and what is commonly called cutting for forming pits Pt and grooves GB by exposure using a laser beam onto a photosensitive film thereof is performed.

The information of the pits Pt to be recorded is pit data in the ROM area, address data in the address segments, and further, servo pits in the servo area ARs.

The pit data in the ROM area is prepared in a preparation process called premastering.

Then, when the cutting terminates, after a process such as development is performed, information is transferred onto the metal surface by, for example, electroforming, and a stamper required to make replicas of disks is produced.

Next, the information is transferred onto a resin substrate by, for example, an injection process or the like by using this stamper, a reflection film is formed thereon, and a process for, for example, forming the resin substrate into the necessary disk shape is performed, completing the final product.

In various disks of this example, the depth of the grooves GB and the pits Pt to be cut is set to approximately $\lambda/5$ to $\lambda/6$ in which $\lambda$ is the laser wavelength.

As a result, it is possible to tolerate a wide crosstalk and various margins during land/groove recording and further, it is possible to secure a wide margin when twin pits are scanned simultaneously for reproduction.

Figure 36:
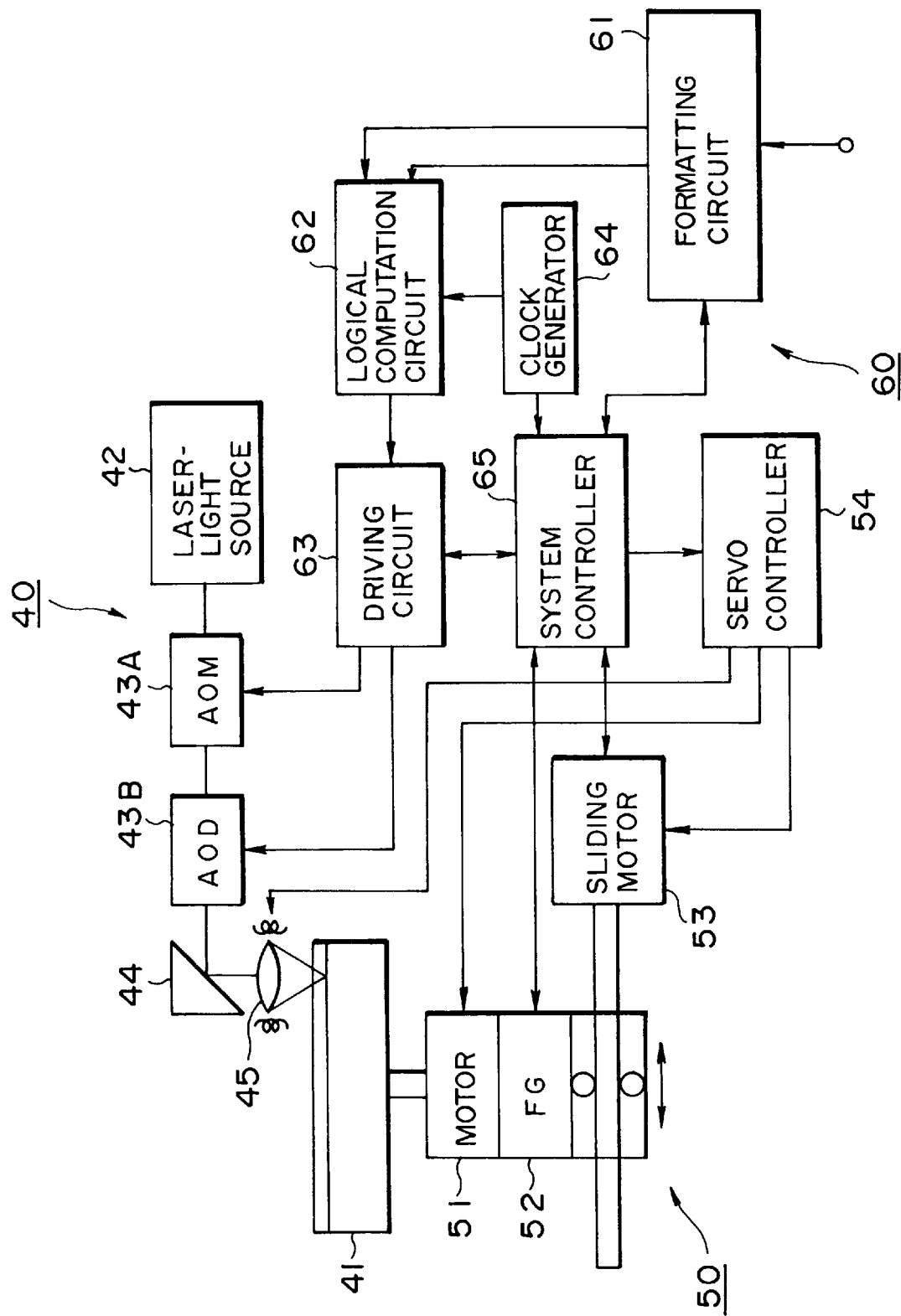
FIG. 36 is a block diagram of an apparatus for cutting a partial ROM disk formed by a twin-pit-type ROM and an L/G-alternate-type RAM according to the embodiment of the present invention.

The cutting apparatus, as shown, for example, in FIG. 36, comprises an optical section 40 for performing cutting by radiating a laser beam onto a glass substrate 41 on which photoresist has been applied, a driving section 50 for rotationally driving the glass substrate 41, and a signal processing section 60 for converting input data into recording data and controlling the optical section 40 and the driving section 50.

The optical section 40 is provided with a laser-light source 42 formed of, for example, a He-Cd laser, an acousto-optic-type light modulator 43A (AOM) for modulating (on/off) light radiated from this laser-light source 42 on the basis of recording data, an acousto-optic-type light deflector 43B (AOD) for deflecting light radiated from this laser-light source 42 on the basis of recording data, a prism 44 for bending the optical axis of the modulated beam from the light deflector 43B, and an object lens 45 for collecting the modulated beam reflected by the prism 44 and radiating the beam onto the photoresist surface of the glass substrate 41.

Further, the driving section 50 is formed of a motor 51 for rotationally driving the glass substrate 41, an FG 52 for generating an FG pulse for detecting the rotational speed of the motor 51, a sliding motor 53 for sliding the glass substrate 41 in the radial direction thereof, and a servo controller 54 for controlling the rotational speeds of the motor 51 and the sliding motor 53, and the tracking or the like of the object lens 45.

Further, the signal processing section 60 is formed of a formating circuit 61 for forming input data by adding, for example, an error correction code, to source data from, for example, a computer, a logical computation circuit 62 for forming recording data by performing a computation process on data input from this formating circuit 61, a driving circuit 63 for driving the light modulator 43A and the light deflector 43B on the basis of the recording data from the logical computation circuit 62, a clock generator 64 for supplying a clock to the logical computation circuit 62 and the like, and a system controller 65 for controlling the servo controller 54 and the like in accordance with the supplied clock.

And, in this cutting apparatus, during cutting the servo controller 54 causes the motor 51 to cause the glass substrate 41 to be rotationally driven at a fixed angular velocity and causes the sliding motor 53 to cause the glass substrate 41 to slide so that tracks in a spiral shape are formed at a predetermined track pitch while the glass substrate 41 is being rotated.

At the same time, the light radiated from the laser-light source 42 is made a modulated beam based on the recording data via the light deflector 43B and radiated onto the photoresist surface of the glass substrate 41 via the object lens 45. As a result, the photoresist layer is photosensitized on the basis of the recording data.

Meanwhile, the input data to which an error correction code and the like has been added by the formating circuit 61 is supplied to the logical computation circuit 62, and recording data is formed.

The logical computation circuit 62 generates, for example, data to be recorded as the above-described two-channel twin pits or data to be recorded as the above-described logical twin pits.

This recording data is supplied to the driving circuit 63. The driving circuit 63 controls the light modulator to the on state at the timing at which the pit Pt should be formed on the basis of the recording data and during the interval in which the grooves GB should be formed, and drivingly controls the light modulator 43A to the off state at the timing and during the interval in which the recording data does not form pits (that is, formed into the mirror plane M and the lands LD).

Further, when the servo pit does not coincide with the tracking center at that time, that is, when a servo pit track which does not coincide with the groove tracks/land tracks in the circumferential direction in the rewritable area, the driving circuit 63 performs driving control so that the deflection direction by the light deflector 43B is in the +$\alpha t$ or −$\alpha t$ direction at the timing of the servo pits in order to form the servo pits at positions deviated in the radial direction from the tracking center.

When a representation using wobble pits in the ROM area is made as described above, driving control is performed so that the deflection direction by the light deflector 43B is in the +$\alpha t$ or −$\alpha t$ direction at the timing corresponding to the wobble pits indicated by "β" and "γ" in FIG. 24B.

Through such operation, an exposure portion corresponding to the groove/servo pit/address information and the like is formed on the glass substrate 41 in accordance with the format, and an exposure portion corresponding to data pits in the ROM area is formed.

Thereafter, development, electroforming and the like are performed to produce a stamper, and a partial ROM disk in which the above-described twin-pit-type ROM and L/G-alternate-type RAM are combined is produced by using the stamper.

<Cutting Operation>

An operation of cutting a partial ROM disk in which a twin-pit-type ROM and an L/G-alternate-type RAM are combined by means of a cutting apparatus such as that shown in FIG. 36 will be described with reference to FIGS. 37 to 40.

Figure 37:
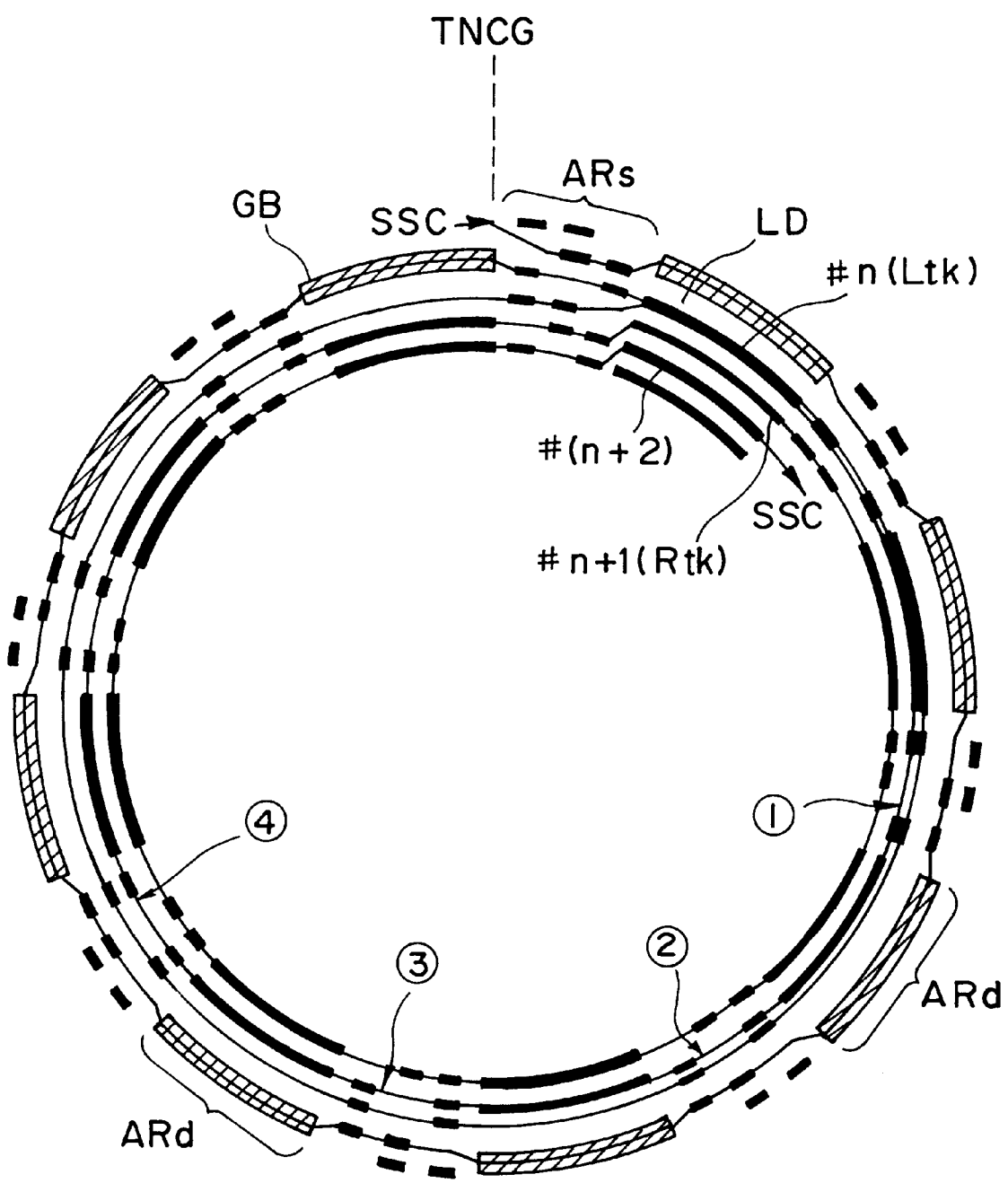
FIG. 37 is an illustration of an operation in a boundary portion in the cutting apparatus of the partial ROM disk according to the embodiment of the present invention.
Figure 40:
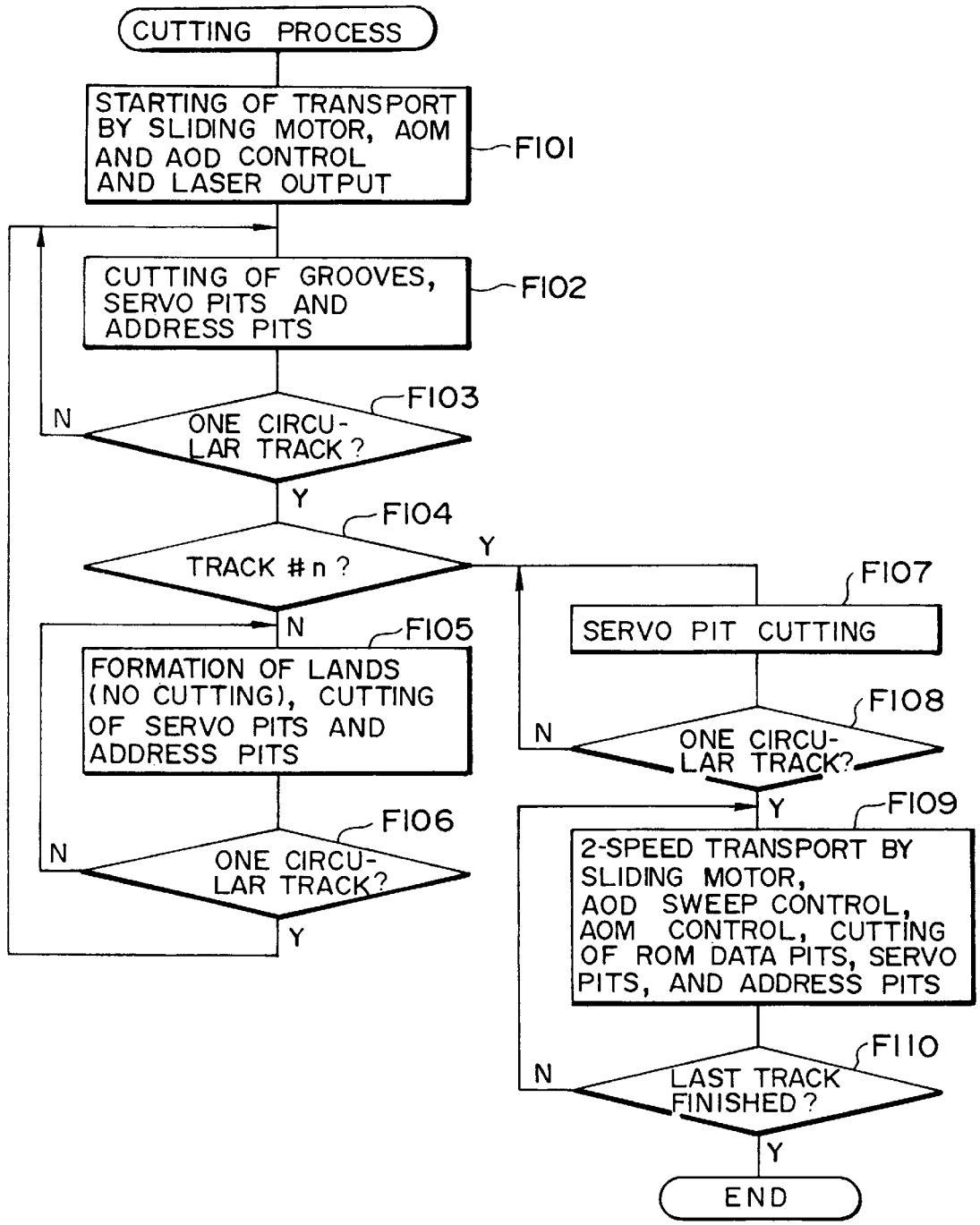
FIG. 40 is a flowchart of cutting operation control of the cutting apparatus of the partial ROM disk according to the embodiment of the present invention.

FIGS. 38, 39A, 39B and 39C show a transport operation of the glass substrate 41 by the sliding motor 53. FIG. 40 shows the processing procedure of the system controller 65 for the cutting operation of this partial ROM disk. FIG. 37 shows the boundary portion between the rewritable area and the ROM area of the schematic view of FIG. 30, and codes and the like are added for the description of the cutting operation in this boundary portion.

The cutting operation will be described below with reference to the flowchart shown in FIG. 40. In the cutting of a partial ROM disk whose outer region is a rewritable area formed by land tracks and groove tracks, such as that of FIG. 30, initially, the cutting for producing a rewritable area is performed by the process of steps F101 to F106. That is, exposure for the formation of grooves, servo pits, data pits (hereinafter referred to as address pits) of the address of the address segments, and the like is performed by laser light.

For this purpose, first, in step F101, a transport operation of the glass substrate 41 by the sliding motor 53 is started, and further, the laser output from the laser-light source 42, and the operation of the light modulator 43A and the light deflector 43B are started.

The transport operation of the glass substrate 41 by the sliding motor 53 at this time is an operation for causing the glass substrate 41 to slide by the amount of a data track pitch for each rotation of the operation for rotating the glass substrate 41 by the motor 51.

In the partial ROM disk of FIG. 30, the distance between each center of the land tracks LD and the groove tracks GB is the data track pitch, and the data track pitch is set to 0.6 µm as described above.

Figure 38:
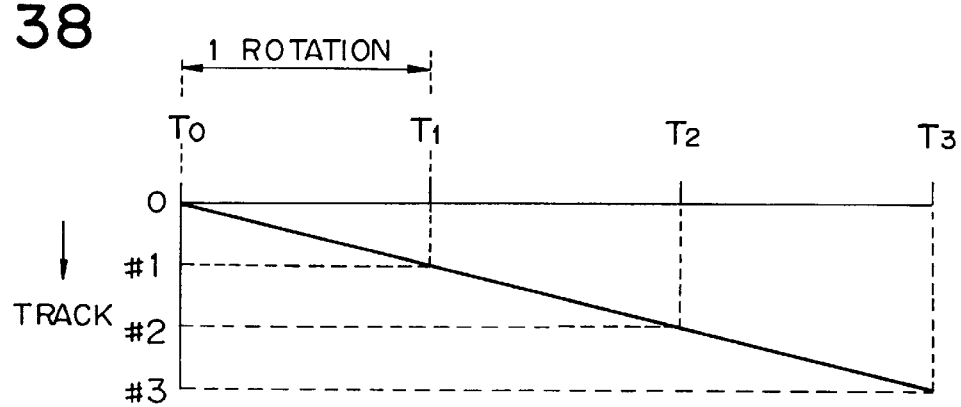
FIG. 38 is an illustration of a glass substrate transport operation in the cutting apparatus of the partial ROM disk according to the embodiment of the present invention.
Figure 39:
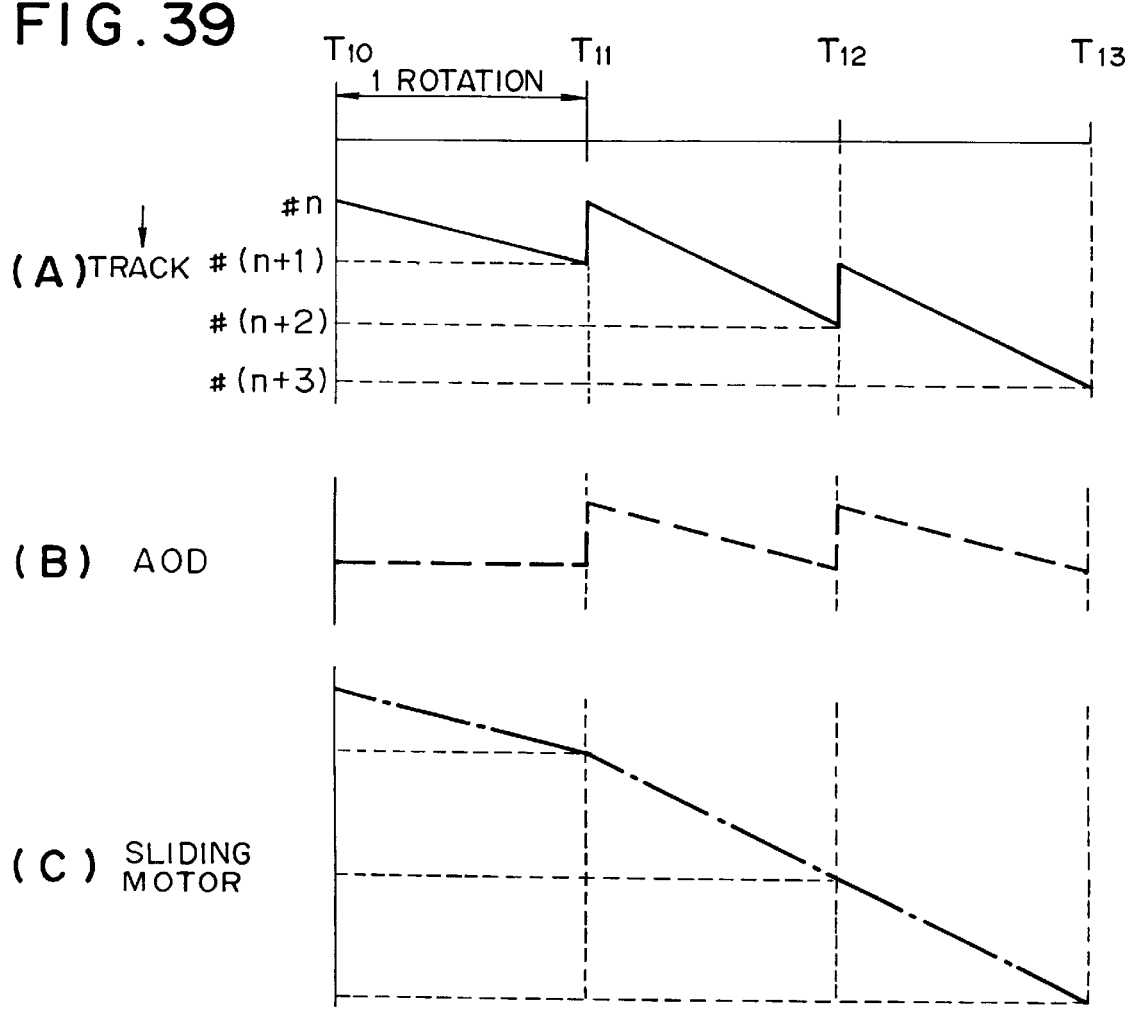
FIGS. 39A, 39B and 39C are illustrations of a control operation in a boundary portion in the cutting apparatus of the partial ROM disk according to the embodiment of the present invention.

The distance in the radial direction of the disk is taken along the horizontal axis of FIG. 38, and the time is taken along the vertical axis. It is then assumed that tracks #1, #2, #3 and soon are positions in the radial direction at the circumferential positions TNCG of the mutually adjacent groove tracks, land tracks, groove tracks, and soon. As shown here in the figure, tracks in a spiral shape are formed as a result of the sliding at a velocity such that the movement by the amount of track pitch, i.e., 0.6 µm, is completed in each one of the rotation intervals $T_0$ to $T_1$, $T_1$ to $T_2$, $T_2$ to $T_3$, and soon.

In order to form groove tracks and land tracks alternately for each circular track while such sliding is performed, the process of steps F102 to F106 is performed.

In the loop of steps F102 and F103, for cutting the first circular track, cutting of servo pits in the servo area ARs of each segment SEG(x) which form the tracks, address pits in the data area ARd of the address segment ASEG(x), and grooves in the data area ARd of the data segment DSEG(x) is performed.

More specifically, the light modulator 43A is controlled by the driving circuit 63 so that laser light is radiated onto the glass substrate 41 at each timing of the servo pits, the address pits, and the grooves. Further, the light deflector 43B is controlled so as to form the servo pits at positions deviated from the tracking center. As a result, the cutting of the groove tracks is performed.

Then, when the cutting for one circular track is terminated, the process proceeds from step F104 to steps F105 and F106. Then, during the time until the next circular track is finished, cutting of the servo pits in the servo area ARs of each segment SEG(x) which form the track, and the address pits in the data area ARd of the address segment ASEG(x) is performed. Since the data area ARd of the data segment DSEG(x) is lands in this track, groove cutting is not performed.

That is, the light modulator 43A is controlled by the driving circuit 63 so as to radiate laser light onto the glass substrate 41 at each timing of the servo pits and the address pits. Further, the light deflector 43B is controlled to form servo pits at positions deviated from the tracking center. As a result, cutting of the land tracks is performed.

When this cutting for one circular track is terminated, the process returns from step F106 to step F102 where a process which is the same as that described above is performed. Through the repetition of such a process, a rewritable area in which a land track and a groove track appear alternately is formed.

Track #n in step F104 refers to a track number which is the boundary between the rewritable area and the ROM area. That is, when the cutting operation reaches track #n, switching is performed from the alternate cutting of the groove track and the land track in the process of steps F102 and F106 to the process for forming a pit sequence for a ROM area in the shape of a double spiral by the left track Ltk and the right track Rtk.

When the cutting reaches track #n, first, the process proceeds to step F107, and in steps F107 and F108, cutting of only the servo pits is performed for only one circular track with the transport speed of the glass substrate 41 kept constant.

Then, after the cutting of one circular track, the process proceeds to step F109 where the transport speed of the glass substrate 41 by the sliding motor 53 is made two times as fast. Further, cutting of the ROM data pits, servo pits, and address pits in the left track Ltk and the right track Rtk is started. Of course, control of the light modulator 43A is performed for this pit cutting operation, and the sweep control of the light deflector 43B is performed to form double-spiral tracks.

A cutting operation of such a boundary portion and a cutting operation for forming double-spiral tracks in the ROM area will be described with reference to FIGS. 37, 39A, 39B and 39C.

In FIG. 37, the solid-line arrow SSC indicates the path (cutting scanning) of laser radiation for cutting. It is assumed that the cutting scanning SSC of the tracks by the grooves GB and the servo area ARs shown in the outermost region in this figure is on the last track of the rewritable area.

When the cutting scanning of the last track of this rewritable area is terminated and reaches track #n, first, cutting of servo pits is performed for one circular track as it is in steps F107 and F108.

The control of the light deflector 43B and the transport control by the sliding motor 53 are shown in FIG. 39B and 39C. When the interval from $T_{10}$ to $T_{11}$ is the first circular track, in this interval, as shown in FIG. 39C, tracking control by the sliding motor 53 is set at a velocity of 0.6 µm for each circle similarly to the case of the rewritable area shown in FIG. 38.

Also, in this interval, as in FIG. 39B, deflection control by the light deflector 43B is not performed.

Then, from the time $T_{11}$ when the first circle is terminated, in the process of step F109, deflection control (sweep control) indicated by the broken line is performed on the light deflector 43B as shown in FIG. 39B and 39C, and the transport speed by the sliding motor 53 is made two times as fast.

Through this operation shown in FIGS. 39B and 39C, in practice, the deviation of the laser radiation position in the radial direction become such as those shown in FIG. 39A. That is, from the time $T_{11}$, the path of the laser radiation position deviates by an amount of two tracks in the radial direction for each circle, and returns by an amount of one track in the radial direction for each circle.

Through such an operation, as can be understood when the cutting scanning SSC in FIG. 37 is followed, when the cutting of only the servo pits of the first circle of track #n is terminated, the position of the cutting scanning SSC in the radial direction returns again to the start position of track #n, and from this time, servo pits, data pits, and address pits of track #n are formed. At this time, since the transport speed by the sliding motor 53 is two-times greater, the path of the cutting scanning SSC in a spiral shape becomes gradually separated from the path of the immediately previous circle. This situation can be understood from the fact that the exposure portion of the servo pits become gradually separated, like the portions of ①to ④ in FIG. 37.

Then, in the cutting scanning SSC of one circle at this time, since the transport speed is two-times greater, the position in the radial direction when that circle is terminated is a position corresponding to track #(n+2). That is, the position is moved by an amount of two tracks.

After this circle, the first circle of the left track Ltk is formed.

At a time $T_{12}$ when the next circle is started, since the deflection by the light deflector 43B is returned to the sweep start position, the position in the radial direction of the cutting scanning SSC is returned by an amount of one track and becomes the position of track #(n+1).

Then, the cutting scanning SSC of track #(n+1), i.e., the right track Rtk, is performed.

Thereafter, a similar operation is repeated until the cutting of the last track is terminated in step F110, and tracks in the shape of a double spiral by the left track Ltk and the right track Rtk are formed as the ROM area.

As described above, in order to form a rewritable area of the partial ROM disk of FIG. 30, a cutting operation for one circular track for performing pit cutting of the servo area and the groove cutting of the data area in each segment, and a cutting operation for one circular track for performing pit cutting of the servo area are performed alternately for each circular track.

Further, in order to form tracks in the shape of a double spiral in the ROM area, the movement speed of the cutting position in the radial direction of the disk is made to be two times as fast as that in the rewritable area, and through, for example, control on the light deflector 43B, the return movement of the cutting position for one circular track is performed in the radial direction of the disk for each circular track.

As a result of the above, the cutting of the partial ROM disk in which the twin-pit-type ROM and the L/G-alternate-type RAM are combined can be performed.

Further, when shifting from the cutting operation of the rewritable area to the cutting operation of the ROM area, for the cutting operation of the first circle of the ROM area, the cutting of the servo pits in each segment is performed with the movement speed of the cutting position in the radial direction of the disk, i.e., the transport speed by the sliding motor 53, kept the same as the movement speed in the rewritable area. For the cutting operation of the second and subsequent circles, the transport speed is made two times as fast, and the return movement of the cutting position for one circular track is performed in the radial direction of the disk for each circular track, and thus servo pits can be formed satisfactorily even in the boundary portion.

[RAM Disk]
<L/G Twin-Track-Type RAM Disk: Type 1>

Next, a description will be given of a RAM disk as a disk of this example, which is formed in accordance with the disk structure, the track/frame/segment format, and the sector format, described heretofore, and on which servo pits are formed so that the above-described three-phase tracking operation is performed.

The feature of this RAM disk is that physically speaking, grooves GB are formed in a spiral shape, and both of the grooves GB and the portions (i.e., the lands LD) adjacent to the grooves GB are made to be data recording tracks. That is, from the viewpoint of data recording tracks, tracks form a double spiral as the above-described twin-pit-type ROM. Such a RAM disk will be specifically referred to as a land/groove twin-track-type (L/G twin-track-type) RAM disk.

As this L/G twin-track-type RAM disk, two types are possible, and will be described as type 1 and type 2.

Figure 41:
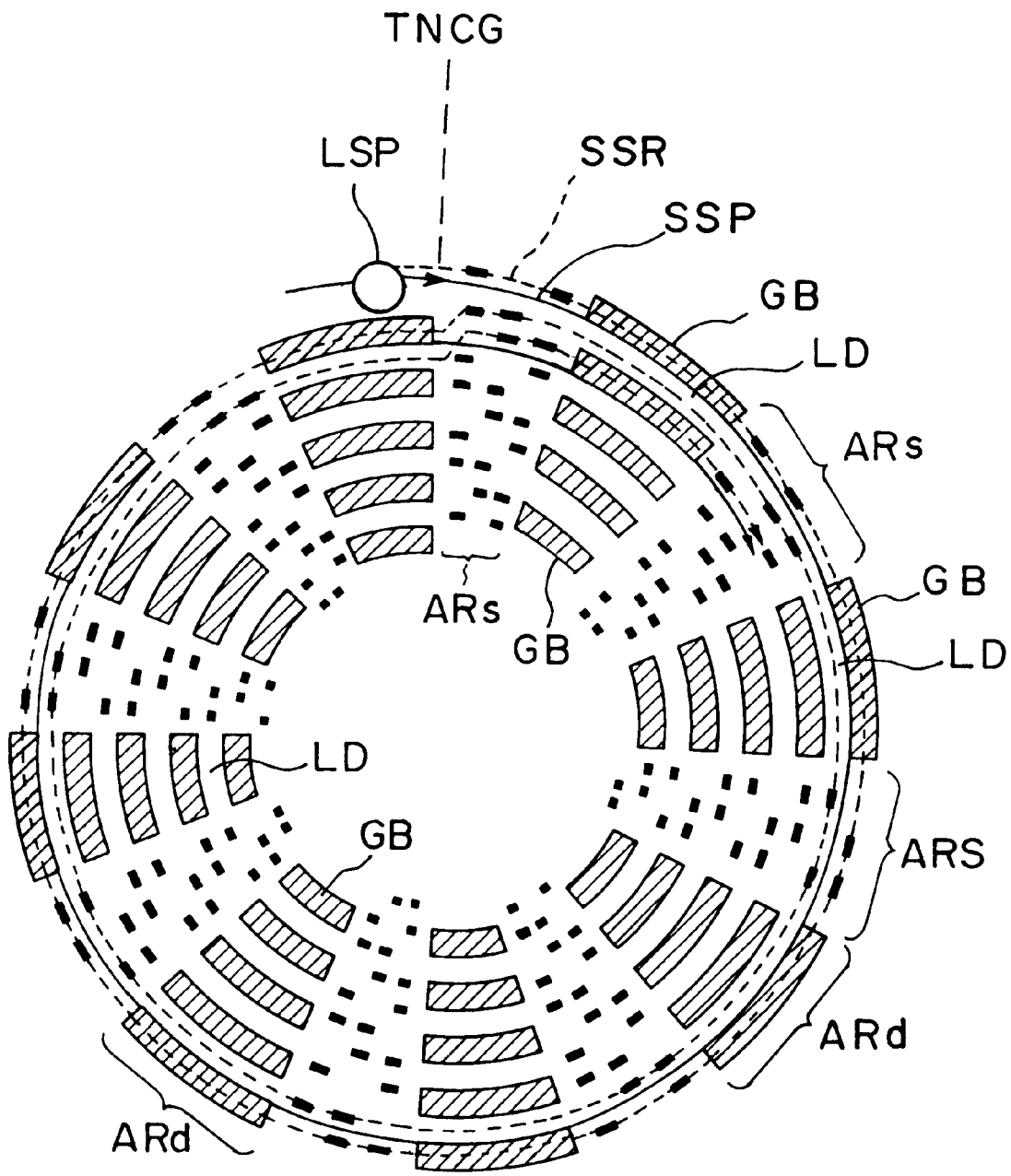
FIG. 41 is an illustration of an L/G twin-track-type RAM disk (type 1) according to the embodiment of the present invention.
Figure 42:
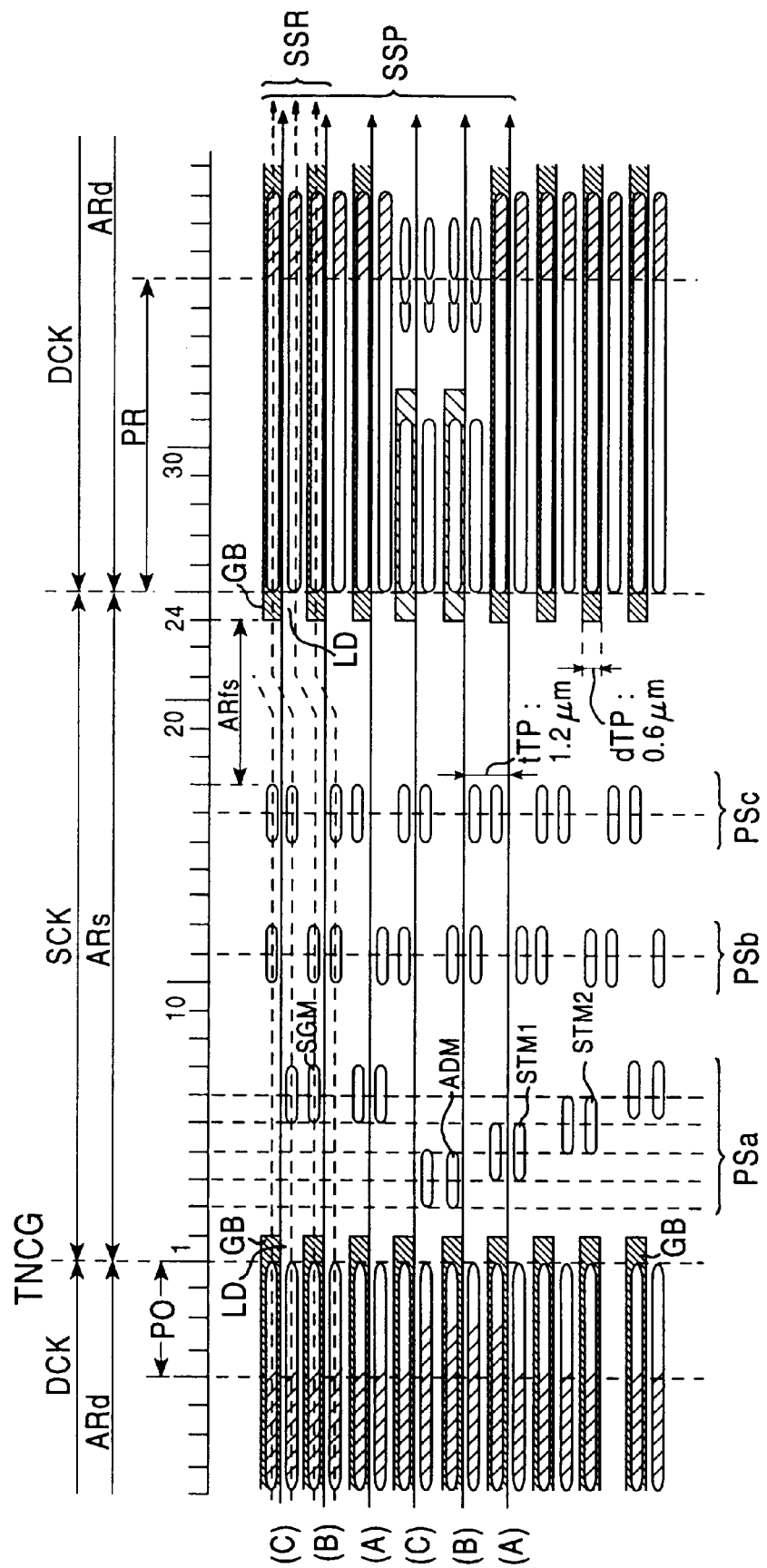
FIG. 42 is an illustration of the L/G twin-track-type RAM disk (type 1) according to the embodiment of the present invention.

FIG. 41 is a schematic representation of the track structure of an L/G twin-track-type RAM disk as type 1. FIG. 42 shows a servo area ARs in this L/G twin-track-type RAM disk (type 1) and parts of a data area ARd before and after the servo area ARs.

In FIG. 41, the black portions in the places corresponding to the servo areas ARs represent servo pits for three-phase tracking, which has been described heretofore.

Further, the curved lines depicted as black portions in the data areas ARd between two servo areas ARs along the circumferential direction represent data tracks by grooves GB, and the portions where shading is not given in the data areas ARd represent data tracks by lands LD.

Further, the solid-line arrow SSP which proceeds in a spiral shape with the laser spot LSP as the starting point is shown. This arrow indicates the reproduction scanning path of the laser spot LSP in this L/G twin-track-type RAM disk.

The broken-line arrow SSR indicates the recording scanning path of the laser spot LSP.

FIG. 42 shows a servo area ARs and parts of a data area ARd before and after the servo area ARs in the L/G twin-track-type RAM disk, and the representation method is similar to that of FIG. 18 described above.

Also in this case, the servo area ARs is an area of 24 servo clock periods with the servo clock SCK as a reference, and servo-pit information is extracted or the like in accordance with the servo clock SCK. Further, the segment type is represented by the position of servo pits at the position $PS_A$ as described in FIGS. 8A to 8D.

Meanwhile, in the data area ARd, data is reproduced in accordance with the data clock DCK. The data area ARd is formed as grooves GB or lands LD rather than as a pit sequence as in the above-described twin-pit-type ROM disk.

The postwrite area PO which is at the end of the data area ARd and the prewrite area PR which is at the beginning of the data area ARd are used mainly for the purpose of preventing residual heat of the laser and unerasure of recorded data during a recording operation, as described in FIG. 5D.

As can be seen from FIGS. 28 and 29, in this L/G-alternate-type RAM disk, the center of the servo pit tracks (the pit sequence in the servo area ARs) coincides with the center of the data tracks (the lands LD or the grooves GB in the data area ARd) in the circumferential direction.

Therefore, when tracking servo is performed by two adjacent servo pit tracks which form one of pattern A, pattern B, and pattern C, and the recording reproduction scanning SSPR of the laser spot LSP proceeds with the middle position of the two adjacent servo pit tracks as the tracking center as shown in the figure, the reproduction scanning path SSP proceeds along the boundary between the grooves GB and the lands LD in the data area ARd.

That is, the correct tracking state is reached with respect to the middle of the grooves GB and the lands LD, and simultaneous scanning by the laser spot LSP proceeds for both of the grooves GB and the lands LD.

Meanwhile, regarding the recording scanning path SSR, since scanning which proceeds along the center of the grooves GB and the lands LD must be performed as indicated by the broken line, detrack tracking which passes along the servo pit tracks is performed.

And, as described above, physically speaking, the grooves GB are formed in a spiral shape. Since both of the grooves GB and the lands LD are made to be data recording tracks, as can be seen from FIG. 41, when seen for each circular track with the circumferential position TNCG as the start point and the end point, tracks (hereinafter referred to as groove tracks) formed of segments in which the data area ARd is formed on grooves GB, and tracks (hereinafter referred to as land tracks) formed of segments in which the data area ARd is made to be lands LD are formed in a spiral shape while keeping the state of an adjacent pair.

That is, the groove tracks and the land tracks form a double spiral.

The segment referred to herein refers to the data segment DSEG(x) shown in FIGS. 4, and 5B. As described above, the address segment ASEG(x) is not grooves or lands of an magneto-optic recording and reproduction area, and data, such as addresses, is recorded as read-only data by the pit sequence into the address segment ASEG(x).

In the schematic view of FIG. 41, for the sake of simplicity of description, a description of the address segment ASEG(x) is omitted, and a representation which considers only the data segment DSEG(x) is shown. Such representation of drawings applies also in FIGS. 43, 45 and 47 which will be described later.

The circumferential position TNCG in FIG. 41 is set to be the change point of the track number, namely, the starting point and the end point of the circular track. The portions before and after the servo area ARs after this circumferential position TNCG are shown in FIG. 42.

As can be seen in FIG. 41, the patterns of the servo pits in the servo area ARs are formed in the order: pattern A, pattern B, pattern C, pattern A, pattern B, pattern C, and soon along the circumferential direction.

When seen in the radial direction, in the case of patterns as in FIGS. 7B and 7C, that is, patterns change in the order: pattern A, pattern B and pattern C when the middle of each pair of adjacent servo pit track patterns is seen in sequence as a reference.

In this case, since the reproduction scanning path SSP proceeds along the boundary between the groove tracks and the land tracks, the reproduction scanning path SSP proceeds in units of two track pitches with the lands LD and the grooves GB as each track when seen in the radial direction.

In FIG. 42, servo-pit patterns corresponding to each recording and reproduction scanning path SSPR are shown as (A), (B) and (C) on the left side of each recording and reproduction scanning path SSP. As can be seen when each recording and reproduction scanning path SSP is seen in sequence in the radial direction of the disk, a tracking servo operation is performed in the order: pattern A, pattern B, pattern C, pattern A, pattern B, pattern C, and soon, and thus scanning which proceeds along the groove tracks and the land tracks is performed as in this example.

In this case, even if the data track pitch dTP, i.e., the width from the center of the lands LD to the center of the grooves GB, is set at 0.6 μm, and the size of the laser spot LSP is set at 1.2 μm, which is approximately two times greater, the patterns A, B and C are each formed at a width of 1.2 μm. Therefore, a track pitch of at least 1.2 μm is secured in the case of the tracking operation in the recording and reproduction scanning path SSPR, and tracking servo with sufficient accuracy can be performed.

Furthermore, since the servo pits are arranged in the order: pattern A, pattern B, pattern C in the radial direction, there is no interference from the servo pits other than the servo pits which form the servo pattern at that time. That is, this becomes comparable to the case when the laser spot LSP passes along the center of the servo pit group which forms a certain pattern, the servo pits which are adjacent to each of the servo pits cannot be seen.

Therefore, the tracking servo operation becomes comparable to servo control at a track pitch of 1.8 μm, which is three times as large as the data track pitch dTP, making accurate and stable tracking control possible and making it possible to handle a narrower track pitch.

And in this L/G twin-track-type RAM disk, since both of the lands LD and the grooves GB are used for recording tracks, it is possible to realize high-density recording two times higher than a conventional disk, i.e., a disk in which either the lands or the grooves are made to be recording tracks.

Further, since the land tracks and the groove tracks are scanned simultaneously to read data, it is also possible to speed up the data transfer rate.

The lands LD and the grooves GB are scanned simultaneously by the reproduction scanning path SSP to read magneto-optically recorded data. In a reading method for this purpose, it is preferable to bring the peak of the light intensity distribution of the laser spot LSP to 2 points which are each at the center of the lands LD and the grooves GB. Such a reading method will be described later.

For the recording scanning path SSR, recording is performed by scanning which proceeds in units of one track pitch in the radial direction.

That is, since the recording scanning path SSR proceeds along each center of the groove tracks and the land tracks, as can be seen from FIG. 41, scanning of the groove tracks and scanning of the land tracks are performed for each circle.

Since the groove tracks and the land tracks are formed into a double spiral, the grooves GB proceed by two data track pitches (2dTP) in the radial direction after one circle.

Therefore, the recording scanning path SSR returns by one data track pitch dTP by detrack tracking using servo pits when, for example, the scanning of one circle of the groove tracks is terminated, and scanning of land tracks is performed by detrack tracking from there is performed. Further, the recording scanning path SSR returns by one data track pitch dTP when the scanning of one circle of the land track is terminated, and the scanning of the groove track is performed by detrack tracking from there. The recording scanning path SSR proceeds by repeating such operations.

Patterns of the servo pits corresponding to the recording scanning path SSR change in the order: pattern A, pattern B, pattern C, pattern A, pattern B, pattern C and soon when seen in the radial direction.

<L/G Twin-Track-Type RAM Disk: Type 2>

Figure 43:
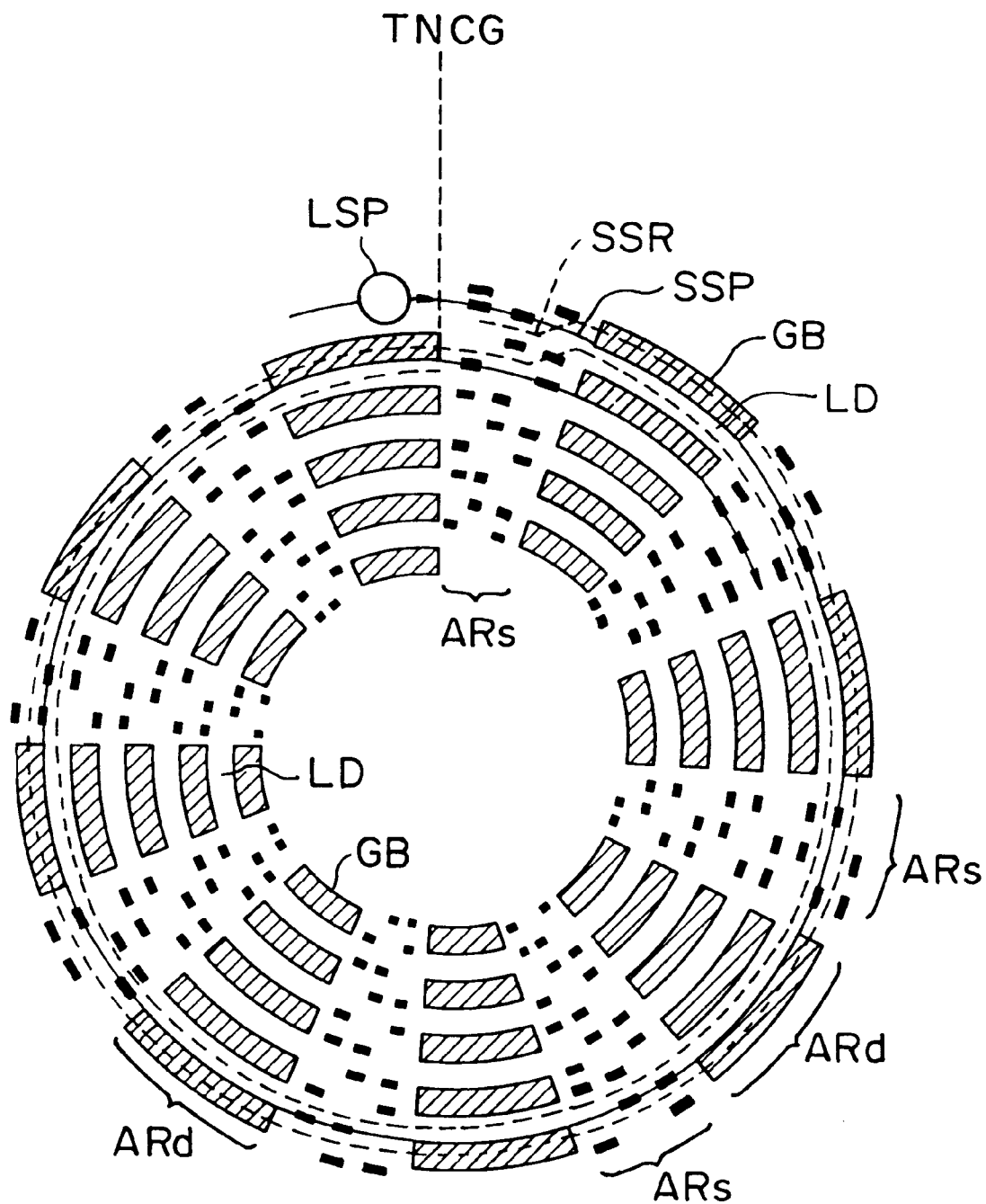
FIG. 43 is an illustration of an L/G twin-track-type RAM disk (type 2) according to the embodiment of the present invention.
Figure 44:
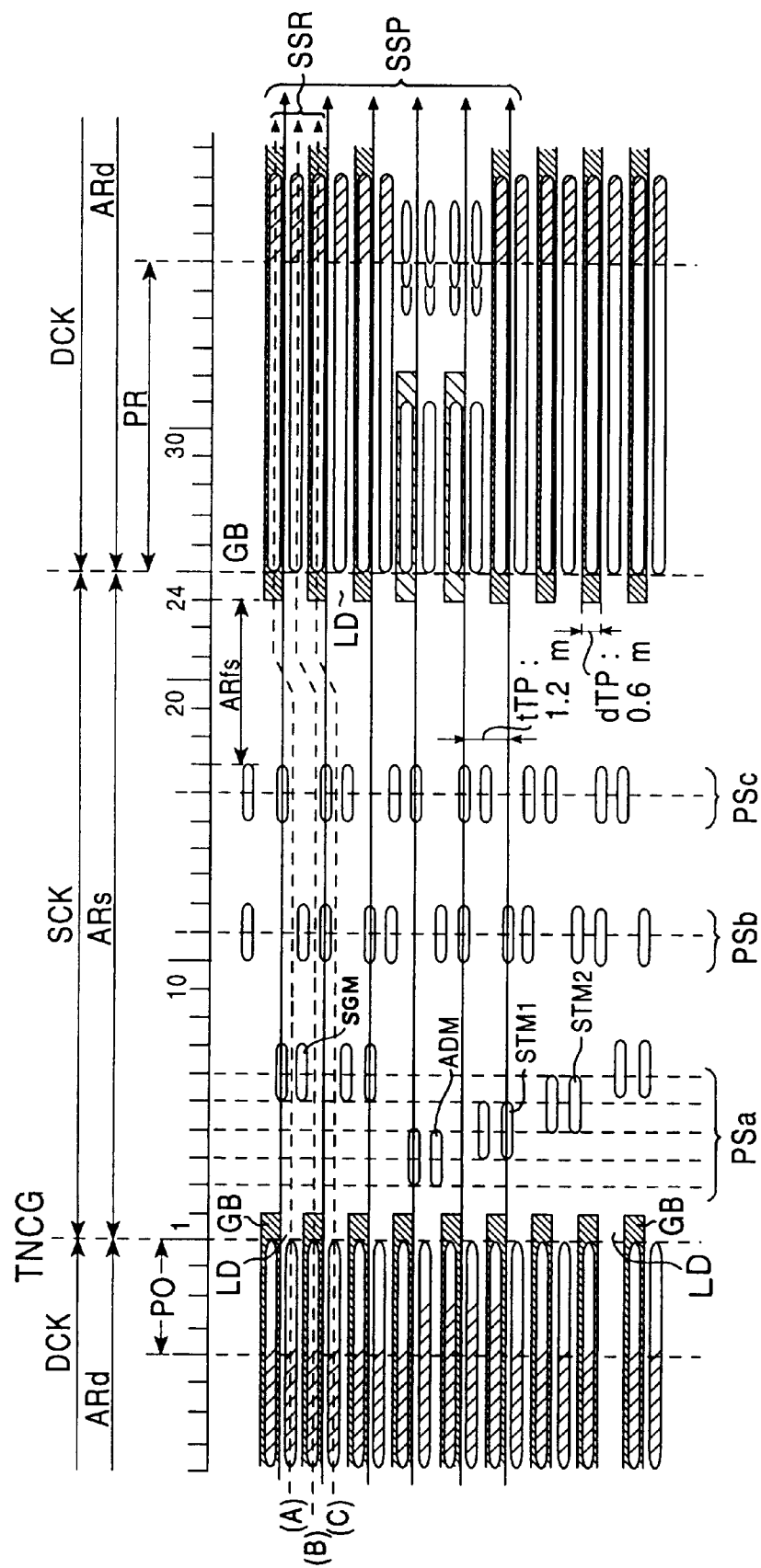
FIG. 44 is an illustration of the L/G twin-track-type RAM disk (type 2) according to the embodiment of the present invention.

Next, type 2 of an L/G twin-track-type RAM disk will be described below. FIG. 43 is a schematic representation of the track structure of an L/G twin-track-type RAM disk of type 2. FIG. 44 shows a servo area ARs and parts of a data area ARd before and after the servo area ARs in this L/G twin-track-type RAM disk (type 2).

Regarding this type 2, a stable servo operation can be realized since the data track structure is formed similarly to type 1 such that the groove tracks and the land tracks are formed in the shape of a double spiral, a larger capacity and a higher transfer rate can be realized through simultaneous scanning, the track pitch tTP relating to tracking becomes two times as great as the data track pitch dTP, and the servo pits are arranged in the order: pattern A, pattern B, and pattern C in the radial direction.

The difference of this type 2 from the above-described type 1 is the positional relationship in the circumferential direction between the data tracks (the lands LD or the grooves GB in the data area ARd) and the servo pit tracks (the pit sequence in the servo area ARs).

As can be seen from FIGS. 43 and 44, in this type 2, the center of the servo pit tracks does not coincide with the center of the data tracks in the circumferential direction.

Therefore, similarly to type 1, when tracking servo is performed by two adjacent servo pit tracks which form one of pattern A, pattern B, and pattern C, and the reproduction scanning path SSP of the laser spot LSP proceeds with the middle position of the two adjacent servo pit tracks as the tracking center, in the data area ARd, the reproduction scanning path SSP proceeds along the center of the grooves GB or along the center of the lands LD. Such scanning does not make two track simultaneous reproduction possible. Therefore, during reproduction, by performing detrack tracking using servo pits, the reproduction scanning path SSP proceeds along the boundary between the grooves GB and the lands LD.

Meanwhile, the fact that when the scanning proceeds with the middle position of two adjacent servo pit tracks as the tracking center, the scanning proceeds along the center of the grooves GB or along the center of the lands LD in the data area ARd achieves a scanning suitable for data recording. That is, the recording scanning path SSR proceeds in the correct tracking state for the grooves GB or the lands LD, as indicated by the broken lines in FIGS. 43 and 44 as a result of proceeding with the middle position of two adjacent servo pit tracks as the tracking center.

Also in this case, the recording scanning path SSR returns by one data track pitch dTP when the scanning of one circle of the track is terminated, and the scanning of the next track is started from there.

[Partial ROM Disk]

<Twin-Pit-Type ROM and L/G Twin-Track-Type RAM (Type 1)>

Next, a description will be given of a partial ROM disk as a disk of this example, which is formed in accordance with the above-described disk structure, track/frame/segment format, and the sector format and on which servo pits are formed so that the above-described three-phase tracking operation is performed.

As shown in FIGS. 3A to 3D, the partial ROM disk has the ROM area AE and the rewritable area ARW. A description will be given using an example in which the outer region side of the disk is made to be a rewritable area ARW and the inner region side of the disk is made to be a ROM area AE.

Of course, even the partial ROM disk of this example in which an outer region side is made to be a ROM area AE as shown in FIG. 3C, which will be described below, can be applied in a similar manner.

Several types of partial ROM disks will now be described. First, a partial ROM disk in which a twin-pit-type ROM and an L/G twin-track-type RAM (type 1) are combined will be described.

That is, the partial ROM disk has an L/G twin-track-type rewritable area in which land tracks and groove tracks form a double spiral as described in FIGS. 41 and 42, and a twin-pit-type ROM area in which the left track Ltk and the right track Rtk form tracks in the shape of a double spiral and these tracks are scanned simultaneously.

Figure 45:
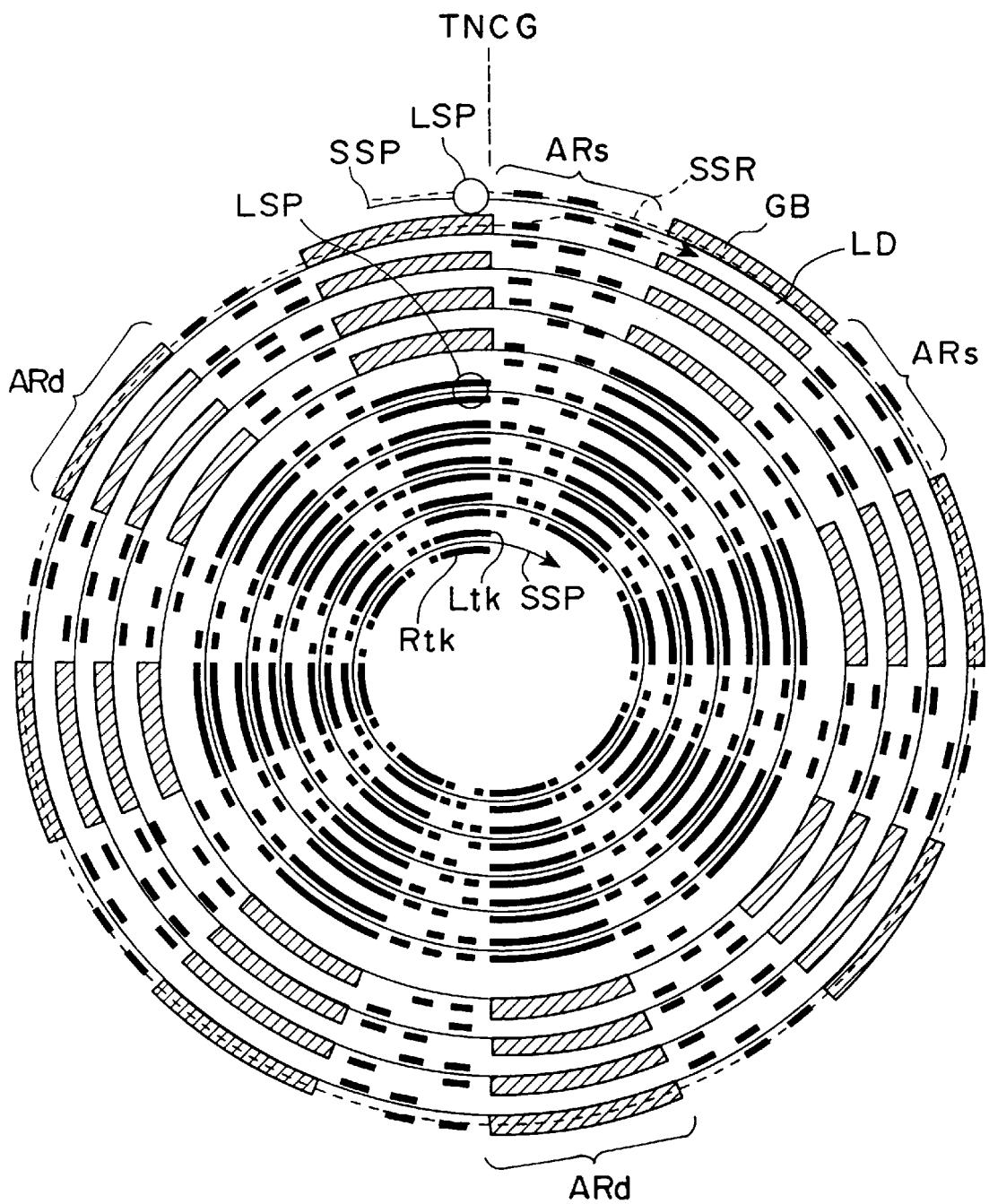
FIG. 45 is an illustration of a partial ROM disk formed by a twin-pit-type ROM and an L/G-twin-track-type RAM (type 1) according to the embodiment of the present invention.
Figure 46:
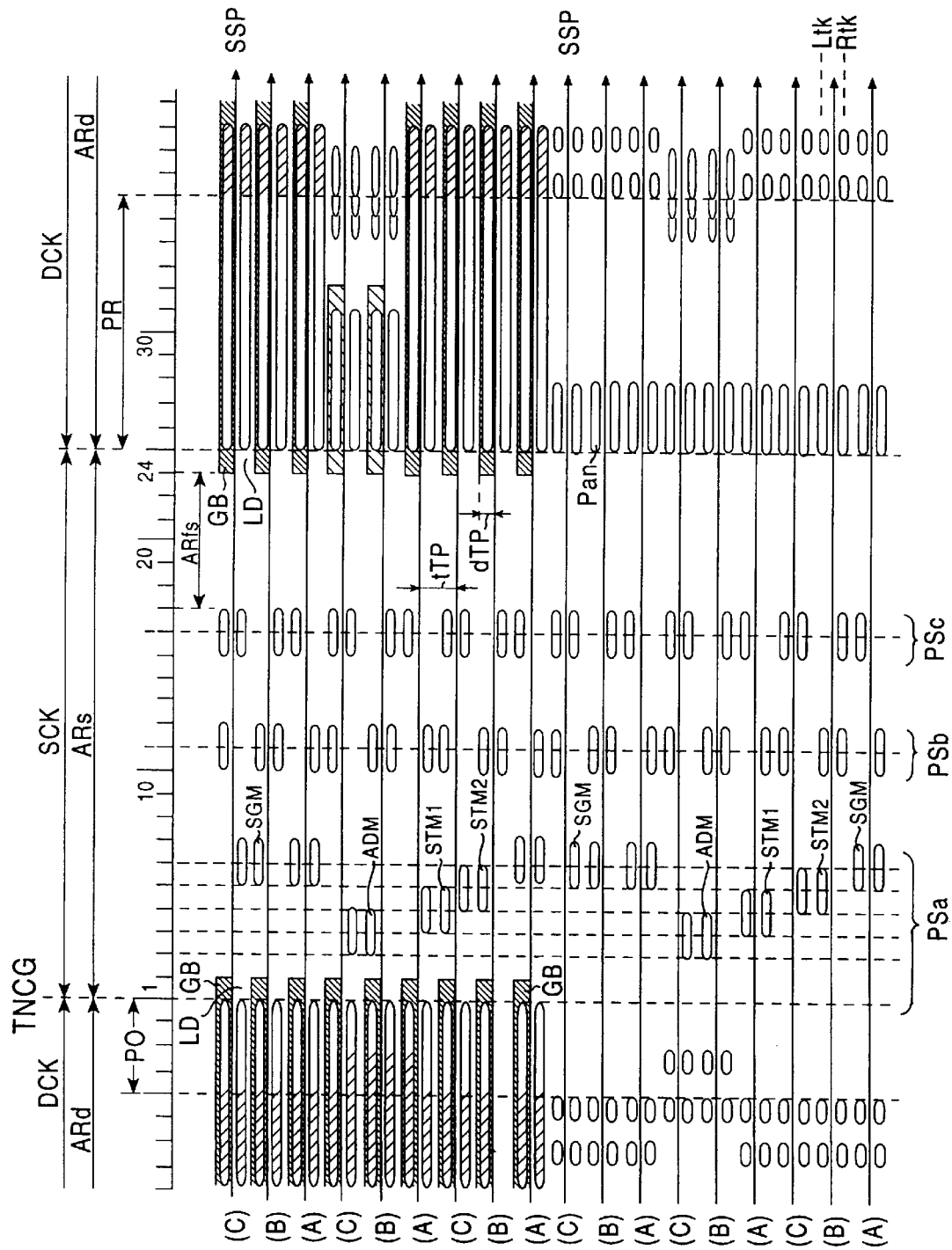
FIG. 46 is an illustration of the partial ROM disk formed by a twin-pit-type ROM and an L/G-twin-track-type RAM (type 1) according to the embodiment of the present invention.

FIG. 45 is a schematic representation of a track structure of a partial ROM disk of this twin-pit-type ROM and an L/G-twin-track-type RAM (type 1). FIG. 46 shows a servo area ARs at the circumferential position TNCG in this partial ROM disk and parts of a data area ARd before and after the servo area ARs.

In FIG. 45, the black portions at the places corresponding to the servo areas ARs represent the above-described servo pits for three-phase tracking.

Further, the curved-line portions depicted as shading portions in the data areas ARd between two servo areas ARs on the outer region side of the disk represent data tracks by grooves GB, and the portions where shading is not given in the data areas ARd represent data tracks by lands LD.

Further, a solid-line arrow SSPR which proceeds in a spiral shape indicates the reproduction scanning path of the laser spot LSP in the rewritable area as the L/G twin-track-type RAM (type 1) on the outer region side of the disk.

Although the illustration of the recording scanning path is omitted, this path proceeds along each center of the groove tracks and the land tracks in a manner similar to the recording scanning path SSR indicated by the broken line in FIG. 41 described above.

Meanwhile, the curved lines depicted as black portions in the data areas ARd between two servo areas ARs in the circumferential direction on the inner region side of the disk in FIG. 45 represent data tracks by pits. Further, a solid-line arrow SSP which proceeds in a spiral shape indicates the reproduction scanning path of the laser spot LSP on the inner region side of the twin-pit-type ROM.

FIG. 46 is an enlarged view of a servo area ARs and parts of a data area ARd before and after the servo area ARs in the rewritable area as the L/G twin-track-type RAM (type 1) having the same structure as that in FIG. 42 and in the ROM area as the twin-pit-type ROM having the same structure as that in FIG. 18. The representation method is similar to those of FIGS. 18 and 42 described above.

The servo area ARs is an area of 24 servo clock periods with the servo clock SCK as a reference, and servo-pit information is extracted or the like in accordance with the servo clock SCK. Further, the segment type is represented by the position of servo pits at the position PSA as described in FIGS. 8A to 8D.

Meanwhile, in the data area ARd, data is reproduced in accordance with the data clock DCK. The data area ARd on the inner region side of the disk is formed as a pit sequence in the shape of a double spiral by the left track Ltk and the right track Rtk similarly to the above-described twin-pit-type ROM disk. Further, the data area ARd on the inner region side of the disk is formed on the grooves GB or the lands LD.

The postwrite area PO which is at the end of the data area ARd and the prewrite area PR which is at the beginning of the data area ARd are used for the purpose of mainly preventing residual heat of the laser and unerasure of data which has already been recorded and which is to be deleted by overwriting during the recording operation, as described in FIGS. 5D. Meanwhile, in the ROM area on the inner region side of the disk, an anchor pit Pan is formed for the purpose of compatibility of the formats and reducing a mirror portion.

As can be seen from FIGS. 45 and 46, on the outer region side of this partial ROM disk, the center of the servo pit tracks (the pit sequence in the servo area ARs) coincides with the center of the data tracks (the lands LD or the grooves GB in the data area ARd) in the circumferential direction.

Therefore, when tracking servo is performed by two adjacent servo pit tracks which form one of pattern A, pattern B, and pattern C, and the recording reproduction scanning SSPR of the laser spot LSP proceeds with the middle position of the two adjacent servo pit tracks as the tracking center, the reproduction scanning path SSP proceeds along the boundary between the grooves GB and the lands LD in the data area ARd.

That is, the correct tracking state is reached with respect to the middle of the grooves GB and the lands LD, and scanning by the laser spot LSP proceeds simultaneously for both of the grooves GB and the lands LD which are adjacent to each other in the radial direction.

Meanwhile, regarding the recording scanning path SSR indicated by the broken line in FIG. 45, since scanning which proceeds along the center of the grooves GB and the lands LD must be performed similarly to the example in FIGS. 41 and 42, detrack tracking which passes along the servo pit tracks is performed.

In this rewritable area, physically speaking, the grooves GB are formed in a spiral shape. Since both of the grooves GB and the lands LD are made to be data recording tracks, as can be seen from FIG. 45, when seen for each circular track with the circumferential position TNCG as the start point and the end point, the groove tracks and the land tracks form a double spiral.

Further, as can be seen from FIGS. 45 and 46, on the inner region side of this partial ROM disk, the servo pit tracks and the data tracks (the pit sequence in the data area ARd) coincide with in the circumferential direction.

Therefore, when tracking servo is performed by two adjacent servo pit tracks which form one of pattern A, pattern B, and pattern C, and the reproduction scanning path SSP of the laser spot LSP proceeds with the middle position of the two adjacent servo pit tracks as the tracking center, the reproduction scanning path SSP proceeds along the middle position of the two adjacent data tracks also in the data area ARd. That is, the two adjacent data tracks, i.e., the left track Ltk and the right track Rtk, are scanned simultaneously by the laser spot LSP.

Then, as can be seen from FIG. 32, the left track Ltk and the right track Rtk force spiral-shaped tracks in a paired state.

In this partial ROM disk, as can be seen in FIG. 45, the patterns of the servo pits in the data area ARd are formed in the order: pattern A, pattern B, pattern C, pattern A, pattern B, pattern C, and soon in the circumferential direction from the outer region to the inner region.

Further, when seen in the radial direction, in the case of patterns as shown in FIGS. 7B and 7C, that is, patterns change in the order: pattern A, pattern B, pattern C, and soon when the middle of each pair of adjacent servo pit tracks is seen in sequence as a reference.

In the case of this partial ROM disk, since the reproduction scanning path SSP are on the outer region side of the disk proceeds along the boundary between the groove tracks and the land tracks, the reproduction scanning path SSP proceeds in units of two track pitches with the lands LD and the grooves GB as each track when seen in the radial direction.

In FIG. 42, servo-pit patterns corresponding to each recording and reproduction scanning path SSP are shown as (A), (B) and (C) on the left side of each recording and reproduction scanning path SSP. As can be seen when each recording and reproduction scanning path SSP is seen in sequence in the radial direction of the disk, a tracking servo operation is performed in the order: pattern A, pattern B, pattern C, pattern A, pattern B, pattern C, and soon, and thus scanning which proceeds along the groove tracks and the land tracks is performed as in this example.

Meanwhile, since the reproduction scanning path SSP performed on the inner region side proceeds in the center of the double spiral so as to simultaneously scan the left track Ltk and the right track Rtk in the shape of a double spiral, the reproduction scanning path SSP proceeds in units of two track pitches when seen in the radial direction.

In FIG. 46, as can be seen when each reproduction scanning path SSP is seen in sequence in the radial direction of the disk, also in the ROM area on the inner region side of the disk, tracking servo control is performed in the order: pattern A, pattern B, pattern C, pattern A, pattern B, pattern C, and soon in the radial direction, and thus simultaneous scanning of tracks (the left track Ltk and the right track Rtk) is performed.

In the case of this partial ROM disk, even if the data track pitch dTP, i.e., the width from the center of the lands LD to the center of the grooves GB, is set at 0.6 $\mu$m, and the size of the laser spot LSP is set at 1.2 $\mu$m, which is approximately two times greater, the patterns A, B and C of the servo pits are each formed at a width of 1.2 $\mu$m. Therefore, a track pitch tTP of at least 1.2 $\mu$m is secured in the case of the tracking operation in the reproduction scanning path SSP, and tracking servo with sufficient accuracy can be performed.

Furthermore, since the servo pits are arranged in the order: pattern A, pattern B, pattern C in the radial direction, there is no interference from the servo pits other than the servo pits which form the servo pattern at that time. That is, this becomes comparable to the case when the laser spot LSP passes along the center of the servo pit group which forms a certain pattern, the servo pits which are adjacent to each of the servo pits cannot be seen.

Therefore, the tracking servo operation becomes comparable to servo control at the track pitch of 1.8 $\mu$m, which is three times as large as the data track pitch dTP, making accurate and stable tracking control possible and making it possible to handle a narrower track pitch.

And in the rewritable area of this partial ROM disk, since both the lands LD and the grooves GB are used for recording tracks, it is possible to realize high-density recording two times higher than a conventional disk, i.e., a disk in which either the lands or the grooves are made to be recording tracks.

Further, since the land tracks and the groove tracks are scanned simultaneously to read data, it is also possible to speed up the data transfer rate.

Similarly to the above-described L/G twin-track-type RAM, the lands LD and the grooves GB are scanned simultaneously by the reproduction scanning path SSP to read magneto-optically recorded data. For this purpose, a reading method in which the peak of the light-intensity distribution of the laser spot LSP is brought to 2 points which are just each center of the lands LD and the grooves GB is used.

Further, in the ROM area of this partial ROM disk, since a twin-pit-type ROM having a track pitch of 0.6 $\mu$m is used, two-track simultaneous scanning is performed by the above-described two-channel twin-pit method and logical twin-pit method, and further, multi-valued data, such as three values or four values, can be recorded by the two-channel twin-pit method and the logical twin-pit method, it is possible to realize a two-fold high-density recording or higher and to speed up the transfer rate.

For the recording scanning path SSR in the rewritable area, recording is performed by scanning which proceeds in units of one track pitch in the radial direction in the similar manner as the example of the RAM disk in FIG. 41 described above.

That is, since the recording scanning path SSR proceeds along each center of the groove tracks and the land tracks, scanning of the groove tracks and scanning of the land tracks are performed for each circle.

Therefore, as shown in FIG. 45, the recording scanning path SSR returns by one data track pitch dTP by detrack tracking using servo pits when, for example, the scanning of one circle of the groove tracks is terminated, and scanning of the land tracks is performed by detrack tracking from there. Further, the recording scanning path SSR returns by one data track pitch dTP when the scanning of one circle of the land tracks is terminated, and the scanning of the groove tracks is performed by detrack tracking from there. The recording scanning path SSR proceeds by repeating such operations.

Patterns of the servo pits corresponding to the recording scanning path SSR change in the order: pattern A, pattern B, pattern C, pattern A, pattern B, pattern C and soon when seen in the radial direction.

<Twin-Pit-Type ROM and L/G Twin-Track-Type RAM Disk (Type 2)>

Figure 47:
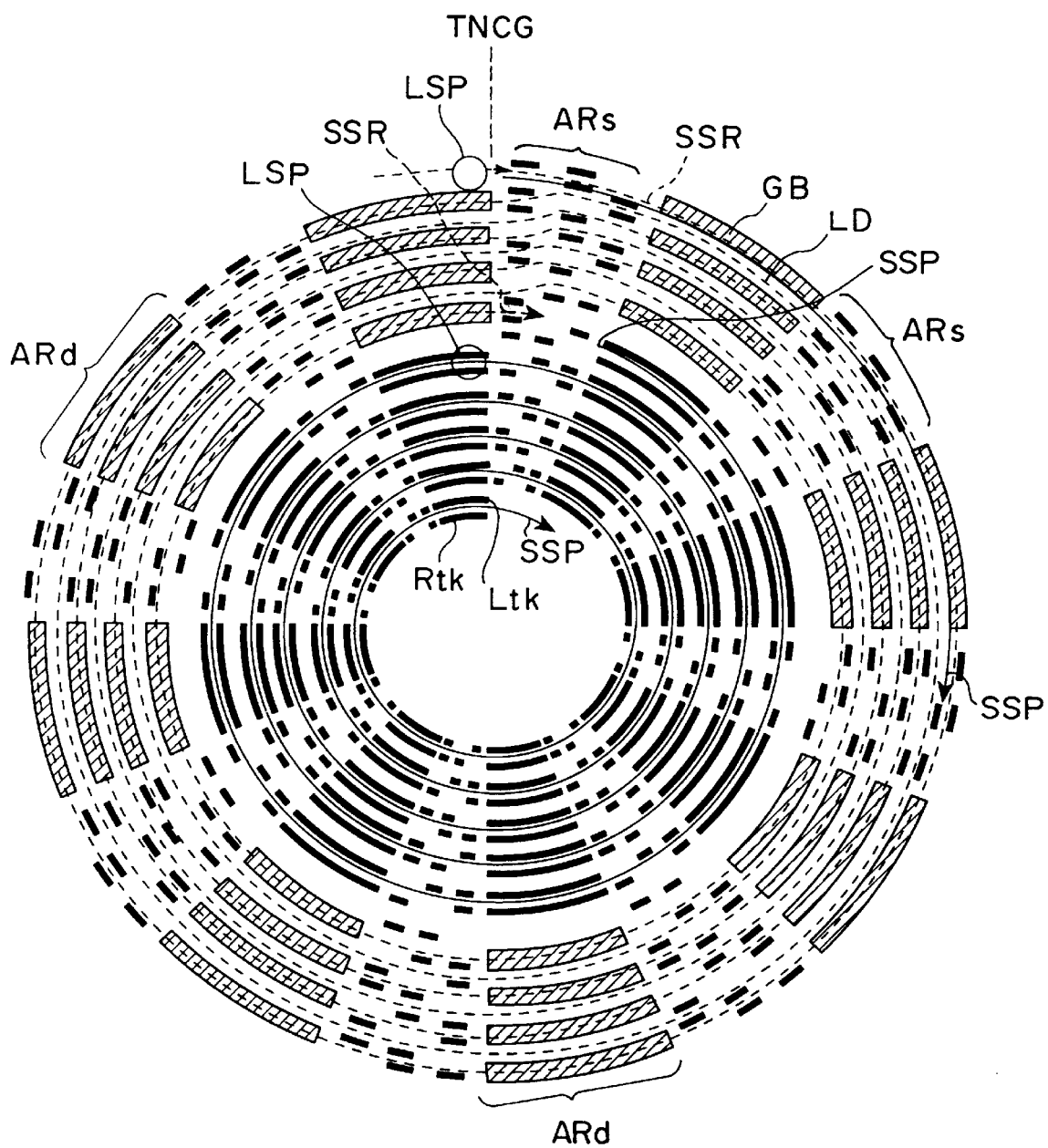
FIG. 47 is an illustration of a partial ROM disk formed by a twin-pit-type ROM and an L/G-twin-track-type RAM (type 2) according to the embodiment of the present invention.
Figure 48:
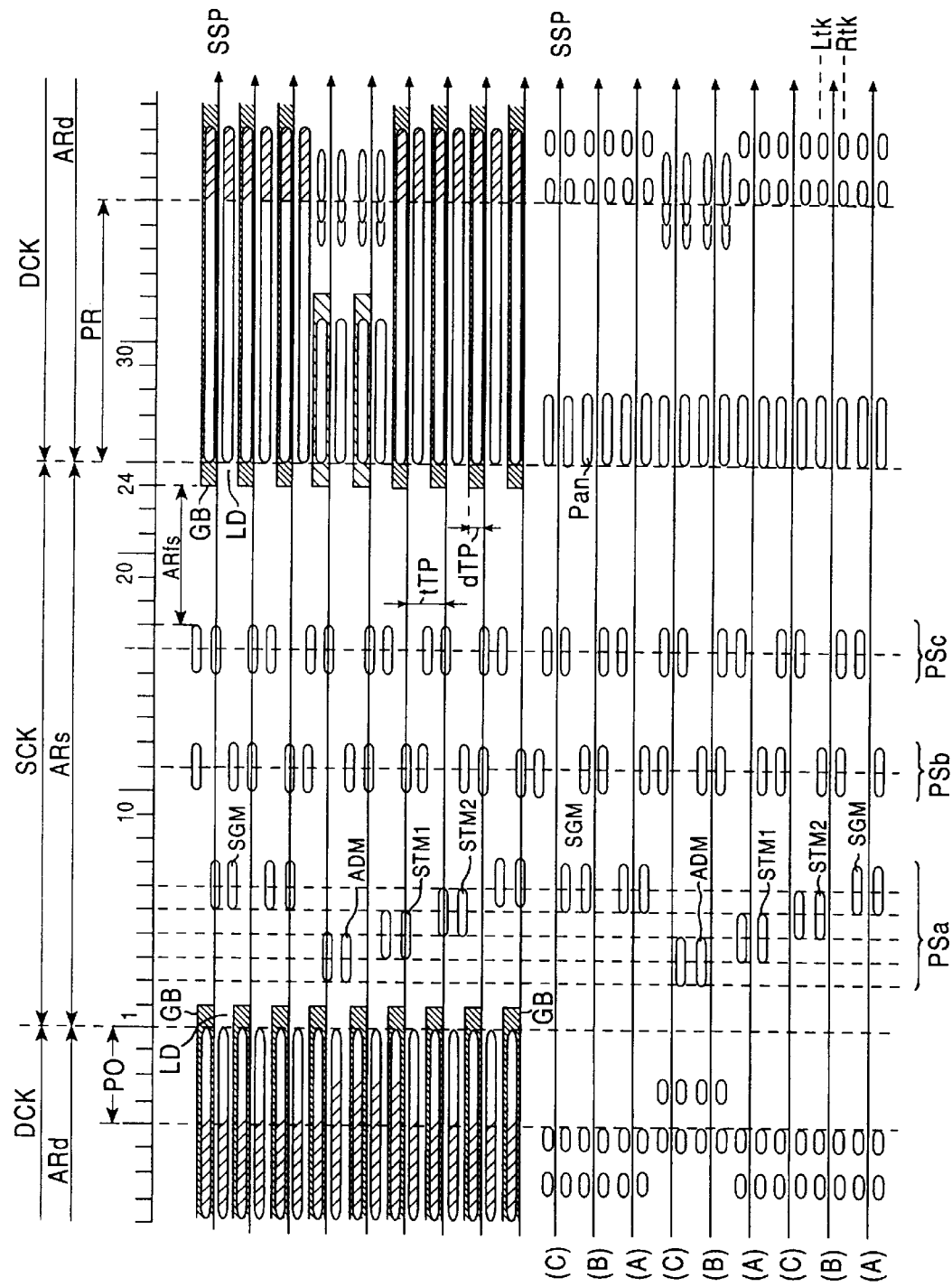
FIG. 48 is an illustration of the partial ROM disk formed by a twin-pit-type ROM and an L/G-twin-track-type RAM (type 2) according to the embodiment of the present invention.

Next, a partial ROM disk formed by a twin-pit-type ROM and L/G twin-track-type RAM disk (type 2) will be described. FIG. 47 is a schematic representation of a track structure of this partial ROM disk. FIG. 48 shows a servo area ARs and parts of a data area ARd before and after the servo area ARs in this L/G twin-track-type RAM disk (type 2).

This partial ROM disk is similar to the partial ROM disk described in FIGS. 45 and 46. Further, these are similar in that a stable servo operation can be realized since groove tracks and land tracks are formed in the shape of a double spiral in the rewritable area as the data track structure and a larger capacity and a higher transfer rate can be realized through simultaneous scanning, and the track pitch tTP relating to tracking becomes two times as great as the data track pitch dTP, and the servo pits are arranged in the order: pattern A, pattern B, and pattern C in the radial direction.

However, in this partial ROM disk, in the rewritable area, the positional relationship in the circumferential direction between the data tracks (the lands LD or the grooves GB in the data area ARd) and the servo pit tracks (the pit sequence in the servo area ARs) differs from that of the partial ROM disk of FIGS. 45 and 46 described above. That is, as can be seen from FIGS. 47 and 48, in the case of this partial ROM disk, the center of the servo pit tracks does not coincide with the center of the data tracks in the circumferential direction.

Therefore, when tracking servo is performed by two adjacent servo pit tracks which form one of pattern A, pattern B, and pattern C, and the reproduction scanning path SSP of the laser spot LSP proceeds with the middle position of the two adjacent servo pit tracks as the tracking center, in the data area ARd, the reproduction scanning path SSP proceeds along the center of the grooves GB or along the center of the lands LD. Such scanning does not make two track simultaneous reproduction possible. Therefore, during reproduction, by performing detrack tracking using servo pits, the reproduction scanning path SSP proceeds along the boundary between the grooves GB and the lands LD.

Meanwhile, the fact that when the scanning proceeds with the middle position of two adjacent servo pit tracks as the tracking center, the scanning proceeds along the center of the grooves GB or along the center of the lands LD in the data area ARd achieves a scanning suitable for recording data.

That is, the recording scanning path SSR proceeds in the correct tracking state for the grooves GB or the lands LD, as indicated by the broken lines in FIG. 47 as a result of proceeding with the middle position of two adjacent servo pit tracks as the tracking center.

Also in this case, the recording scanning path SSR returns by one data track pitch dTP when the scanning of one circle of the tracks is terminated, and the scanning of the next track is started from there.

<Twin-Pit Single-Data-Type ROM and L/G Twin-Track-Type RAM (Type 1)>

Next, referring to FIGS. 49 and 51, a description will be given of an example of a partial ROM disk having a ROM area which is made to be a twin-pit single-data-type ROM and a rewritable area which is made to be an L/G twin-track-type RAM (type 1).

Since a representation of the track structure of this disk is similar to that of FIG. 45 described above, an illustration and description thereof has been omitted. FIG. 49 shows a servo area ARs and parts of a data area ARd before and after the servo area ARs in this partial ROM disk.

In this example, the rewritable area which is on the outer region side of the disk is made to be an L/G twin-track-type RAM (type 1) similar to the partial ROM disk described in FIGS. 45 and 46 and therefore, a description thereof has been omitted.

In this example, the structure of the ROM area is different from that of the example of FIG. 46 described above. That is, the following is similar in that the left track Ltk and the right track Rtk are scanned simultaneously. However, a pit sequence of the form such as the above-described two-channel twin pits or the logical twin pits is not formed, and pits or a mirror plane are not formed to be physically adjacent to each other on the left track Ltk and the right track Rtk.

Figure 49:
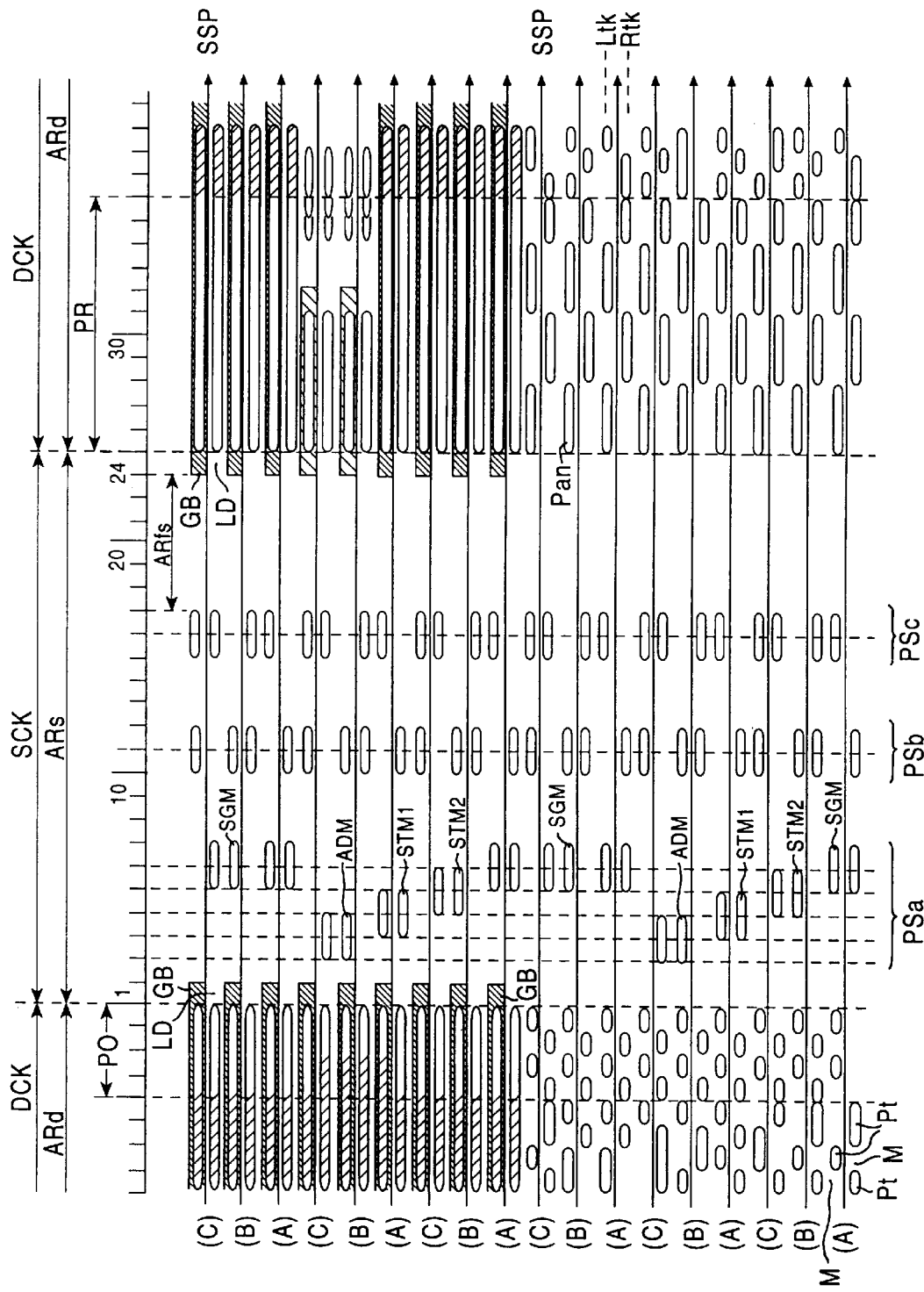
FIG. 49 is an illustration of a partial ROM disk formed by a twin-pit single-data-type ROM and an L/G-twin-track-type RAM (type 1) according to the embodiment of the present invention.

In this case, as shown in FIG. 49, the ROM area is similar to the partial ROM of FIG. 46 in the servo area ARs, and servo pits for three-phase tracking are formed.

Meanwhile, in the data area ARd, on the tracks on both sides when seen from the tracking center of the reproduction scanning path SSP, i.e., or the left track Ltk and the right track Rtk, a pit sequence such that the pits Pt and the mirror plane M in the pit sequence are inverted are formed on the right track Rtk.

More specifically, with the left track Ltk and the right track Rtk each being as a pit sequence and an inverted pit sequence, data for one track is formed. When seen in terms of data, the two tracks of the left track Ltk and the right track Rtk form one track.

Then, also in this case, the track pitch of the left track Ltk and the right track Rtk is set at, for example, 0.6 $\mu$m, and the left track Ltk and the right track Rtk which form a double spiral are simultaneously scanned. When seen for each timing of the data clock DCK of the reproduction scanning path SSP, when the pits Pt are present on the left track Ltk, the right track Rtk becomes the mirror plane M. Further, when the left track Ltk becomes the mirror plane M, the pits Pt are formed on the right track Rtk.

Therefore, as long as the data area ARd of this ROM area is scanned by the laser spot LSP, either of the pits Pt is always present within the laser spot LSP.

The prewrite area PR and the postwrite area PO in the data area ARd need not always be a pit sequence and an inverted pit sequence as shown in the figure. It is only necessary that in the real data portion, excluding the prewrite area PR and the postwrite area PO of the data area ARd, the left track Ltk and the right track Rtk be in the relation of a pit sequence and an inverted pit sequence. However, in the prewrite area PR or the postwrite area PO, when some data is recorded, it is preferable that these areas also be placed in the relation of a pit sequence and an inverted pit sequence.

In the ROM area of this partial ROM disk, during the reproduction thereof, the pit sequence and the inverted pit sequence are reproduced in accordance with the data clock DCK.

The longitudinal lines indicated by the broken line in FIGS. 51A, 51B and 51C indicate the timing of the data clock DCK.

As can be clearly seen from this FIG. 51A, the beginning and the end of the pits Pt in the pit sequence and the inverted pit sequence are formed to be synchronized with the timing of the data clock DCK. Further, the reproduction logical data with respect to the pit sequence is structured in such a way that the boundary (i.e., the above-mentioned beginning and end) between the pits Pt and the mirror plane M is logically set to "1", and that portion (and the portion of the mirror plane) of the pits Pt other than the boundary is logically set to "0".

The signal waveforms of the push-pull signal and the RF signal obtained when such pit sequence and inverted pit sequence are scanned are shown in FIGS. 51B and 51C, respectively.

The push-pull signal and the RF signal shown in FIGS. 51B and 51C are waveforms produced by reproducing the pit sequence and the inverted pit sequence in the data area ARd shown in FIG. 46A.

As shown in FIG. 51C, in the data area ARd, when pits Pt are present on the left track Ltk with the tracking center of the reproduction scanning path SSP as a reference, a mirror plane M is always present on the right track Rtk. When, in contrast, the left track Ltk is the mirror plane M, pits Pt are always present on the right track Rtk. Because of this relation, the signal level of the RF signal reaches a middle level (M).

On the other hand, the push-pull signal reaches "0" in the boundary between the mirror plane N and the pits Pt in the pit sequence (or the inverted pit sequence). For example, when the pits Pt are present on the left track Ltk, the signal becomes a signal waveform which fluctuates to the (−) direction; when the pits Pt are present on the right track Rtk, the signal becomes a signal waveform which fluctuates to the (+) direction.

In the case where the pit sequence and the inverted pit sequence are formed on the left track Ltk and the right track Rtk as described above, by reproducing the data in accordance with the push-pull signal, the DC balance can be made satisfactory, that is, the value of a digital sum value (DSV) can be made zero. This can be naturally achieved without performing modulation, such as EFM (Eight to Fourteenth Modulation), for stabilizing DC balance, making it possible to record the data as pit information as it is without performing modulation, such as EFM, namely, modulation which causes the data length to increase, on the recording data. Thus, it becomes possible to realize a higher density of the recording data.

In particular, when the RF signal is detected, detection using partial response PR (1.1) is performed, and this detection using PR (1.1) is performed by Viterbi decoding. This makes it possible to effectively remove intersymbol interference during reproduction, caused by the high-density recording, and to improve the S/N ratio of the reproduction signal. Further, by making a determination of the data area ARd out of the recording patterns on the basis of the fact that the level of the RF signal is at a middle level and the level of the push-pull signal is not "0", whether or not the data area ARd can be determined easily, making it possible to achieve a higher-speed access to the recording data.

<Twin-Pit Single-Data-Type ROM and L/G Twin-Track-Type RAM Disk (Type 2)>

Figure 50:
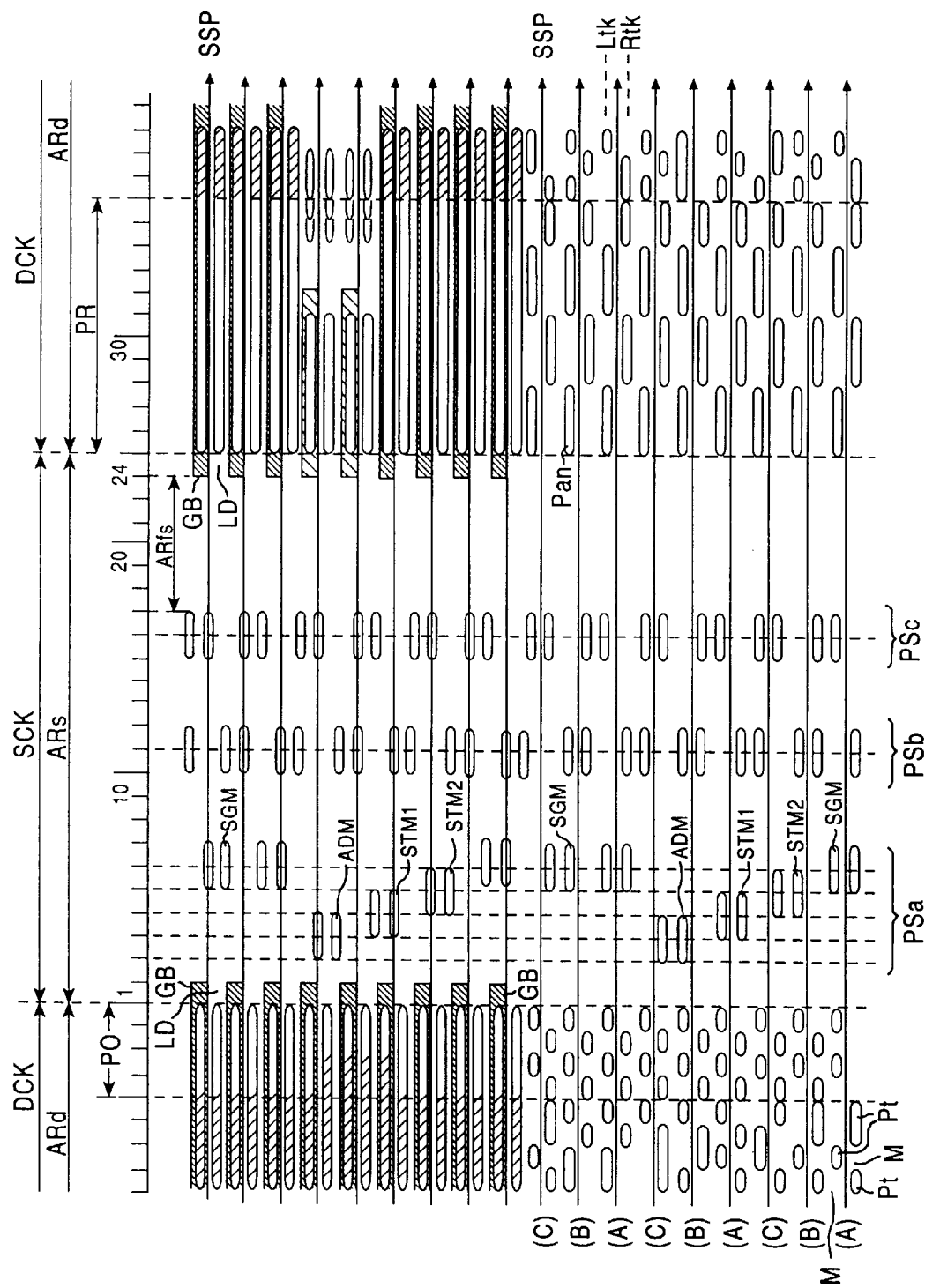
FIG. 50 is an illustration of a partial ROM disk formed by a twin-pit single-data-type ROM and an L/G twin-track-type RAM (type 2) according to the embodiment of the present invention.

Next, referring to FIG. 50, a partial ROM disk which is made to be a twin-pit single-data-type ROM and L/G twin-track-type RAM disk (type 2) will be described.

Since the representation of the track structure of this disk is similar to that of FIG. 47 described above, an illustration and description thereof has been omitted. FIG. 50 shows a servo area ARs and parts of a data area ARd before and after the servo area ARs in this partial ROM disk.

That is, in this partial ROM disk, the rewritable area on the outer region side of the disk is made to be an L/G twin-track-type RAM disk (type 2) similar to the partial ROM disk described in FIGS. 47 and 48. This is different from that of the example of FIG. 48 described above in the structure of the ROM area. In this ROM area, similarly to the example of FIG. 49, a pit sequence and an inverted pit sequence are formed by the left track Ltk and the right track Rtk, making it possible to realize a stable reproduction operation as described above.

[Recording and Reproduction Apparatus]

<Construction and Operation of the Apparatus>

A recording and reproduction apparatus which performs a recording and reproduction operation onto and from a ROM disk, a RAM disk and a partial ROM disk having the above-described format will be described with reference to the block diagram of FIG. 52.

The optical disk 1 is a ROM disk, a RAM disk or a partial ROM disk described heretofore. The optical disk 1 is driven rotationally by the spindle motor 2. The rotational-speed servo control of the spindle motor 2 is performed by a spindle control section 3. For example, the spindle control section 3 detects the rotational speed of the spindle motor 2 on the basis of an FG pulse (a frequency signal synchronized with the rotational speed) from the spindle motor 2, and realizes a disk rotation operation at a predetermined rotational speed by comparing reference speed information SK supplied from a controller 6 with the rotational speed of the spindle motor 2 and performing acceleration or deceleration of the spindle motor 2 on the basis of the information of the difference between them.

Laser light from the optical pickup 4 is radiated onto the optical disk 1 which is made rotating. The optical pickup 4 is provided with a laser-light source 4c formed by, for example, a laser diode or a laser coupler; an optical system 4e formed by various lenses and a beam splitter; an object lens 4a which becomes an output end of laser light; a detector 4d for detecting light reflected from the disk; a two-axis mechanism 4b for movably holding the object lens 4a in the tracking direction and in the focus direction; and others.

On/off of the laser output and the output level from the laser-light source 4c in the optical pickup 4 are controlled by a laser control section 5.

This recording and reproduction apparatus is connected to a host computer 90 through an interface section 19 of the apparatus. A data recording and reproduction operation is performed upon the controller 6 receiving a recording request or a reproduction request from the host computer 90.

When recording, data to be recorded together with a recording request is supplied from the host computer 90. Recording data $D_{REC}$ is supplied from the interface section 19 to an encoder 25 whereby a required encoding process is performed.

When the disk 1 is a RAM disk or a partial ROM disk, data can be magneto-optically recorded into the rewritable area thereof. The recording method is broadly classified into a light-modulation method and a magnetic-field modulation method.

The light-modulation method is a method in which laser light is modulated by recording data in a state in which an external magnetic field is applied onto a disk recording surface along a fixed vertical direction.

That is, when this method is adopted, during recording, the controller 6 causes a magnetic-head driver 26 to apply an external magnetic field of N or S to a disk recording surface from a magnetic head 27. The recording data encoded by the encoder 25 is supplied to the laser control section 5 whereby the laser output from the laser-light source 4c is turned on or off on the basis of the recording data. As a result, the portion where the laser is radiated is at a polarity of the external magnetic field, and the recording data is recorded as magnetic-field information onto the disk 1.

On the other hand, as magnetic-field modulation methods, there is a simple magnetic-field modulation method in which a magnetic field modulated on the basis of recording data is applied to the disk recording surface and laser light is radiated continuously at a fixed amount of light, and a laser-strobe magnetic-field modulation method in which, similarly, a magnetic field modulated on the basis of recording data is applied to the disk recording surface and pulsed laser light is emitted.

When these magnetic-field modulation methods are adopted, the controller 6 controls the laser control section 5 during recording so as to continuously emit the laser output from the laser-light source 4c or emit pulsed laser light from the laser-light source 4c. The recording data encoded by the encoder 25 is supplied to the magnetic-head driver 26 whereby a magnetic field of N or S is applied from the magnetic head 27 on the basis of the recording data. As a result, the recording data is recorded as magnetic-field information onto the disk 1.

The data reading position by the optical pickup 4 is movable in the radial direction. Though not specifically shown in the figure, a thread mechanism for moving the entire optical pickup 4 in the radial direction of the disk is provided, allowing a large movement of the reading position and the object lens 4a to move to the two-axis mechanism 4b in the radial direction of the disk, that is, a small movement of the reading position is performed by a tracking servo operation.

In place of the thread mechanism for moving the optical pickup 4, a mechanism for sliding the disk 1 together with the spindle motor 2 may be provided.

Further, as a result of the movement of the object lens 4a to the two-axis mechanism 4b in a direction in which the object lens 4a contacts or is separated from the optical disk 1, the focus control of the laser spot LSP is performed.

When the optical disk 1 is loaded by a loading mechanism (not shown), rotational driving by the spindle motor 2 is started. When the disk 1 reaches a predetermined rotational speed, the reading position is controlled so that the optical pickup 4 reads data in the GCP zone formed on the inner or outer region of the disk 1.

In this GCP zone, a required start-up process, such as retraction of focus, is performed. Thereafter, a recording or reproduction operation in response to a request from the host computer 90 is started.

As the detector 4d of the optical pickup 4, a four-part detector having 4-divided photoreceiving areas KA to KD shown, for example, in FIG. 21, a detector which detects each polarized-light component by a Kerr effect, of magnetic-field data (MO data) in the rewritable area and which obtains an RF signal as MO data, or others is provided.

As described above, in the rewritable area, twin tracks by land tracks and groove tracks are formed, and reproduction scanning by the laser spot LSP is performed simultaneously for both of the land tracks and groove tracks. A construction for extracting data from each of the land tracks and the groove tracks in such simultaneous scanning will be described later.

An electric-current signal S1 proportional to the amount of received light is output from each photoreceiving area of this detector 4d. These signals are supplied to the I/V conversion matrix amplifier 7 which performs current-to-voltage conversion on the amount of received-light signal S1 and generates a necessary signal, such as an RF signal, a push-pull signal or a focus error signal FE, through a computation process of signals from each photoreceiving area.

The focus error signal FE which becomes error information of the focus state is supplied to the servo controller 8. A focus phase compensation circuit (not shown), a focus driver (not shown) and the like are installed as a processing section of the focus system in the servo controller 8, and a focus driving signal in accordance with the focus error signal FE is generated and applied to a focus coil of the two-axis mechanism 4b. As a result of this, a focus servo system for causing the object lens 4a to focus onto a point is structured.

An RF signal used to generate a servo clock SCK and a data clock DCK is output as a signal S2 from the I/V conversion matrix amplifier 7. This signal S2, after low-frequency variations of the RF signal are removed by the clamping circuit 9, is converted into a digitized signal S3 by the A/D converter 10.

This signal S3 is supplied to the controller 6, the PLL circuit 11, and the tracking error generation section 16.

The PLL circuit 11 generates a servo clock SCK synchronized with the RF signal by controlling the oscillation frequency of an oscillator (not shown) on the basis of the phase difference between the signal S3 and the oscillation output and by performing a clock frequency-dividing process. This servo clock SCK is used as a sampling clock in the A/D converter 10 and is supplied to the timing controller 17.

Further, the PLL circuit 11 frequency-divides the servo clock SCK in order to generate a data clock DCK. This data clock DCK is supplied to the timing controller 17, the data detection section 14 and the laser control section 5.

The timing controller 17 generates a required timing signal to each section in accordance with the servo clock SCK and the data clock DCK.

For example, a sampling timing Ps for extracting servo pits for a three-phase tracking operation, a synchronization timing DSY for a decoding operation by the data detection section 14 and others are generated.

The tracking error signal TE by what is commonly called three-phase tracking control is generated by the PLL circuit 11, the timing controller 17 and the tracking error generation section 16, and is supplied to the servo controller 8.

This tracking servo operation has already been described in detail with reference to FIGS. 12 to 16 and therefore, a description thereof has been omitted here.

However, the controller 6 performs polarity switching control relating to the tracking error signal TE, switching control by the servo pit pattern, and the like with respect to the tracking error generation section 16 and the servo controller 8, and realizes the required scanning as described in the examples of each of the above-described disks.

Further, it is also possible to perform detrack tracking by a method of supplying an offset to, for example, the tracking error signal TE. For example, a scanning which passes along one of the servo pit tracks may be performed.

During the reproduction from the ROM area, an RF signal and a push-pull signal, used to extract pit data, are output from the I/V conversion matrix amplifier 7. Further, during the reproduction from the rewritable area, a land track MO signal and a groove track MO signal, which are obtained by the simultaneous scanning of the land tracks and the groove tracks, are output as a signal S4.

This signal S4, after low-frequency variations of the RF signal are removed by a clamping circuit 12, is converted into a digitized signal S5 by an A/D converter 13.

This signal S5 is supplied to the data detection section (i.e., decoder) 14. In the data detection section 14, the timing controller 17 decodes data in accordance with the synchronization timing DSY generated in accordance with the data clock DCK in order to obtain reproduction data $D_{PB}$. For example, a waveform equalizing process, a demodulation process for a modulation process adopted in a recording format, an error correction process, and the like are performed to decode data as reproduction data $D_{PB}$.

This reproduction data $D_{PB}$ is supplied to the host computer 90 via the interface section 19.

During reproduction, two-track simultaneous scanning is performed in the twin-track-type rewritable area, but during recording, scanning for each track is performed. For this reason, the intensity distribution state of the laser spot LSP is changed between recording time and reproduction time. As will be described next, for this purpose, a liquid-crystal optical-rotation plate 72 is provided within the optical system 4e. This liquid-crystal optical-rotation plate 72 is what is commonly called a liquid-crystal panel which changes the liquid-crystal orientation according to a voltage applied state, thereby performing an optical rotation process. On/off of this liquid-crystal optical-rotation plate 72 is performed by an optical-rotation-plate control section 20 under the control of the controller 6. That is, the optical rotation function of the liquid-crystal optical-rotation plate 72 is changed in accordance with a control signal $S_{R/P}$ from the optical-rotation-plate control section 20.

Recording and reproduction of the above-described various disks is performed by the recording and reproduction apparatus constructed as described above.

Required tracking servo such as that described above is performed according to various areas in various disks in order to perform recording and reproduction scanning.

That is, in the rewritable area, which is an L/G-alternate-type RAM, a recording scanning is performed with both of the lands LD and the grooves GB as recording tracks by operating tracking control of the laser spot for the center of the groove tracks and tracking control of the laser spot for the center of the land tracks for each circular track on the basis of the servo pits in the servo area ARs.

Also during reproduction of the rewritable area which is an L/G-alternate-type RAM, a reproduction scanning is performed with both of the land tracks LD and the groove tracks GB which are made as recording tracks by operating tracking control of the laser spot for the center of the grooves and tracking control of the laser spot for the center of the lands for each circular track on the basis of the servo pits in the servo area ARs.

For the tracking control operation during the recording and reproduction, tracking control for the center of the groove tracks and tracking control for the center of the land tracks for each circular track are performed by operating three-phase tracking control such that a difference signal of each pair of three-phase signals obtained by sampling the RF signal at servo-pit timings in the servo area ARs is determined, and these difference signals are switched and selected.

Further, during reproduction from the twin-pit-type or twin-pit single-data-type ROM area, two-track simultaneous reproduction scanning is performed by operating tracking control for the middle position of the left track Ltk and the right track Rtk which form a double spiral on the basis of the servo pits in the servo area ARs.

Also for this tracking control operation during reproduction, tracking control for the middle position of the two tracks which form a double spiral is performed by operating three-phase tracking control such that a difference signal of each pair of three-phase signals obtained by sampling the RF signal at servo-pit timings in the servo area ARs is determined, and these difference signals are switched and selected.

Further, in the rewritable area, which is an L/G twin-track-type RAM, a recording scanning is performed with both of the lands LD and the grooves GB as recording tracks by operating tracking control of the laser spot for the center of the grooves and tracking control of the laser spot for the center of the land tracks for each circular track in tracking (or detrack tracking) based on the servo pits in the servo area ARs.

Further, during reproduction from the rewritable area, which is an L/G twin-track-type RAM, a simultaneous reproduction scanning of both of the lands LD and the grooves GB which are made as recording tracks is determined by operating tracking control of the laser spot for the boundary between the groove tracks and the land tracks in tracking (or detrack tracking) based on the servo pits in the servo area ARs.

The tracking control operation during the recording and reproduction is performed by three-phase tracking control such that a difference signal of each pair of three-phase signals obtained by sampling the RF signal at servo-pit timings in the servo area ARs is determined and these difference signals are switched and selected.

Further, during reproduction from the twin-pit-type or twin-pit single-data-type ROM area, two-track simultaneous reproduction scanning is performed by operating tracking control for the middle position of the left track Ltk and the right track Rtk which form a double spiral on the basis of the servo pits in the servo area ARs.

Also for this tracking control operation during reproduction, tracking control for the middle position of two tracks which form a double spiral is performed by operating three-phase tracking control such that a difference signal of each pair of three-phase signals obtained by sampling the RF signal at servo-pit timings in the servo area ARs is determined and these difference signals are switched and selected.

Figure 52:
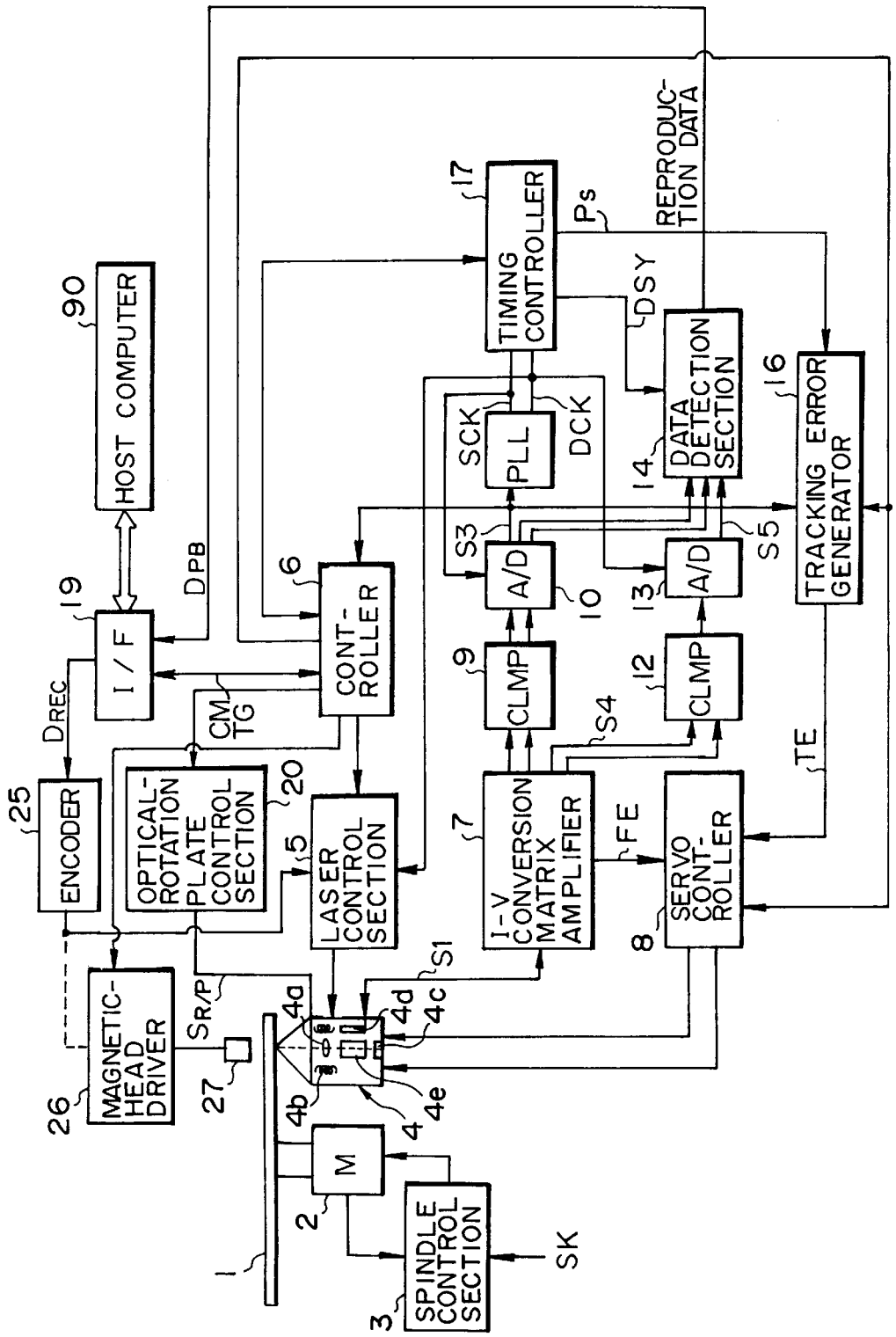
FIG. 52 is a block diagram of a recording and reproduction apparatus which handles a disk according to the embodiment the present invention.

The construction of the recording and reproduction apparatus is not limited to the example of FIG. 52, and needless to say, various constructions are possible.

<Groove/Land Simultaneous Scanning Method>

Referring to FIGS. 53 to 59, the construction and operation of the optical pickup 4 for realizing a simultaneous reproduction scanning of groove tracks and land tracks from a twin-track-type disk will be described below.

Figure 53:
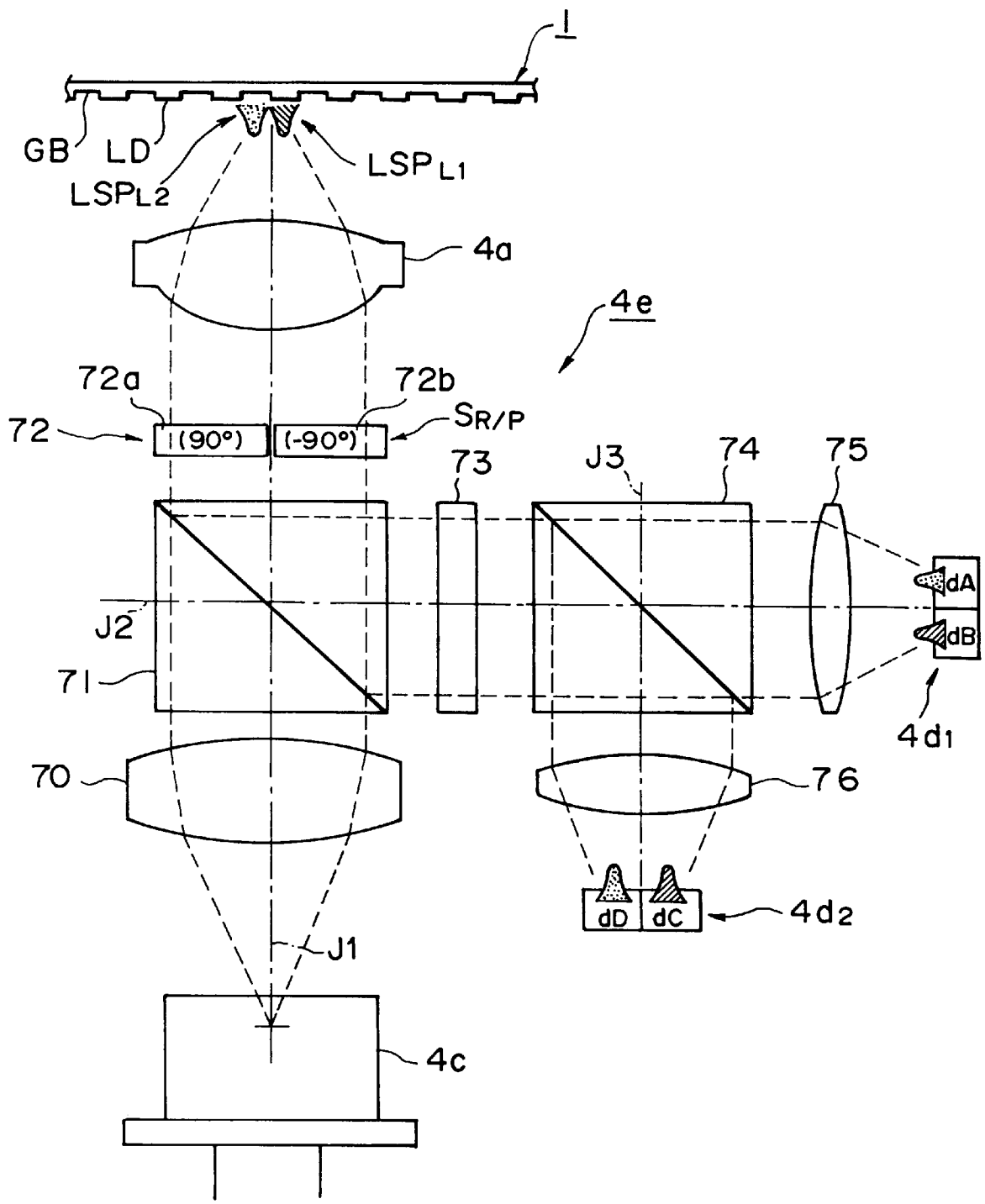
FIG. 53 is an illustration of the state of reproduction by an optical pickup of the recording and reproduction apparatus which handles a disk according to the embodiment of the present invention.

FIG. 53 shows the internal construction of the optical pickup 4.

In this optical pickup 4, a collimator lens 70, a beam splitter 71, and a liquid-crystal optical-rotation plate 72 are provided as components within the optical system 4e which guides a laser beam from the laser-light source 4c to the object lens 4a which is an output end. Further, the light reflected from the disk 1 travels from the object lens 4a to the liquid-crystal optical-rotation plate 72 and the beam splitter 71. Components reflected by this beam splitter 71 are guided to a half-wavelength plate 73 and a polarized beam splitter 74, and P-wave components which passed through the polarized beam splitter 74 are collected by a lens 75 and radiated onto a detector 4d1. Meanwhile, S-wave components which were reflected by the polarized beam splitter 74 are collected by a lens 76 and radiated onto a detector 4d2.

The laser beam output from the laser-light source 4c is made parallel by the collimator lens 70 and guided into the beam splitter 71.

In the beam-splitter 71, for example, transmittance to the P wave is set to 80% (reflectance: 20%), and transmittance to the S wave is set to 0% (reflectance: 100%). Therefore, the P-wave components pass through the beam splitter 71 and are guided to the liquid-crystal optical-rotation plate 72.

The liquid-crystal optical-rotation plate 72 is formed by using a liquid-crystal panel, that is, it changes the optical rotation state by varying the orientation state of liquid-crystal molecules according to the voltage applied state.

This liquid-crystal optical-rotation plate 72 is divided into two areas in the radial direction by the division line of the tangential direction of the tracks. For the sake of description, the areas are referred to as an optical-rotation section 72a and an optical-rotation section 72b. This optical-rotation plate which is divided into two areas is disclosed in U.S. Pat. No. 5,577,018 assigned to the assignee of this application.

When a voltage applied state is reached in accordance with the above-described control signal $S_{R/P}$ from the optical-rotation-plate control section 20, the optical-rotation section 72a and the optical-rotation section 72b each perform optical rotation of 0°, that is, do not perform optical rotation.

On the other hand, when a voltage-off state is reached in accordance with the control signal $S_{R/P}$, the optical-rotation section 72a performs an optical rotation of 90°, and the optical-rotation section 72b performs an optical rotation of −90°.

The laser beam which passed through the liquid-crystal optical-rotation plate 72 is radiated as the laser spot LSP onto the recording surface (the land tracks LD and the groove tracks GB) of the disk 1 through the object lens 4a.

At this time, as shown in FIG. 53 as a representation of the intensity distribution of the laser spot LSP, two peaks, a peak $LSP_{L1}$ at a position corresponding to the center of the land tracks LD and a peak $LSP_{L2}$ at a position corresponding to the center of the groove tracks GB occur. The reflected light components from the disk 1 are guided into the liquid-crystal optical-rotation plate 72 via the object lens 4a and receive an optical-rotation process corresponding to the current state of the control signal $S_{R/P}$. In the beam splitter 71, the vibration direction of the reflected P-wave components is rotated through 22.5° by the half-wavelength plate 73. This is a process for performing 45° detection.

The P-wave components in the 45° detection of the light which traveled from the half-wavelength plate 73 to the polarized beam splitter 74 enter the detector 4d1 via the lens 75. This detector 4d1 is formed as a two-division detector having photoreceiving areas dA and dB. Further, the S-wave components in the 45° detection of the light which traveled from the half-wavelength plate 73 to the polarized beam splitter 74 enter the detector 4d2 via the lens 76. This detector 4d2 is also formed as a two-division detector having photoreceiving areas dC and dD.

Here, a method of causing the laser spot LSP to form two peaks $LSP_{L1}$ and $LSP_{L2}$, that is, the function of the liquid-crystal optical-rotation plate 72, will be described.

A combined optical-rotation plate having two areas capable of giving a desired optical-rotation angle α to a laser beam will now be considered. Then, the state of the beam spot such that light rotated through an optical-rotation angle α by the optical-rotation plate is converged by an object lens will be considered.

FIGS. 58A to 58E show results of the intensity distribution of the laser spot LSP determined through simulation with the optical-rotation angle α of the optical-rotation plate set at 5°, 10°, 22.5°, 30° and 45°, respectively. It can be seen that the greater the optical-rotation angle α, the wider the extent of the beam spot becomes.

Here, if the optical-rotation angles of the two areas of the combined optical-rotation plate are each α and −α, in the polarized-light state of the laser beam immediately before entering the object lens 4a, the same polarized-light components of each beam which passed through each area of the combined optical-rotation plate interfere with each other.

Figure 57:
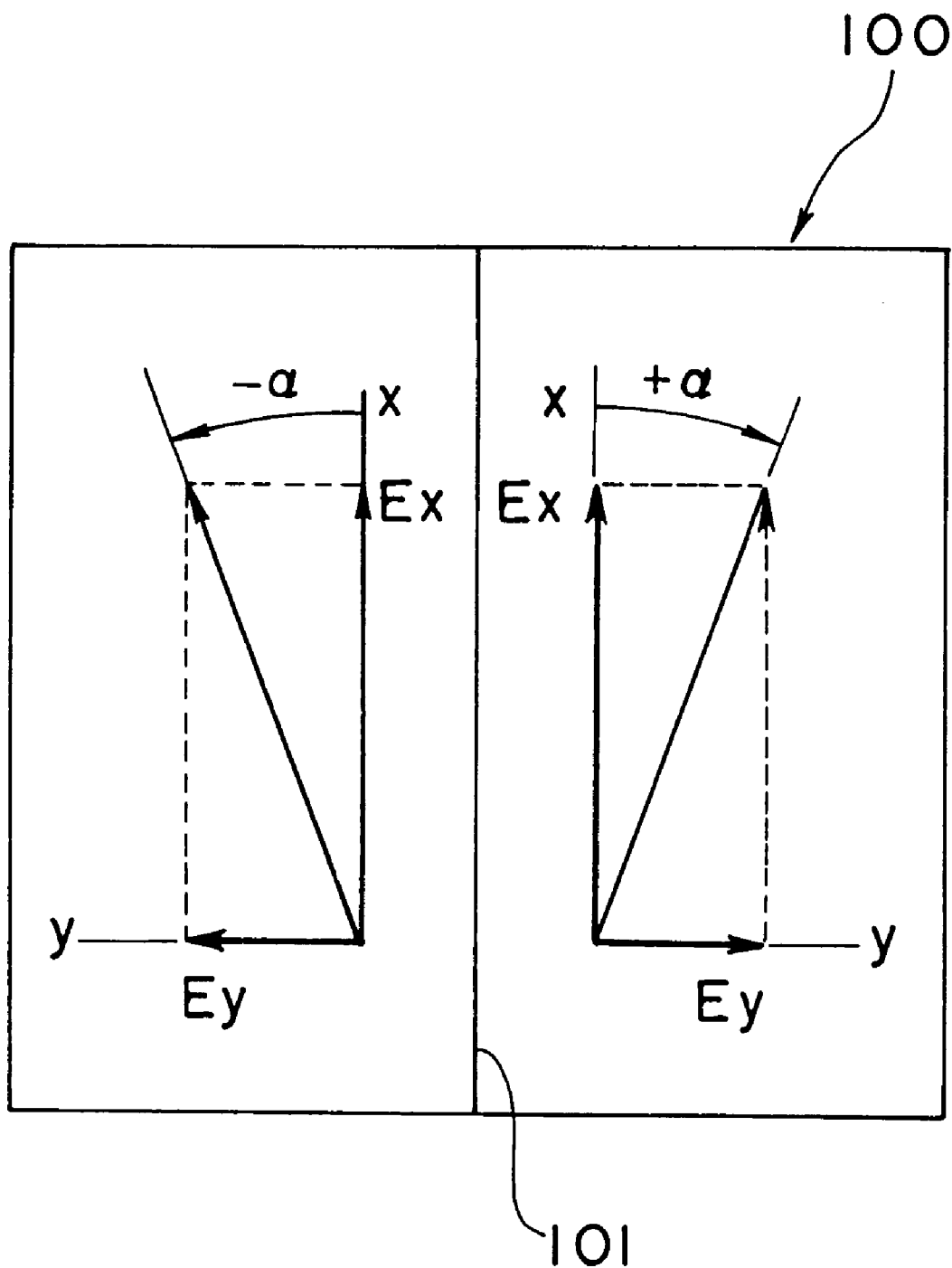
FIG. 57 is an illustration of an operation of a liquid-crystal optical-rotation plate of the optical pickup which handles a disk according to the embodiment of the present invention.
Figure 58A:
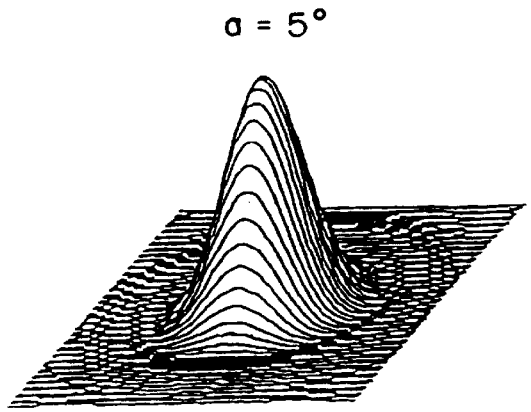
FIGS. 58A, 58B, 58C, 58D and 58E are illustrations of laser spot shapes according to optical-rotation angles.
Figure 58D:
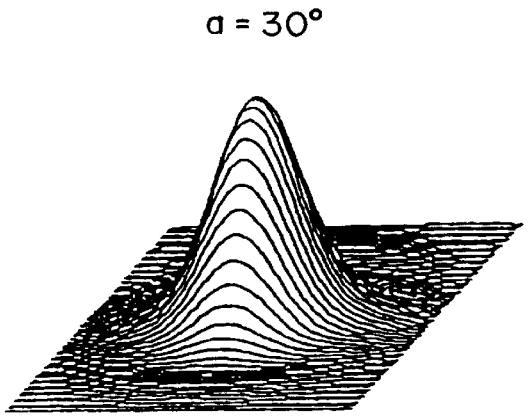
Figure 58B:
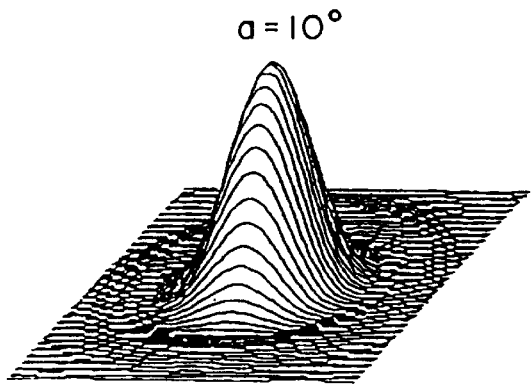
Figure 58E:
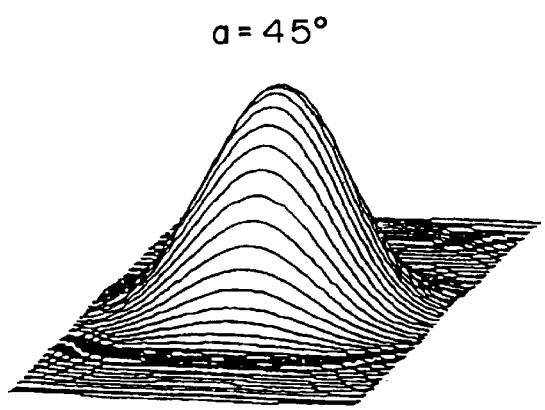
Figure 58C:
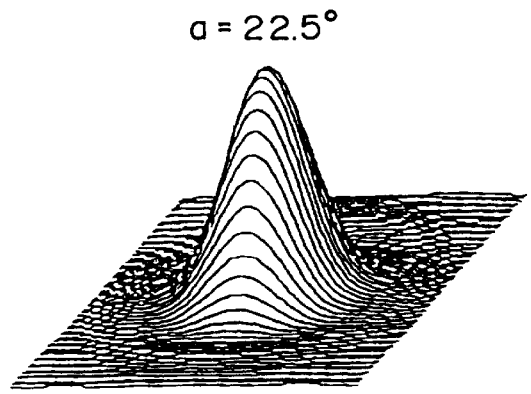
Figure 59A:
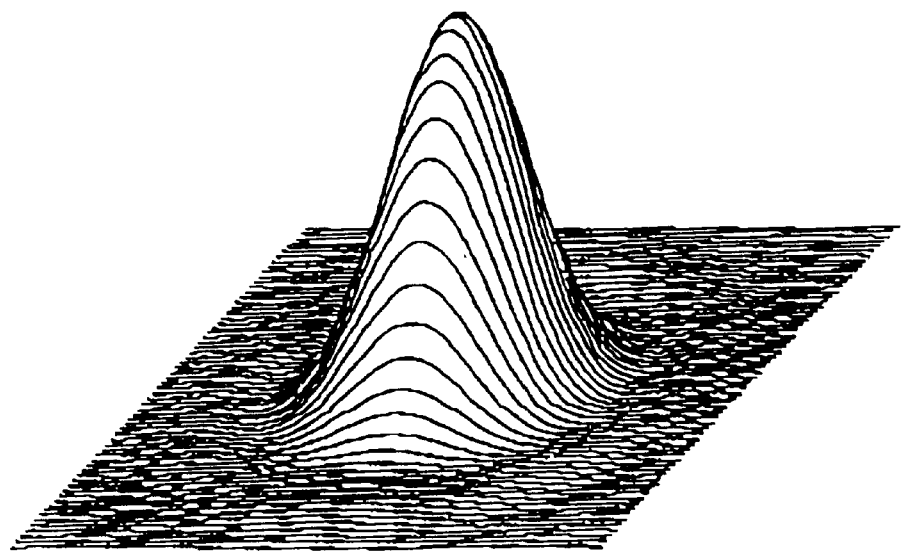
FIGS. 59A and 59B are illustrations of x and y components of laser spot shapes according to optical-rotation angles.
Figure 59B:
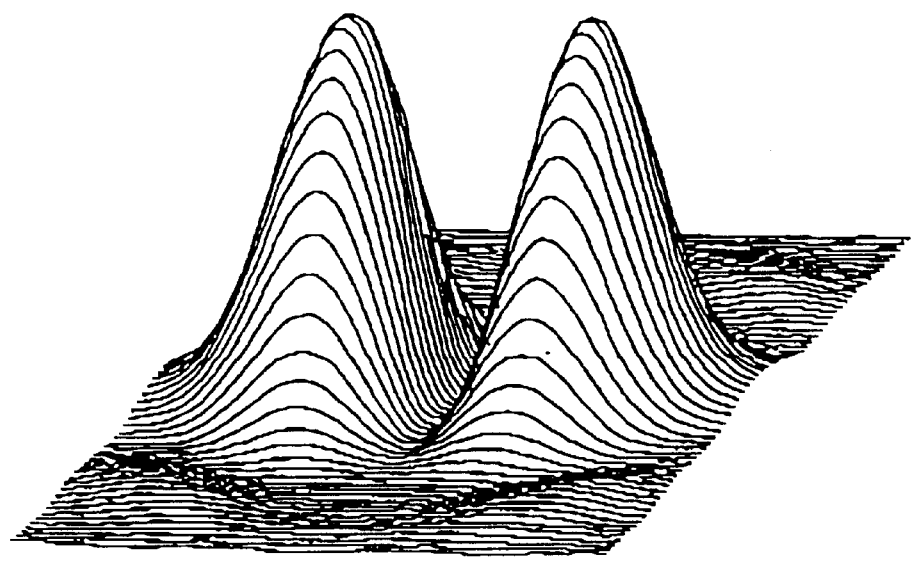

Thus, the results of the simulation are shown in FIG. 57, where the direction along a division line 101 of a combined optical-rotation plate 100 is denoted as the x direction and the direction intersecting at right angles to the division line 101 is denoted as the y direction, and the state the beam spot becomes for each component in the respective directions are shown in FIGS. 59A and 59B.

This makes it possible to determine what is commonly called the beam spot having the same phase components and the beam spot of the y components, whose respective polarized-light components are the same but whose phase is inverted. Since the phase of the beam spot having components in the y direction is inverted 180° at the center of the beam, the amount of light becomes constantly zero.

As can be understood from the above, when the optical-rotation angle α of the combined optical-rotation plate 100 is large, the polarized-light components of the opposite phase increase. As shown in FIGS. 58A to 58E, the extent of the beam spot along the division direction of the combined optical-rotation plate 100 becomes wider.

When the optical-rotation angle α=±90°, the laser spot LSP becomes the beam shape itself of the y components $E_y$.

That is, the laser spot LSP reaches a state such as that shown in FIG. 59B.

Such a combined optical-rotation plate 100 corresponds to the liquid-crystal optical-rotation plate 72 shown in FIG. 53. Since the optical-rotation angle α of the optical-rotation section 72a is set to 90°, the optical-rotation angle α of the optical-rotation section 72b is set to −90°, and the optical-rotation sections 72a and 72b are formed as areas divided in the radial direction of the disk 1 by the division line in the tangential direction of the tracks, the laser spot LSP reaches a state such as that shown in FIG. 59B, and one peak $LSP_{L1}$ is positioned on the land tracks LD and the other peak $LSP_{L2}$ is positioned on the groove tracks GB.

A reflected-light detection operation for reproducing land/groove twin tracks utilizing the functions of such a liquid-crystal optical-rotation plate 72 will be described with reference to FIGS. 55 and 56.

Figure 55:
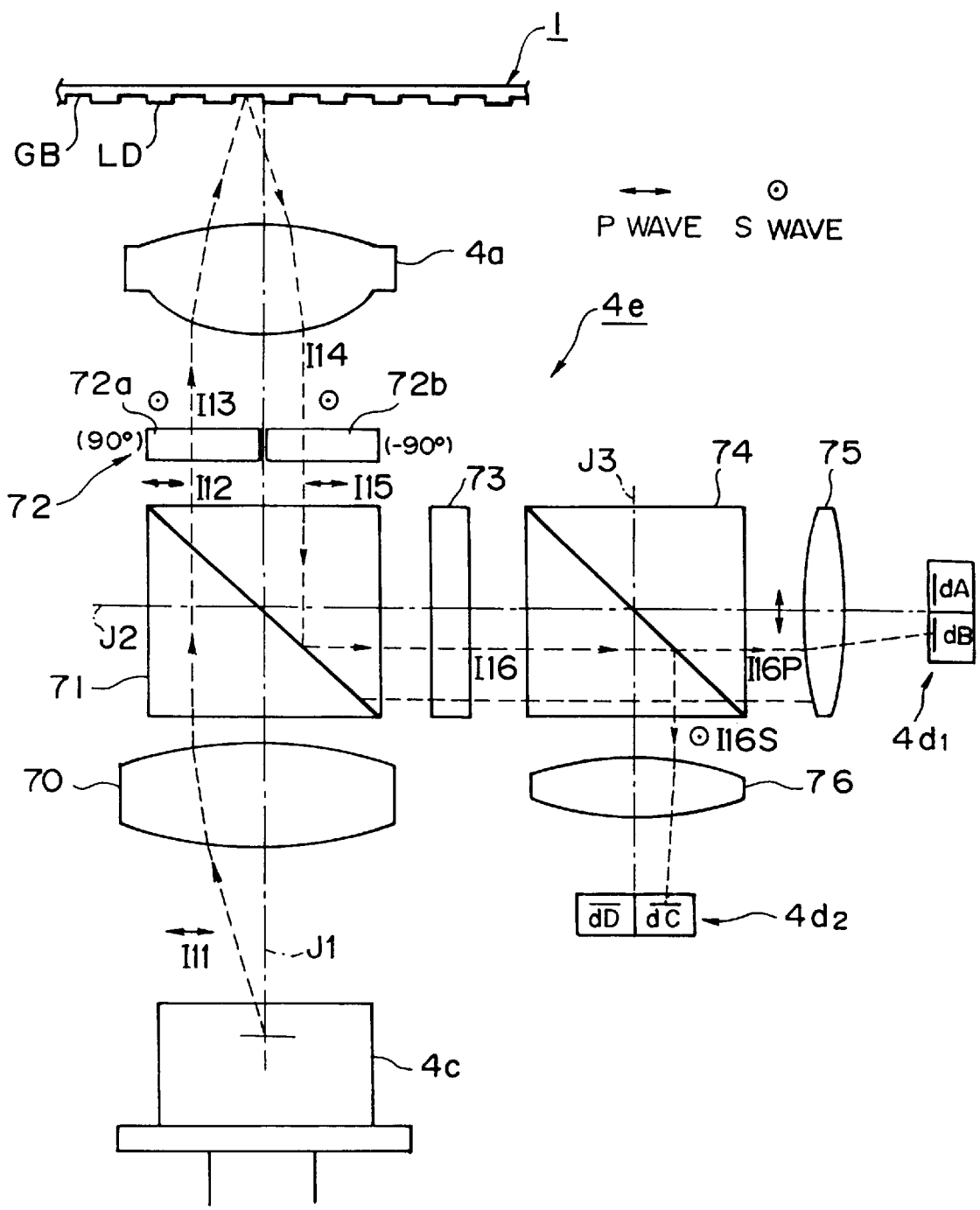
FIG. 55 is an illustration of a groove data reading operation of the optical pickup which handles a disk according to the embodiment of the present invention.

FIG. 55 shows a representation of a beam proceeding on the left side of the drawing from the optical axis J1 of the laser beam output from the laser-light source 4c.

This laser beam I11 travels from the collimator lens 70 to the beam splitter 71 and is guided as a laser beam I12 by the P-wave components into the optical-rotation section 72a.

A voltage is not applied to the liquid-crystal optical-rotation plate 72 during reproduction. Therefore, the optical-rotation section 72a has the function of 90° optical rotation, and the optical-rotation section 72b has the function of −90° optical rotation.

The laser beam I12 is rotated through 90° by the optical-rotation section 72a and passes as a laser beam I13 by the S wave through the object lens 4a. Then, the beam is radiated as components forming the peak $LSP_{L2}$ onto the grooves GB by the above-described effect.

A laser beam I14, which is the components reflected from the groove tracks GB, is guided to the optical-rotation section 72b. Although the optical-rotation section 72b has an optical-rotation angle α of −90°, since the laser beam I14 is made to enter in a mirror-surface reflection state on the disk, 90° optical rotation is performed by the optical-rotation section 72b when seen from the laser beam I14. Therefore, a laser beam I15 is made to enter as the P wave at a 180° optically-rotated state from the laser beam I12 to the beam splitter 71.

A laser beam I16 which is reflected by the beam splitter 71 and rotated through 22.5° by the half-wavelength plate 73 is separated into S-wave components I16S and P-wave components I16P by the polarized beam splitter 74. The S-wave components I16S enter the photoreceiving area dC of the detector 4d2, and the P-wave components I16P enter the photoreceiving area dB of the detector 4d1. When polarized light by what is commonly called a Kerr effect is considered, it is possible to obtain a reproduction signal (MO signal) from the groove tracks on the basis of the difference (dC—dB) between the signal responding to the amount of received light in the photoreceiving area dB and the signal responding to the amount of received light in the photoreceiving area dC.

Figure 56:
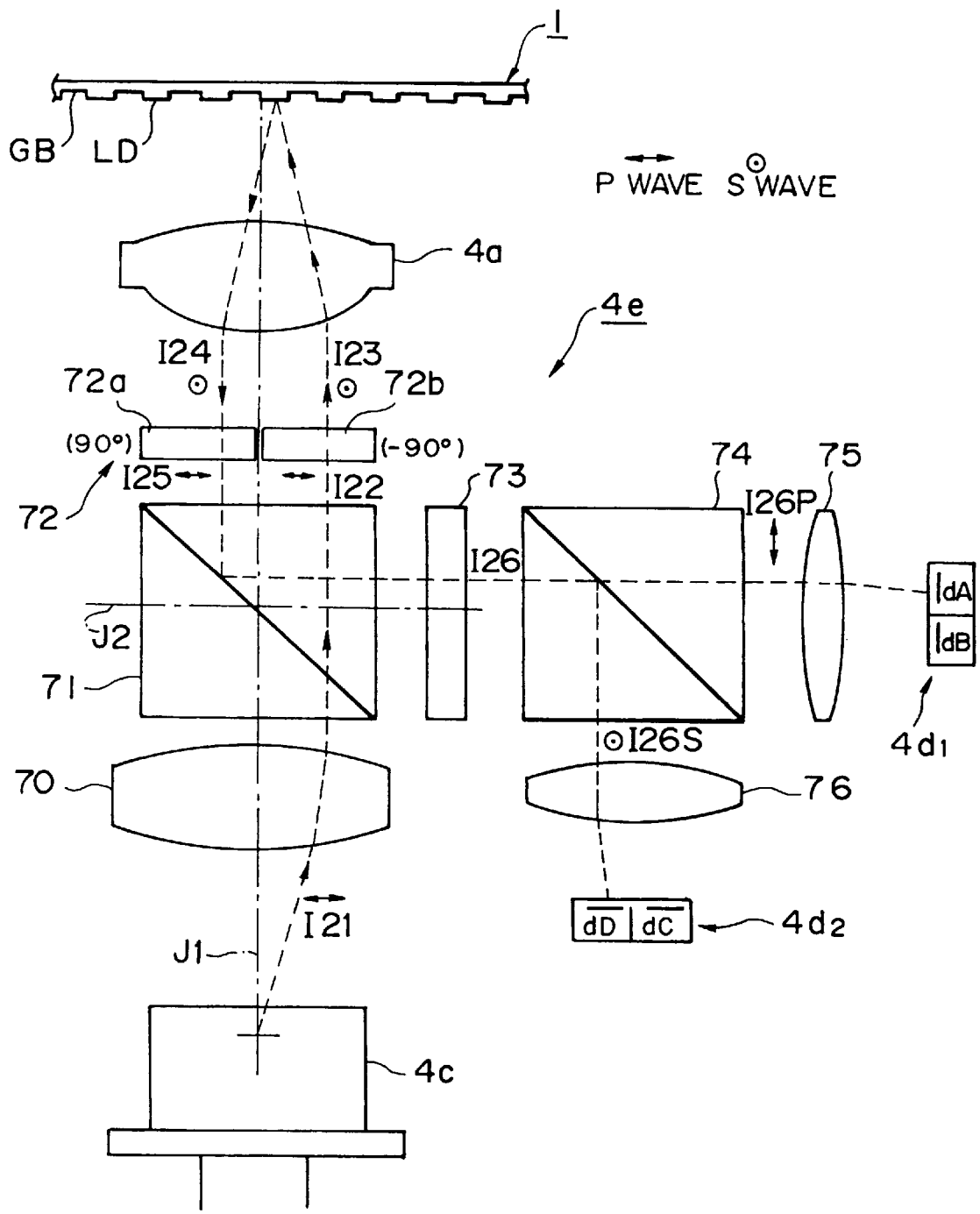
FIG. 56 is an illustration of a land data reading operation of the optical pickup which handles a disk according to the embodiment of the present invention.

FIG. 56 shows a representation of a beam proceeding on the right side of the drawing from the optical axis J1 of the laser beam output from the laser-light source 4c.

This laser beam I21 travels from the collimator lens 70 to the beam splitter 71 and is guided as a laser beam I22 by the P-wave components into the optical-rotation section 72a.

The laser beam I22 is rotated through −90° by the optical-rotation section 72b and passes as a laser beam I23 by the S wave through the object lens 4a. Then, the beam is radiated as components forming the peak $LSP_{L1}$ onto the land tracks LD by the above-described effect.

A laser beam I24, which is components reflected from the land tracks LD, is guided into the optical-rotation section 72a. Although the optical-rotation section 72a has an optical-rotation angle α of 90°, since the laser beam I24 is made to enter at a mirror-surface reflection state on the disk, −90° optical rotation is performed by the optical-rotation section 72a when seen from the laser beam I14. Therefore, a laser beam I25 is made to enter as the P wave at a −180° optically-rotated state from the laser beam I22 to the beam splitter 71.

A laser beam I26 which is reflected by the beam splitter 71 and rotated through 22.5° by the half-wavelength plate 73 is separated into S-wave components I26S and P-wave components I26P by the polarized beam splitter 74. The S-wave components I26S enter the photoreceiving area dD of the detector 4d1, and the P-wave components I26P enter the photoreceiving area dA of the detector 4d1. When polarized light by what is commonly called a Kerr effect is considered, it is possible to obtain a reproduction signal (MO signal) from the groove tracks on the basis of the difference (dD—dA) between the signal responding to the amount of received light in the photoreceiving area dA and the signal responding to the amount of received light in the photoreceiving area dD.

That is, since the operations shown in FIGS. 55 and 56 are performed simultaneously, even if the land tracks LD and the groove tracks GB are scanned simultaneously, it becomes possible to individually extract the MO signal from the land tracks as dD—dA and the MO signal from the groove tracks as dC—dB.

As a result, it is possible to properly reproduce data from the L/G twin-track-type rewritable area in the above-described disk.

Figure 54:
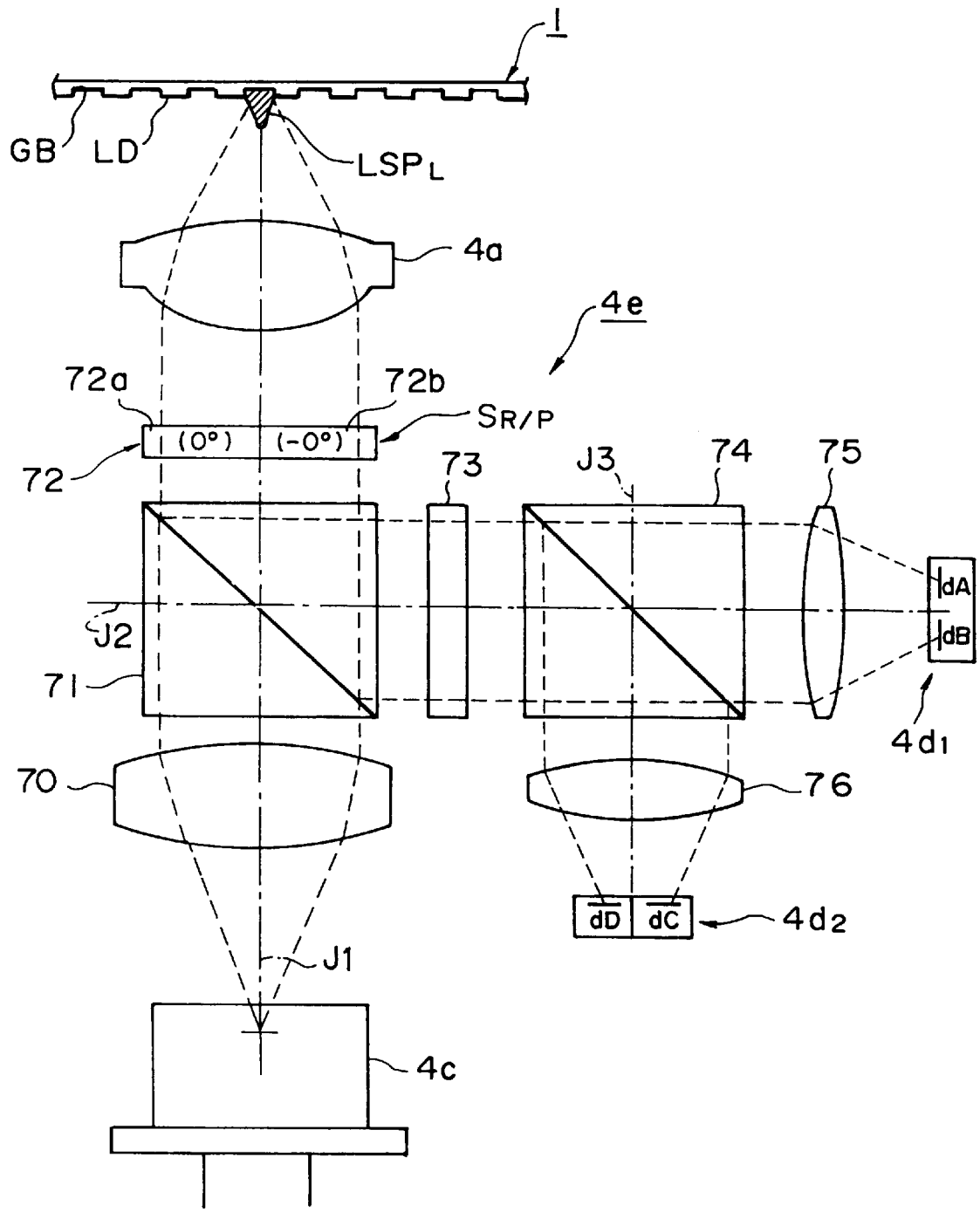
FIG. 54 is an illustration of the state of recording by an optical pickup of the recording and reproduction apparatus which handles a disk according to the embodiment of the present invention.

During recording, the groove tracks and the land tracks are scanned individually; therefore, the shape of the laser spot shape may have one peak as is the normal case. For this reason, the liquid-crystal optical-rotation plate 72 is placed in a voltage-on state in accordance with the control signal $S_{R/P}$ from the optical-rotation-plate control section 20, causing the optical-rotation angle of each of the optical-rotation sections 72a and 72b to be 0°. This state is shown in FIG. 54. That is, optical rotation is not performed by each of the optical-rotation sections 72a and 72b and therefore, the beam spot is formed into a normal spot shape having one peak $LSP_L$ and radiated onto the disk 1. Further, the diameter of the laser spot may be the same as that during reproduction since the intensity distribution is based on the center.

As described above, in the present invention, as the recordable and reproduceable area (rewritable area), one unit area (segment) is formed by a servo area in which pits for obtaining a servo signal and a data area in which data can be recorded and reproduced, a plurality of a succession of this unit area forms one circular track and further, a circular track formed by a plurality of unit areas in which a data area is formed on land tracks and a circular track formed by a plurality of unit areas in which a data area is formed on groove tracks are formed in the shape of a double spiral.

That is, the present invention has advantages in that both groove tracks and land tracks can be used as data recording tracks, making higher-density recording possible.

Further, with the land tracks and the groove tracks each being assigned to one track as described above, by making the track pitch of the adjacent circular tracks, i.e., the width from the center of the land tracks to the center of the groove tracks, to be approximately ½ of the diameter size of the laser spot radiated for a recording or reproduction operation, a two-fold high-density recording or higher becomes possible without changing the laser spot size, and a higher capacity can be achieved.

Furthermore, since the land tracks and the groove tracks which form a double spiral are scanned simultaneously to read data, it is possible to realize a higher transfer rate of readout data.

Pits for obtaining a three-phase tracking servo signal for performing at least tracking control of the laser spot for the center of the groove tracks and tracking control of the laser spot for the center of the land tracks are formed in the servo area. That is, by performing a three-phase tracking operation, it is possible to effect stable tracking servo which can prevent defects and which has a wide retraction range.

Further, since the type of unit area (segment) is represented by the position at which the servo pit is formed, efficient information representation becomes possible.

Further, in the present invention, as a read-only area (ROM area), pits are arrayed so as to form tracks in the shape of a double spiral in the data area, and the track pitch of each track which forms the double spiral is made to be approximately ½ of the diameter size of the laser spot radiated for a reproduction operation. In both tracks which are formed in the shape of a double spiral and onto which a laser spot is radiated simultaneously, pits which form a data sequence of two systems independent of each other are formed, or pits which form a data sequence of one system by simultaneous reading of both tracks are formed.

As a result, it is possible to realize a two-fold high-density recording or higher and to realize a considerably larger capacity according to a method of generating recording data, such as two-channel twin pits or logical twin pits.

Furthermore, a higher transfer rate becomes possible through two-track simultaneous scanning.

Pits for obtaining a three-phase tracking servo signal for operating at least tracking control of the laser spot for the middle position of the two adjacent tracks in the shape of a double spiral are formed in the servo area of the read-only area. That is, by performing a three-phase tracking operation, it is possible to perform stable tracking servo which can prevent defects and which has a wide retraction range. Further, since the type of unit area (segment) is represented by the position at which the servo pit is formed, efficient information representation becomes possible.

As a result of the above, the present invention provides a recording medium, such as a ROM disk, a RAM disk or a partial ROM disk, in which a narrower track pitch is achieved with practical use maintained satisfactorily, and a larger capacity and a higher transfer rate are achieved, and which has a format suitable for the integration of pits in the read-only area and land/groove tracks formed in the recordable and reproduceable area, and provides a driving apparatus.

Further, in the present invention, a circular track formed by a plurality of unit areas in which a data area is made on land tracks and a circular track formed by a plurality of unit areas in which a data area is made on groove tracks are formed alternately for each circular track.

That is, a land/groove-alternate track structure is configured such that groove tracks become data recording tracks in the circular track next to the circular track in which land tracks become data recording tracks, and land tracks become data recording tracks in the next circular track. As a result, both of the land/groove tracks can be used as recording tracks in order to make higher-density recording possible.

Further, with the land tracks and the groove tracks each assigned to one track as described above, by making the track pitch of the adjacent circular tracks, i.e., the width from the center of the land tracks to the center of the groove tracks, to be approximately ½ of the diameter size of the laser spot radiated for a recording or reproduction operation, a two-fold higher-density recording or higher becomes possible without changing the laser spot size, and a higher capacity can be achieved.

Further, in the present invention, concerning the formation of a recordable and reproduceable area, a one-circular-track cutting operation for performing pit cutting of a servo area in each unit area and a groove cutting of a data area and a one-circular-track cutting operation for performing pit cutting of a servo area in each unit area are performed alternately for each circular track.

Further, in order to form tracks in the shape of a double spiral in the read-only area, the movement speed at the cutting position in the radial direction of the disk is made twice as fast as the movement speed at the recordable and reproduceable area, and the one-circular-track cutting position is moved in the radial direction of the disk for each circular track.

According to the present invention, cutting of a disk, such as a partial ROM disk, in which, for example, a twin-pit-type ROM and an L/G-alternate-type RAM are combined, can be performed satisfactorily by a simple apparatus construction and operation control structure.

Further, when shifting from a cutting operation of a recordable and reproduceable area to a cutting operation of a read-only area, for the cutting operation of the first circle of the read-only area, pit cutting of the servo area in each unit area is performed with the movement speed at the cutting position in the radial direction of the disk kept at the movement speed in the recordable and reproduceable area. For the cutting operation of the second and subsequent circles of the read-only area, the movement speed at the cutting position in the radial direction of the disk is made to twist as fast as the movement speed in the recordable and reproduceable area, and the one-circular-track cutting position is moved in the radial direction of the disk for each circular track.

As a result, when shifting from a cutting operation of a recordable and reproduceable area to a cutting operation of a read-only area, a servo area can be formed so that a servo operation required for the boundary portion between the two areas becomes possible and further, tracks of the two areas in which the scanning pitches during recording and reproduction are different can be formed smoothly without stopping the cutting operation and of course without much expense of time and effort on the cutting operation setting.

Since a manufacturing process can be simplified by the present invention, a recording medium, such as a partial ROM disk, in which a narrower track pitch is achieved with practical use maintained satisfactorily, and a larger capacity and a higher transfer rate are achieved, and which has a format suitable for the integration of pits in the read-only area and land/groove tracks formed in the recordable and reproduceable area can be provided at a low cost and in large quantities.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A disk-type recording medium, comprising:
    a disk-shaped base having a plurality of lands and a plurality of grooves; and
    a plurality of tracks which are formed in said base and which are formed by two spirals which do not intersect each other;
        wherein each pair of adjacent tracks of said plurality of tracks are formed alternately on lands and grooves at angular positions of said base.

2. The medium of claim 1, wherein the area on said base is divided into a servo area for obtaining a servo signal and a recordable or reproduceable data area for each angular position of said base, and further
    wherein each pair of adjacent tracks of said plurality of tracks are formed alternately on lands and grooves at angular positions of said base in said data area.

3. The medium of claim 2, wherein a plurality of pits for three-phase tracking are formed in said servo area.

4. The medium of claim 3, wherein said plurality of pits for three-phase tracking are formed of a first pit formed at a first angular position of one spiral, a second pit formed at a second angular position of said one spiral, a third pit formed at said first angular position on the other spiral, and a fourth pit formed at a third angular position of said other spiral.

5. The medium of claim 4 wherein the pitch of said tracks is made to be approximately ½ of a laser spot used for a reproduction operation.

6. The medium of claim 5 wherein said data area is a recordable area.

7. The medium of claim 1, wherein the pitch of said tracks is made to be approximately ½ of a laser spot used for a reproduction operation.

8. The medium of claim 7 wherein said data area is a recordable area.

9. The medium of claim 1, wherein said data area is a recordable area.

10. A disk-type recording medium, comprising:
   a disk-shaped base having a plurality of lands and a plurality of grooves;
   a recordable area which is formed on said base and which has a plurality of tracks; and
   a read-only area which is formed on said base and which has a plurality of tracks;
      wherein the plurality of tracks of said recordable area are formed by two spirals which do not intersect each other, and each pair of adjacent tracks are formed alternately on said lands and said grooves at angular positions of said base.

11. The medium of claim 10, wherein the area on said base is divided into a servo area for obtaining a servo signal and a recordable or reproduceable data area for each angular position of said base; and further
   wherein each pair of adjacent tracks of said plurality of tracks are formed alternately on lands and grooves at angular positions of said base in said data area.

12. The medium of claim 11 wherein a plurality of pits for three-phase tracking are formed in said servo area.

13. The medium of claim 12 wherein the pitch of said tracks is made to be approximately ½ of a laser spot used for a reproduction operation.

14. The medium of claim 10 wherein a plurality of pits for three-phase tracking are formed in a servo area in said base.

15. The medium of claim 14 wherein the pitch of said tracks is made to be approximately ½ of a laser spot used for a reproduction operation.

16. The medium of claim 10 wherein the pitch of said tracks is made to be approximately ½ of a laser spot used for a reproduction operation.

17. A disk-type recording medium, comprising:
   a disk-shaped base;
   a recordable area which is formed on said base and which has a plurality of tracks; and
   a read-only area which is formed on said base and which has a plurality of tracks;
      wherein said plurality of tracks are formed of two spirals which do not intersect each other in said read-only area, and are formed of a single spiral in said recordable area.

18. The medium of claim 17 wherein lands and grooves are formed on said base, and each pair of adjacent tracks of said plurality of tracks are formed alternately on lands and grooves at angular positions of said base.

19. The medium of claim 18 wherein a plurality of pits for three-phase tracking are formed in a servo area in said base.

20. The medium of claim 19 wherein the pitch of said tracks is made to be approximately ½ of a laser spot used for a reproduction operation.

21. The medium of claim 17 wherein a plurality of pits for three-phase tracking are formed in a servo area in said base.

22. The medium of claim 21 wherein the pitch of said tracks is made to be approximately ½ of a laser spot used for a reproduction operation.

23. The medium of claim 17 wherein the pitch of said tracks is made to be approximately ½ of a laser spot used for a reproduction operation.

24. A driving apparatus for driving a disk-type recording medium, comprising:
   an optical pickup for radiating laser light onto a disk-type recording medium and receiving laser light reflected from said disk-type recording medium, the medium including a disk-shaped base having a plurality of lands and a plurality of grooves, and a plurality of tracks formed on said base and which are formed by two spirals which do not intersect each other, the area on said base divided into a servo area for obtaining a servo signal and a recordable data area for each angular position of said base, and each pair of adjacent tracks of said plurality of tracks formed alternately on lands and grooves at angular positions of said base in said data area;
   rotation driving means for rotating said disk-type recording medium;
   tracking means for controlling the radiation position of laser light so that said laser light is radiated onto tracks of said disk-type recording medium;
   servo information generation means for generating servo information in accordance with a servo signal reproduced from said servo area by said optical pickup;
   recording means for recording information into said data area; and
   control means for controlling said tracking means in accordance with said servo information so that a spot by said laser light scans along the center of said grooves and the center of said lands each time said disk-type recording medium is rotated once.

25. The apparatus of claim 24,
   wherein a plurality of pits for three-phase tracking are formed in said servo area; and further
   wherein said servo information generation means includes level-difference information generation means for generating three level-difference information which indicates the level difference between each pair of three values obtained by sampling said servo signal at three timings, and servo information output means for outputting the level difference as said servo information by selectively switching said three signals.

26. A driving apparatus for driving a disk-type recording medium, comprising:
   an optical pickup for radiating laser light onto a disk-type recording medium and receiving laser light reflected from said disk-type recording medium, the medium including a disk-shaped base having a plurality of lands and a plurality of grooves, and a plurality of tracks formed on said base and formed by two spirals which do not intersect each other, the area on said base divided into a servo area for obtaining a servo signal and a reproduceable data area for each angular position of said base, and each pair of adjacent tracks of said plurality of tracks formed alternately on lands and grooves at angular positions of said base in said data area;
   rotation driving means for rotating said disk-type recording medium;

tracking means for controlling the radiation position of laser light so that said laser light is radiated onto tracks of said disk-type recording medium;

servo information generation means for generating servo information in accordance with a servo signal reproduced from said servo area by said optical pickup;

information reproduction means for reproducing information from said data area; and control means for controlling said tracking means in accordance with said servo information so that a spot by said laser light scans along the center of said two spirals of said disk-type recording medium.

27. The apparatus of claim 26, wherein a plurality of pits for three-phase tracking are formed in said servo area; and further wherein said servo information generation means includes level-difference information generation means for generating three level-difference information which indicates the level difference between each pair of three values obtained by sampling said servo signal at three timings, and servo information output means for outputting the level difference as said servo information by selectively switching said three signals.

28. The apparatus of claim 27 wherein said optical pickup includes intensity distribution control means for performing control so that there are two areas containing the peak of the intensity distribution of said spot, and so that each of said two areas containing the peak of the intensity distribution of said spot scans along the center of each spiral in a state in which said spot scans along the center of said two spirals.

29. The apparatus of claim 28 wherein said data area of said disk-type recording medium is a recordable area; and further wherein said control means controls said tracking means in accordance with said servo information so that a spot by said laser light scans along the center of said two spirals of said disk-type recording medium when information is reproduced from said data area of said disk-type recording medium, and controls said tracking means in accordance with said servo information so that-a spot by said laser light scans in sequence along each center of said two spirals of said disk-type recording medium when information is recorded into said data area of said disk-type recording medium.

30. The apparatus of claim 26 wherein said optical pickup includes intensity distribution control means for performing control so that there are two areas containing the peak of the intensity distribution of said spot, and so that each of said two areas containing the peak of the intensity distribution of said spot scans along the center of each spiral in a state in which said spot scans along the center of said two spirals.

31. The apparatus of claim 30 wherein said data area of said disk-type recording medium is a recordable area; and further wherein said control means controls said tracking means in accordance with said servo information so that a spot by said laser light scans along the center of said two spirals of said disk-type recording medium when information is reproduced from said data area of said disk-type recording medium, and controls said tracking means in accordance with said servo information so that a spot by said laser light scans in sequence along each center of said two spirals of said disk-type recording medium when information is recorded into said data area of said disk-type recording medium.

32. The apparatus of claim 26, wherein said data area of said disk-type recording medium is a recordable area; and further wherein said control means controls said tracking means in accordance with said servo information so that a spot by said laser light scans along the center of said two spirals of said disk-type recording medium when information is reproduced from said data area of said disk-type recording medium, and controls said tracking means in accordance with said servo information so that a spot by said laser light scans in sequence along each center of said two spirals of said disk-type recording medium when information is recorded into said data area of said disk-type recording medium.

33. The apparatus of claim 32 wherein said optical pickup includes intensity distribution control means for selectively performing control so that there are one or two areas containing the peak of the intensity distribution of said spot, and said control means controls said intensity distribution control means so that there is one area containing the peak of the intensity distribution of said spot when information is recorded into said data area of said disk-type recording medium and controls said intensity-distribution control means so that there are two areas containing the peak of the intensity distribution of said spot when information is reproduced from said data area of said disk-type recording medium.

34. A manufacturing apparatus for manufacturing a disk-type recording medium having a first area formed of one spiral track and a second area formed of two spiral tracks which do not intersect each other, said manufacturing apparatus comprising:

rotation means for rotationally driving said disk-type recording medium;

laser means for radiating laser light onto said disk-type recording medium;

movement means for moving the radiation position of said laser light in the radial direction of said disk-type recording medium; and control means for switching between a first mode in which pits are formed in said first area by causing said laser means to radiate laser light while said disk-type recording medium is rotated by said rotation means and said laser means is moved in a first direction along the radial direction of said disk-type recording medium at a first velocity by means of said movement means, and a second mode in which pits are formed in said second area by causing said laser means to radiate laser light while said disk-type recording medium is rotated by said rotation means and said laser means is moved in said first direction at a second velocity twice as fast as said first velocity by means of said movement means, and by causing said laser means to move in a second direction opposite to said first direction by a distance equal to the distance at which said laser means was moved at the first velocity during the time in which said disk-type recording medium is rotated half when said disk-type recording medium reaches an angular position determined by said rotation means.

35. The apparatus of claim 34 wherein said control means causes said laser means to move at said first velocity in order to form pits during the formation of pits for the first revolution for said first area and causes said laser means to move at said second velocity in order to form pits during the formation of pits for the second and subsequent revolutions when shifting from the first mode in which pits are formed in said first area to the second mode in which pits are formed in said second area.

36. A method of manufacturing a disk-type recording medium having a first area formed of one spiral track and a second area formed of two spiral tracks which do not intersect each other, said method comprising the steps of:

rotationally driving said disk-type recording medium;

causing laser means to radiate laser light onto said disk-type recording medium;

forming pits in said first area by causing said laser means to radiate laser light while said laser means is moved in a first direction along the radial direction of said disk-type recording medium at a first velocity in a state in which said disk-type recording medium is being rotated;

forming pits in said second area by causing said laser means to radiate laser light while said laser means is moved in said first direction at a second velocity twice as fast as said first velocity in a state in which said disk-type recording medium is being rotated; and causing said laser means to move by a distance equal to the distance at which said laser means was moved at the first velocity while said disk-type recording medium is rotated half in a second direction opposite to said first direction when said disk-type recording medium reaches a predetermined angular position while pits are being formed in said second area.

37. The method of claim 36 wherein when shifting from the first mode in which pits are formed in said first area to the second mode in which pits are formed in said second area, pits are formed by causing said laser means to move at said first velocity during the formation of pits for the first revolution for the second area, and pits are formed by causing said laser means to move at said second velocity during the formation of pits for the second and subsequent revolutions.

38. A driving method for driving a disk-type recording medium, comprising the steps of:

radiating laser light onto a disk-type recording medium and receiving laser light reflected from said disk-type recording medium, the medium including a disk-shaped base having a plurality of lands and a plurality of grooves, and a plurality of tracks which are formed on said base and which are formed by two spirals which do not intersect each other, the area on said base divided into a servo area for obtaining a servo signal and a recordable data area for each angular position of said base, and each pair of adjacent tracks of said plurality of tracks formed alternately on lands and grooves at angular positions of said base in said data area;

rotating said disk-type recording medium;

controlling the radiation position of laser light so that said laser light is radiated onto tracks of said disk-type recording medium;

generating servo information in accordance with a servo signal reproduced from said servo area; recording information into said data area; and controlling said tracking means in accordance with said servo information so that a spot by said laser light scans along the center of said grooves and the center of said lands each time said disk-type recording medium is rotated once.

39. The method of claim 38 further including the steps of:

forming a plurality of pits for three-phase tracking in said servo area; and said step of generating said servo information including the steps of generating three level-difference information indicating the level difference between each pair of three values obtained by sampling said servo signal at three timings, and outputting the level difference as said servo information by selectively switching said three signals.

40. A driving apparatus for driving a disk-type recording medium, comprising:

an optical pickup for radiating laser light onto a disk-type recording medium and receiving laser light reflected from said disk-type recording medium, the medium including a disk-shaped base having a plurality of lands and a plurality of grooves, and a plurality of tracks formed on said base and which are formed by two spirals which do not intersect each other, the area on said base divided into a servo area for obtaining a servo signal and a recordable data area for each angular position of said base, and each pair of adjacent tracks of said plurality of tracks formed alternately on lands and grooves at angular positions of said base in said data area;

a rotation driving unit for rotating said disk-type recording medium;

a tracking unit for controlling the radiation position of laser light so that said laser light is radiated onto tracks of said disk-type recording medium;

a servo information generation unit for generating servo information in accordance with a servo signal reproduced from said servo area by said optical pickup;

a recording unit for recording information into said data area; and a controller for controlling said tracking means in accordance with said servo information so that a spot by said laser light scans along the center of said grooves and the center of said lands each time said disk-type recording medium is rotated once.

41. The apparatus of claim 40 wherein a plurality of pits for three-phase tracking are formed in said servo area; and further wherein said servo information generation unit includes a level-difference information generation unit for generating three level-difference information which indicates the level difference between each pair of three values obtained by sampling said servo signal at three timings, and a servo information output unit for outputting the level difference as said servo information by selectively switching said three signals.

42. A driving apparatus for driving a disk-type recording medium, comprising:

an optical pickup for radiating laser light onto a disk-type recording medium and receiving laser light reflected from said disk-type recording medium, the medium including a disk-shaped base having a plurality of lands and a plurality of grooves, and a plurality of tracks formed on said base and formed by two spirals which do not intersect each other, the area on said base divided into a servo area for obtaining a servo signal and a reproduceable data area for each angular position of said base, and each pair of adjacent tracks of said plurality of tracks formed alternately on lands and grooves at angular positions of said base in said data area;

a rotation driving unit for rotating said disk-type recording medium;

a tracking unit for controlling the radiation position of laser light so that said laser light is radiated onto tracks of said disk-type recording medium;

a servo information generation unit for generating servo information in accordance with a servo signal reproduced from said servo area by said optical pickup;

an information reproduction unit for reproducing information from said data area; and a controller for controlling said tracking unit in accordance with said servo information so that a spot by said laser light scans along the center of said two spirals of said disk-type recording medium.

43. The apparatus of claim 42 wherein a plurality of pits for three-phase tracking are formed in said servo area; and further wherein said servo information generation unit includes a level-difference information generation unit for generating three level-difference information which indicates the level difference between each pair of three values obtained by sampling said servo signal at three timings, and a servo information output unit for outputting the level difference as said servo information by selectively switching said three signals.

44. The apparatus of claim 43 wherein said optical pickup includes intensity distribution controller for performing control so that there are two areas containing the peak of the intensity distribution of said spot, and so that each of said two areas containing the peak of the intensity distribution of said spot scans along the center of each spiral in a state in which said spot scans along the center of said two spirals.

45. The apparatus of claim 44 wherein said data area of said disk-type recording medium is a recordable area; and further wherein said controller controls said tracking unit in accordance with said servo information so that a spot by said laser light scans along the center of said two spirals of said disk-type recording medium when information is reproduced from said data area of said disk-type recording medium, and controls said tracking unit in accordance with said servo information so that a spot by said laser light scans in sequence along each center of said two spirals of said disk-type recording medium when information is recorded into said data area of said disk-type recording medium.

46. The apparatus of claim 42 wherein said optical pickup includes intensity distribution controller for performing control so that there are two areas containing the peak of the intensity distribution of said spot, and so that each of said two areas containing the peak of the intensity distribution of said spot scans along the center of each spiral in a state in which said spot scans along the center of said two spirals.

47. The apparatus of claim 46 wherein said data area of said disk-type recording medium is a recordable area; and further wherein said controller controls said tracking unit in accordance with said servo information so that a spot by said laser light scans along the center of said two spirals of said disk-type recording medium when information is reproduced from said data area of said disk-type recording medium, and controls said tracking unit in accordance with said servo information so that a spot by said laser light scans in sequence along each center of said two spirals of said disk-type recording medium when information is recorded into said data area of said disk-type recording medium.

48. The apparatus of claim 42, wherein said data area of said disk-type recording medium is a recordable area; and further wherein said controller controls said tracking unit in accordance with said servo information so that a spot by said laser light scans along the center of said two spirals of said disk-type recording medium when information is reproduced from said data area of said disk-type recording medium, and controls said tracking unit in accordance with said servo information so that a spot by said laser light scans in sequence along each center of said two spirals of said disk-type recording medium when information is recorded into said data area of said disk-type recording medium.

49. The apparatus of claim 48 wherein said optical pickup includes intensity distribution controller for selectively performing control so that there are one or two areas containing the peak of the intensity distribution of said spot, and said controller controls said intensity distribution controller so that there is one area containing the peak of the intensity distribution of said spot when information is recorded into said data area of said disk-type recording medium and controls said intensity-distribution controller so that there are two areas containing the peak of the intensity distribution of said spot when information is reproduced from said data area of said disk-type recording medium.

50. A driving method for driving a disk-type recording medium, comprising the steps of:

radiating laser light onto a disk-type recording medium and receiving laser light reflected from said disk-type recording medium, the medium including a disk-shaped base having a plurality of lands and a plurality of grooves, and a plurality of tracks formed on said base and formed by two spirals which do not intersect each other, the area on said base divided into a servo area for obtaining a servo signal and a reproduceable data area for each angular position of said base, and each pair of adjacent tracks of said plurality of tracks formed alternately on lands and grooves at angular positions of said base in said data area;

rotating said disk-type recording medium;

controlling the radiation position of laser light so that said laser light is radiated onto tracks of said disk-type recording medium;

generating servo information in accordance with a servo signal reproduced from said servo area;

reproducing information from said data area; and controlling said radiation position controlling step in accordance with said servo information so that a spot by said laser light scans along the center of said two spirals of said disk-type recording medium.

51. The method of claim 50 further including the steps of:

forming a plurality of pits for three-phase tracking in said servo area; and further wherein said step of generating includes the step of generating three level-difference information which indicates the level difference between each pair of three values obtained by sampling said servo signal at three timings, and outputting the level difference as said servo information by selectively switching said three signals.

52. The method of claim 51 wherein said step of radiating includes the step of performing control so that there are two areas containing the peak of the intensity distribution of said spot, and so that each of said two areas containing the peak of the intensity distribution of said spot scans along the center of each spiral in a state in which said spot scans along the center of said two spirals.

53. The method of claim 52 wherein said data area of said disk-type recording medium is a recordable area; and further wherein said step of controlling said radiation position includes the step of controlling said tracking step in accordance with said servo information so that a spot by said laser light scans along the center of said two spirals of said disk-type recording medium when information is reproduced from said data area of said disk-type recording medium, and controlling said radiation position controlling step in accordance with said servo information so that a spot by said laser light scans in sequence along each center of said two spirals of said disk-type recording medium when information is recorded into said data area of said disk-type recording medium.

54. The method of claim 50 wherein said step of radiating includes the step of performing control so that there are two areas containing the peak of the intensity distribution of said spot, and so that each of said two areas containing the peak of the intensity distribution of said spot scans along the center of each spiral in a state in which said spot scans along the center of said two spirals.

55. The method of claim 54 wherein said data area of said disk-type recording medium is a recordable area; and further wherein said step of radiation position controlling step includes the step of controlling said radiation position controlling step in accordance with said servo information so that a spot by said laser light scans along the center of said two spirals of said disk-type recording medium when information is reproduced from said data area of said disk-type recording medium, and controlling radiation position controlling step in accordance with said servo information so that a spot by said laser light scans in sequence along each center of said two spirals of said disk-type recording medium when information is recorded into said data area of said disk-type recording medium.

56. The method of claim 50 wherein said data area of said disk-type recording medium is a recordable area; and further wherein said step of controlling further includes the step of controlling said radiation position controlling step in accordance with said servo information so that a spot by said laser light scans along the center of said two spirals of said disk-type recording medium when information is reproduced from said data area of said disk-type recording medium, and controlling said radiation position controlling step in accordance with said servo information so that a spot by said laser light scans in sequence along each center of said two spirals of said disk-type recording medium when information is recorded into said data area of said disk-type recording medium.

57. The method of claim 56 wherein said radiating step includes the step of selectively performing control so that there are one or two areas containing the peak of the intensity distribution of said spot, and said controlling step controls said selectively performing control step so that there is one area containing the peak of the intensity distribution of said spot when information is recorded into said data area of said disk-type recording medium and controls said intensity-distribution controller so that there are two areas containing the peak of the intensity distribution of said spot when information is reproduced from said data area of said disk-type recording medium.

* * * * *